(12) United States Patent
Miyake et al.

(10) Patent No.: US 9,587,129 B2
(45) Date of Patent: Mar. 7, 2017

(54) INK COMPOSITION AND INK SET

(71) Applicant: Seiko Epson Corporation, Tokyo (JP)

(72) Inventors: Yuho Miyake, Shiojiri (JP); Ryosuke Teramoto, Matsumoto (JP); Hiromi Ohori, Gifu (JP); Daisuke Ishihara, Matsumoto (JP); Miharu Kanaya, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/943,477

(22) Filed: Nov. 17, 2015

(65) Prior Publication Data

US 2016/0137859 A1 May 19, 2016

(30) Foreign Application Priority Data

Nov. 18, 2014 (JP) .................................. 2014-233940

(51) Int. Cl.
| | | |
|---|---|---|
| *C09D 11/328* | (2014.01) | |
| *C09D 11/40* | (2014.01) | |
| *C09B 33/18* | (2006.01) | |
| *C09B 67/22* | (2006.01) | |
| *C08K 5/3492* | (2006.01) | |

(52) U.S. Cl.
CPC .......... *C09D 11/328* (2013.01); *C08K 5/3492* (2013.01)

(58) Field of Classification Search
CPC ....... C09D 11/328; C09D 11/40; C09B 33/18; C09B 67/0046
USPC ........................................... 106/31.48, 31.52
See application file for complete search history.

(56) References Cited

U.S. PATENT DOCUMENTS

| | | | | |
|---|---|---|---|---|
| 7,503,967 | B2 * | 3/2009 | Matsui ................. | C09D 11/328 106/31.52 |
| 8,496,746 | B2 * | 7/2013 | Teramoto ............ | C09B 67/0046 106/31.48 |
| 8,512,462 | B2 * | 8/2013 | Matsui ................. | C09D 11/328 106/31.48 |
| 8,741,045 | B2 * | 6/2014 | Kawaguchi .......... | C09D 11/328 106/31.48 |
| 8,741,046 | B2 * | 6/2014 | Kawaguchi .......... | C09D 11/328 106/31.48 |
| 8,790,458 | B2 * | 7/2014 | Aruga .................. | C09D 11/328 106/31.48 |
| 2008/0193660 | A1 | 8/2008 | Matsui et al. | |
| 2012/0213930 | A1 | 8/2012 | Teramoto et al. | |
| 2014/0299020 | A1 * | 10/2014 | Shimizu .............. | C09D 11/328 106/503 |
| 2016/0032125 | A1 * | 2/2016 | Ohori ................... | C09D 11/328 106/31.48 |
| 2016/0152850 | A1 * | 6/2016 | Kawaguchi ............ | C09B 33/18 106/31.49 |

FOREIGN PATENT DOCUMENTS

| | | |
|---|---|---|
| JP | 2006-176585 A | 7/2006 |
| JP | 4764829 B2 | 9/2011 |
| JP | 2012-172031 A | 9/2012 |
| WO | WO 2015/019702 A1 * | 2/2015 |

* cited by examiner

*Primary Examiner* — Helene Klemanski

(74) *Attorney, Agent, or Firm* — Harness, Dickey & Pierce, P.L.C.

(57) ABSTRACT

An ink composition includes, as dyes, a dye (Bk-1) represented by the formula (Bk-1); and a dye (Bw-1) represented by the formula (Bw-1), in which a content ratio A (dye (Bk-1):dye (Bw-1)) of the dye (Bk-1) and the dye (Bw-1) is 100:18 to 100:40.

12 Claims, No Drawings

INK COMPOSITION AND INK SET

BACKGROUND

1. Technical Field

The present invention relates to an ink composition and an ink set.

2. Related Art

Ink jet recording methods are able to record high definition images with a comparatively simple device, and rapid development has been made on various fronts. Among these, images and the like of obtained recording materials have been variously researched. For example, JP-A-2006-176585 discloses a black aqueous ink composition including water, a water soluble organic solvent, at least one type of black dye selected from a group consisting of a predetermined coloring material and salts thereof, and at least C.I. Direct Red 225 as a complementary color dye with the purpose of providing a black aqueous ink composition that has excellent light resistance and ozone resistance and can create a printed matter which is able to hold a high quality image over a long period, and that further has superior hue as a black ink, has sufficiently secure color density and excellent hue even with an ordinary paper, and has excellent storage stability as an ink with little clogging.

However, in recent years, there is a desire for significant improvements in the hue and the color density of the obtained recording material.

SUMMARY

An advantage of some aspects of the invention is to provide an ink composition and an ink set with superior hue and color density.

The inventors have conducted intensive research in order to obtain the above advantage. As a result, the inventors discovered that it is possible to obtain the above advantage by using an ink composition including a predetermined dye, thereby completing the invention.

That is, the invention is as follows.

(1) According to an aspect of the invention, there is provided an ink composition including, as dyes, a dye (Bk-1) represented by the following formula (Bk-1); and a dye (Bw-1) represented by the following formula (Bw-1), in which a content ratio A (dye (Bk-1):dye (Bw-1)) of the dye (Bk-1) and the dye (Bw-1) is 100:18 to 100:40, and a total content of the dyes is more than 3.5 mass %.

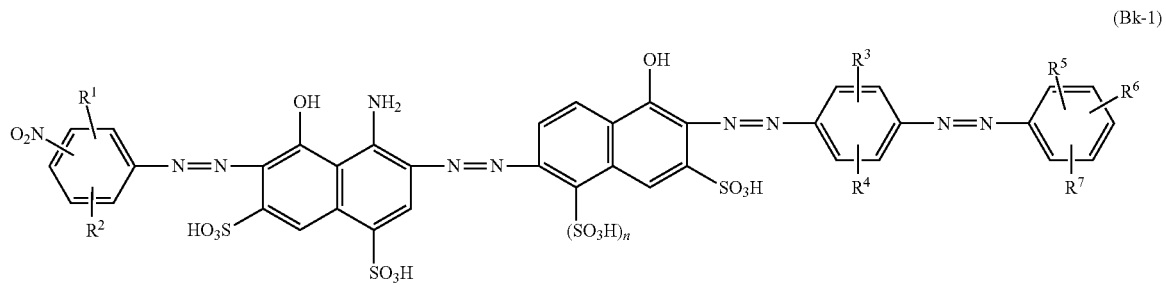

(Bk-1)

(in formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenyl-sulfonylamino group (the phenyl group may be substituted with a halogen atom, an alkyl group or a nitro group), $R^3$ and $R^4$ each independently represent a hydrogen atom, a halogen atom, a cyano group, a carboxyl group, a sulfo group, a nitro group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenylsulfonylamino group (the phenyl group may be substituted with a halogen atom, an alkyl group or a nitro group), and n represents 0 or 1.)

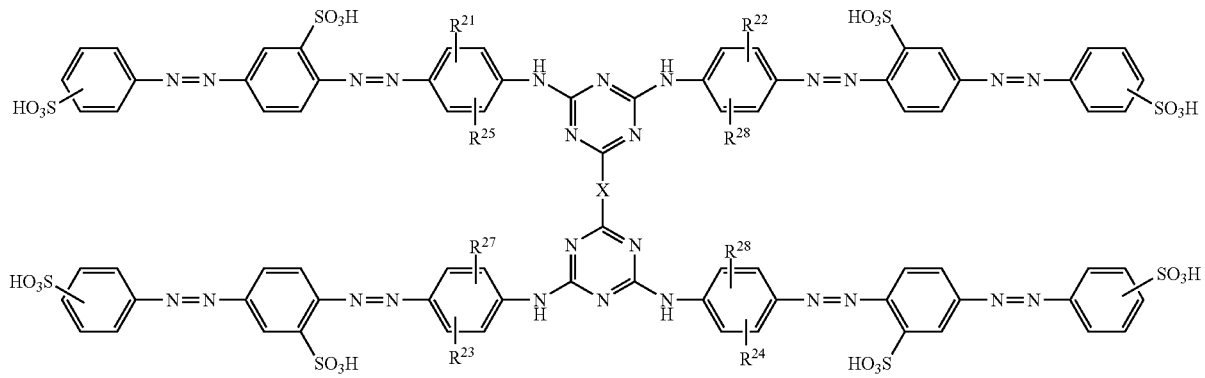

(Bw-1)

(in formula (Bw-1), $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4) alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group as a substitutent; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4) alkyl group, a nitro group, a sulfo group, and a carboxy group; a benzenesulfonylamino group; or a phenylsulfonylamino group in which a benzene ring is substituted with at least one group selected from a halogen atom, a (C1-C4) alkyl group, a nitro group, a sulfo group, and a carboxy group; and X represents a bivalent crosslinking group).

(2) According to another aspect of the invention, there is provided an ink composition including, as dyes, a dye (Bk-1) represented by the following formula (Bk-1); and a dye (Bw-1) represented by the following formula (Bw-1), in which a content ratio A (dye (Bk-1):dye (Bw-1)) of the dye (Bk-1) and the dye (Bw-1) is 100:18 to 100:40, and a total content of the dyes is 0.50 to 1.5 mass %.

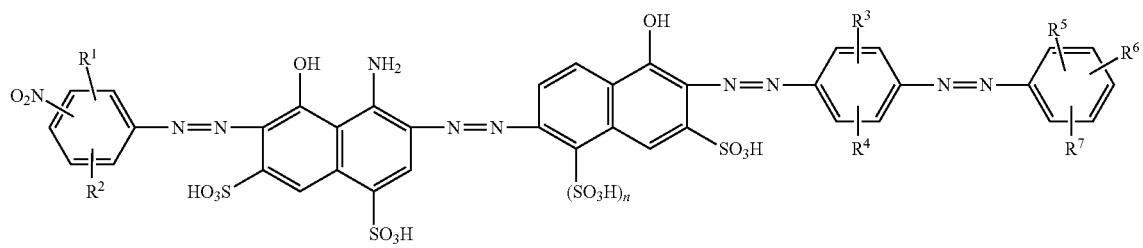

(Bk-1)

(in formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenyl-sulfonylamino group (the phenyl group may be substituted with a halogen atom, an alkyl group or a nitro group), $R^3$ and $R^4$ each independently represent a hydrogen atom, a halogen atom, a cyano group, a carboxyl group, a sulfo group, a nitro group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenylsulfonylamino group (the phenyl group may be substituted with a halogen atom, an alkyl group or a nitro group), and n represents 0 or 1.)

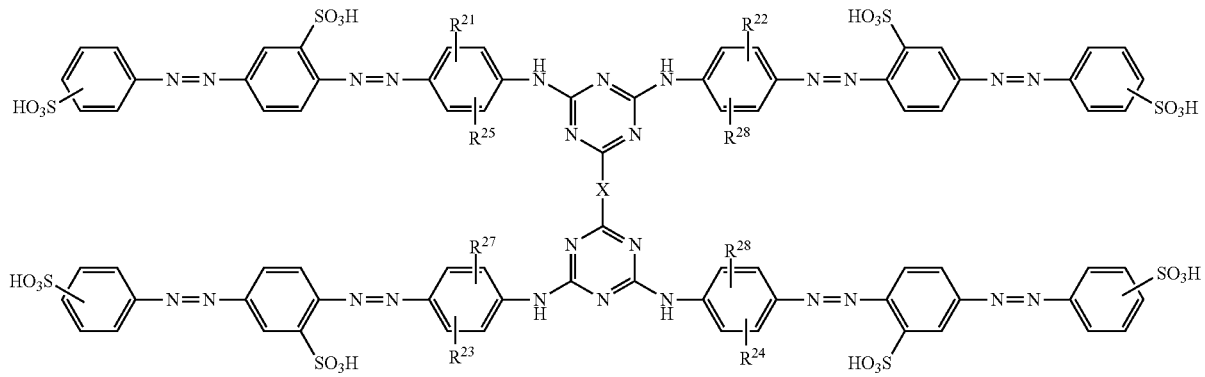

(Bw-1)

(in formula (Bw-1), $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4) alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group as a substituent; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4)alkyl group, a nitro group, a sulfo group, and a carboxy group; a benzenesulfonylamino group; or a phenylsulfonylamino group in which a benzene ring is substituted with at least one group selected from a halogen atom, a (C1-C4)alkyl group, a nitro group, a sulfo group, and a carboxy group; and X represents a bivalent crosslinking group).

(3) In the ink composition according to (1) or (2), it is preferable that, as the dyes, a dye (Y-1) represented by the following formula (Y-1), and a dye (Y-2) represented by the following formula (Y-2) are further included, and that a content ratio B (dye (Bk-1):dye (Bw-1):dye (Y-1):dye (Y-2)) of the dye (Bk-1), the dye (Bw-1), the dye (Y-1), and the dye (Y-2) is 100:20:5:5 to 100:40:12:12.

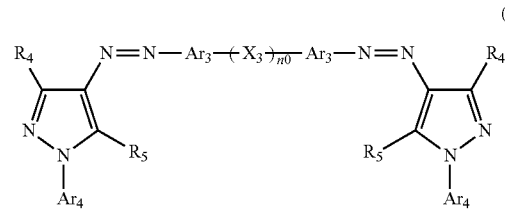

(Y-1)

(in formula (Y-1), $R_4$ represents a substituent, $R_5$ represents —$OR_6$ or —$NHR_7$, $R_6$ and $R_7$ represents a hydrogen atom or a substituent, $X_3$ represents a bivalent linking group, n0 is 0 or 1, $Ar_3$ represents a bivalent hetero ring group, and $Ar_4$ represents an alkyl group, an aryl group or a triazine group.)

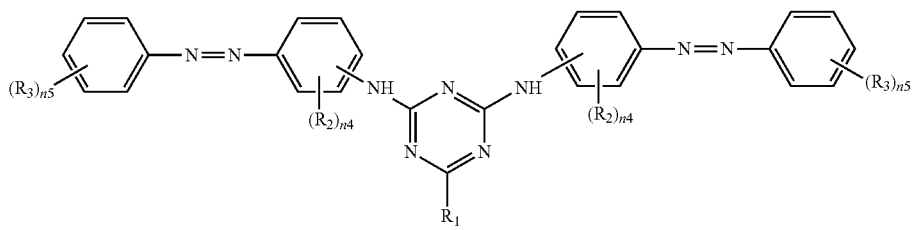

(Y-2)

(in formula (Y-2), $R_1$ represents a hydrogen atom or a substituent, $R_2$ represents a substituent, $R_3$ represents an alkyl group which may form an ionic hydrophilic group or a ring, n4 is 0 to 4, and n5 is 2 to 5.)

(4) In the ink composition according to (1), it is preferable that the total content of the dyes is 4.7 to 6.5 mass %.

(5) In the ink composition according to (2), it is preferable that the total content of the dyes is 0.5 to 1.5 mass %.

(6) In the ink composition according to any one of (1) to (5), it is preferable that an alkylene oxide adduct of (C12) or higher acetylene glycol on the main chain, and polyoxyalkylene alkyl ether are further included.

(7) In the ink composition according to any one of (1) to (6), it is preferable to that triethylene glycol monobutyl ether is further included, and that a content of the triethylene glycol monobutyl ether is 3.0 to 10 mass %.

(8) According to still another aspect of the invention, there is provided an ink set including the ink composition according to any one of (1) to (7).

DESCRIPTION OF EXEMPLARY EMBODIMENTS

Below, although embodiments of the invention (below, referred to "the embodiment") are described in detail, the invention is not limited thereto, and various modifications are possible in a range not departing therefrom.

Ink Composition

The ink composition (below, simply referred to as "ink") of the embodiment includes, as dyes, a dye (Bk-1) represented by the following formula (Bk-1); and a dye (Bw-1) represented by the following formula (Bw-1), in which the content ratio A (dye (Bk-1):dye (Bw-1)) of the dye (Bk-1) and the dye (Bw-1) is 100:18 to 100:40. The ink composition of the embodiment includes a form where the total content of the dyes exceeds 3.5 mass %, and a form where the total content of the dyes is 0.50 to 1.5 mass %.

(Bk-1)

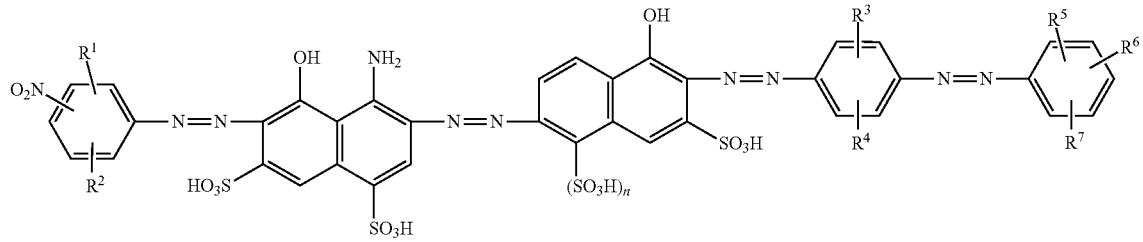

(in formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenyl-sulfonylamino group (the phenyl group may be substituted with a halogen atom, an alkyl group or a nitro group), $R^3$ and $R^4$ each independently represent a hydrogen atom, a halogen atom, a cyano group, a carboxyl group, a sulfo group, a nitro group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenylsulfonylamino group (the phenyl group may be substituted with a halogen atom, an alkyl group or a nitro group), and n represents 0 or 1.)

(Bw-1)

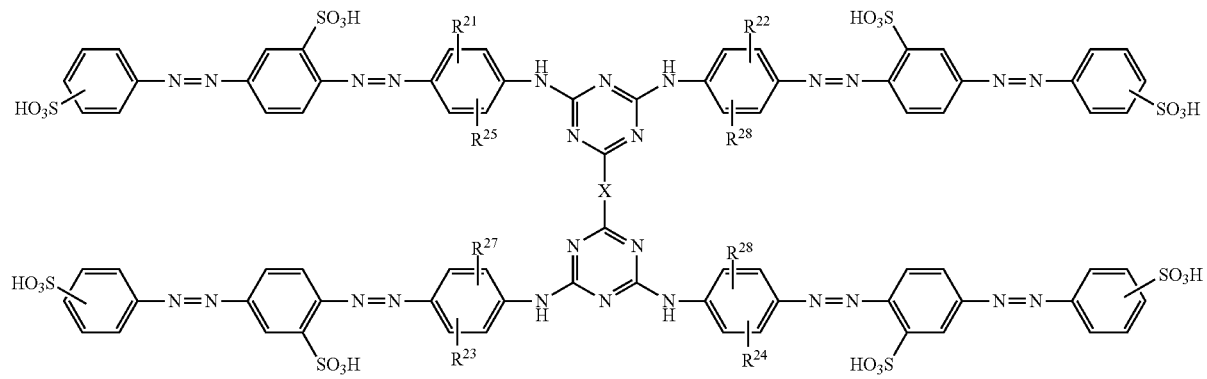

(in formula (Bw-1), $R^{21}$, $R^{22}$, $R^{23}$, $R^{24}$, $R^{25}$, $R^{27}$, and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4) alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4)alkyl group, a nitro group, a sulfo group, and a carboxy group; a benzenesulfonylamino group; or a phenyl-sulfonylamino group in which a benzene ring is substituted with at least one group selected from a halogen atom, a (C1-C4)alkyl group, a nitro group, a sulfo group, and a carboxy group; and X represents a bivalent crosslinking group).

Dye (Bk-1) Represented by Formula (Bk-1)

Below, the dye (Bk-1) (an azo compound or a salt thereof) represented by the formula (Bk-1) will be described in detail.

an acylamino group, an alkylsulfonylamino group or a phenylsulfonylamino group (the phenyl group may be substituted with a halogen atom, an alkyl group or a nitro group), and n represents 0 or 1.)

In the formula (Bk-1), although the carbon number atoms is not particularly limited in the alkyl group, alkoxy group, acyl group and the like for which the carbon number is not specifically disclosed, the groups ordinarily have a carbon number of approximately (C1-C20), and approximately (C1-C10) is preferable, and in the case of an alkyl group, alkoxy group or an aliphatic acyl group, approximately (C1-C4) is more preferable, and, in the case of an aromatic acyl group, the group has a carbon number of (C7-C11), and specific examples include a benzoyl group and a naphthoyl group.

In the formula (Bk-1), examples of the N-alkyl aminosulfonyl group in $R^1$, $R^2$, $R^5$, $R^6$, and $R^7$ include an N-methylaminosulfonyl group, an N-ethylaminosulfonyl group, an N-(n-butyl) aminosulfonyl group, an N,N-dimethylaminosulfonyl group, and an N,N-di(n-propyl) aminosulfonyl group.

In the formula (Bk-1), examples of the (C1-C4) alkylsulfonyl group that may have a substituent with a hydroxyl group in $R^1$, $R^2$, $R^5$, $R^6$, and $R^7$ include methyl sulfonyl, ethyl sulfonyl, propyl sulfonyl, butyl sulfonyl, hydroxyethyl sulfonyl, and 2-hydroxypropyl sulfonyl.

In formula (Bk-1), preferable examples of the acyl group in $R^1$, $R^2$, $R^5$, $R^6$ and $R^7$ includes a (C1-C4) alkylcarbonyl, such as acetyl, propionyl, and butyryl or isobutyryl, or a (C7-C11) aromatic carbonyl such as benzoyl and naphthoyl.

In formula (Bk-1), examples of the hydroxy group or the (C1-C4) alkyl group that may have a substituent with a

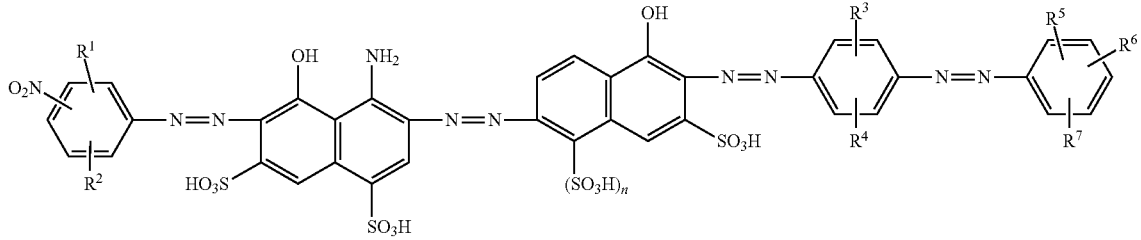

(Bk-1)

(in formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), an acylamino group, an alkylsulfonylamino group or a phenyl-sulfonylamino group (the phenyl group may be substituted with a halogen atom, an alkyl group or a nitro group), $R^3$ and $R^4$ each independently represent a hydrogen atom, a halogen atom, a cyano group, a carboxyl group, a sulfo group, a nitro group, a (C1-C4) alkyl group (which may be substituted with a hydroxyl group or a (C1-C4) alkoxy group), a (C1-C4) alkoxy group (the alkyl group may be substituted with a hydroxyl group, a (C1-C4) alkoxy group, a sulfo group or a carboxyl group), (C1-C4) alkoxy group in $R^1$ to $R^7$ include, methyl, ethyl, n-propyl, isopropyl, n-butyl, isobutyl, sec-butyl, tert-butyl, 2-hydroxyethel, 2-hydroxypropyl, 3-hydroxypropyl, methoxyethyl, 2-ethoxyethyl, n-propoxyethyl, isopropoxyethyl, n-butoxyethyl, methoxypropyl, ethoxypropyl, n-propoxypropyl, isopropoxybutyl, and n-propoxybutyl.

In the formula (Bk-1), examples of the (C1-C4) alkoxy group that may have a substituent with a substituent selected from a group consisting of a hydroxy group, (C1-C4) alkoxy, a sulfo group or a carboxyl group in $R^1$ to $R^7$ include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxy-butoxy, 2-hydroxy-ethoxy-ethoxy, carboxymethoxy, 2-carboxyethoxy, 3-carboxypropoxy, 3-sulfopropoxy, and 4-sulfobutoxy.

In the formula (Bk-1), in $R^1$ to $R^7$, preferable examples of the acyl group of the acylamino group include preferable acyl groups given as examples in the acyl group item, and preferable acylamino groups include acetylamino, propionylamino, butylamino, isobutylamino, benzoylamino and naphthoylamino.

In the formula (Bk-1), preferable examples of the alkylsufonylamino group in $R^1$ to $R^7$ include methlysufonylamino, ethylsulfonylamino, and propylsulfonylamino.

In the formula (Bk-1), preferable examples of the phenylsulfonylamino group which may be substituted with a group selected from group consisting of a halogen atom and an alkyl group or a nitro group in $R^1$ to $R^7$ include benzene sulfonylamino, toluenesulfonylamino, chlorobenzenesulfonylamino, and nitrobenzenesulfonylamino.

In the formula (Bk-1), it is preferable that R and R are each independently a hydrogen atom, a chlorine atom, a bromine atom, a cyano group, a carboxyl group, a sulfo group, a sulfamoyl group, an N-methylamino-sulfonyl group, an N-phenyl aminosulfonyl group, a methylsulfonyl group, a hydroxyethyl sulfonyl group, a phosphate group, a nitro group, an acetyl group, a benzoyl group, a ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4 sulfobutoxy group, a carboxymethyl methoxy group, a 2-carboxyethoxy group, an acetylamino group, a benzoylamino group or the like, more preferably, a hydrogen atom, a chlorine atom, a cyano group, a sulfamoyl group, an acetyl group, a nitro group, a carboxyl group or a sulfo group, and still more preferably, a hydrogen atom, a carboxyl group or a sulfo group. $R^1$ is still more preferably a carboxyl group or a sulfo group, and a sulfo group is particularly preferable. It is particularly preferable that $R^2$ is a hydrogen atom.

In the formula (Bk-1), it is preferable for the substituent that, in a case where the substitution position of $R^1$ is the ortho position to the azo group, the substitution position of the nitro group is the para position to the azo group, and in a case where the substitution position of the $R^1$ is the para position to the azo group, the substitution position of the nitro group is the ortho position to the azo group.

In the formula (Bk-1), it is preferable that $R^3$ and $R^4$ are each independently a hydrogen atom, a cyano group, a carboxyl group, a sulfo group, a nitro group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxy ethoxy or an acetylamino group, more preferably, a hydrogen atom, a carboxyl group, a sulfo group, a methyl group, a methoxy group or a 3-sulfopropoxy group, and still more preferably, a hydrogen atom or a sulfo group. It is particularly preferable that $R^3$ is a sulfo group and $R^4$ is a combination of hydrogen atoms.

In the formula (Bk-1), it is preferable that $R^5$ and $R^7$ are each independently a hydrogen atom, a chlorine atom, a bromine atom, a cyano group, a carboxyl group, a sulfo group, a sulfamoyl group, an N-methylamino-sulfonyl group, an N-phenyl aminosulfonyl group, a methylsulfonyl group, a hydroxyethyl sulfonyl group, a phosphate group, a nitro group, an acetyl group, a benzoyl group, a ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4 sulfobutoxy group, a carboxymethyl methoxy group, a 2-carboxyethoxy group, an acetylamino group, a benzoylamino group or the like, more preferably, a hydrogen atom, a chlorine atom, a cyano group, a sulfamoyl group, an acetyl group, a nitro group, a carboxyl group or a sulfo group, and still more preferably, a hydrogen atom, a carboxyl group or a sulfo group. It is particularly preferable that $R^5$ is a hydrogen atom, a carboxyl group or a sulfo group, particularly preferable that $R^6$ is a carboxyl group or a sulfo group, and particularly preferable that $R^7$ is a hydrogen atom.

In the formula (Bk-1), a case where one of $R^1$ and R is a hydrogen atom or a sulfo group, and the other is a carboxyl group, a sulfo group or a (C1-C4) alkoxy group, and a case where one is a hydrogen atom and the other is a carboxyl group or a sulfo group is more preferable. Although n may be either of 0 or 1, 1 is more preferable.

In the formula (Bk-1), a case where one of $R^3$ and $R^4$ is a sulfo group or a sulfo (C1-C4) alkoxy group and the other is a hydrogen atom, a sulfo group or a (C1-C4) alkoxy group is preferable, and a case where one is a sulfo group and the other is a hydrogen atom is more preferable. It is preferable that any one of $R^5$, $R^6$, and $R^7$ is selected from a sulfo group, a carboxyl group, a sulfopropoxy group, a hydroxy group or hydroxy (C1-C4) alkylsulfonyl group, More preferably a sulfo group or a carboxyl group, and still more preferably a sulfo group, either one of the others is a hydrogen atom, a sulfo group, a carboxyl group, an (C1-C4) alkyl group, a nitro group or an aminosulfonyl group, and more preferably a hydrogen atom, a sulfo group or a carboxyl group, and the remaining one is a hydrogen atom, a sulfo group, toluenesulfonyl amino group or an acetylamino group, and more preferably a hydrogen atom.

A combination of these preferable kinds with one another is more preferable, a combination of preferable kinds with more preferable kinds is more preferable, and a combination of more preferable kinds with one another is most preferable.

The salt of the compound represented by the formula (Bk-1) is an inorganic or organic cationic salt. Although specific examples of the inorganic salt thereof include an alkali metal salt, an alkaline-earth metal, salt and an ammonium salt, and preferable inorganic salts are salts of lithium, sodium, and potassium and ammonium salts, and examples of salts of the organic cationic salt include a salt of the compound represented by the following formula (Bk-2), there is no limitation thereto.

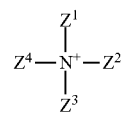

(Bk-2)

(In the formula (Bk-2), $Z^1$, $Z^2$, $Z^3$, and $Z^4$ each independently represent an alkyl group, a hydroxyalkyl group or a hydroxyalkoxyalkyl group.)

Examples of the alkyl group of $Z^1$, $Z^2$, $Z^3$, and $Z^4$ in the formula (Bk-2) include methyl, ethyl, n-propyl, isopropyl, n-butyl, isobutyl, sec-butyl, and tert-butyl. Examples of the hydroxyalkyl group include a hydroxy (C1-C4) alkyl group such as a hydroxymethyl group, a hydroxyethel group, a 3-hydroxypropyl group, a 2-hydroxypropyl group, a 4-hydroxybutyl group, a 3-hydroxybutyl group, and a 2-hydroxybutyl group. Examples of the hydroxyalkoxyalkyl group include hydroxy (C1-C4) alkoxy (C1-C4) alkyl group such as a hydroxyethoxymethyl group, 2-hydroxyethoxyethyl group, a 3-hydroxyethoxypropyl group, a 2-hydroxyethoxypropyl group, a 4-hydroxyethoxybutyl group, a 3-hydroxyethoxybutyl group, and a 2-hydroxyethoxybutyl group. Among these, a hydroxyethoxy (C1-C4) alkyl group is preferable. Particularly preferable examples are a hydrogen atom; a methyl group; a hydroxy(C1-C4)alkyl group such as a hydroxymethyl group, hydroxyethyl group, a 3-hydroxypropyl group, a 2-hydroxypropyl group, a 4-hydroxybutyl group, a 3-hydroxybutyl group, and a 2-hydroxybutyl group, and a hydroxyethoxy (C1-C4) alkyl group such as a hydroxyethoxy methyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, and a 2-hydroxyethoxy butyl group.

In the formula (Bk-2), specific examples of $Z^1$, $Z^2$, $Z^3$, and $Z^4$ are as follows.

| Compound No. | $Z^1$ | $Z^2$ | $Z^3$ | $Z^4$ |
|---|---|---|---|---|
| 1-1 | H | —C2H4OH | —C2H4OH | —C$_2$H$_4$OH |
| 1-2 | CH3 | —C2H4OH | —C2H4OH | —C$_2$H$_4$OH |
| 1-3 | H | —CH2CH(OH)CH3 | —CH2CH(OH)CH3 | —CH2CH(OH)CH3 |
| 1-4 | CH3 | —CH2CH(OH)CH3 | —CH2CH(OH)CH3 | —CH2CH(OH)CH3 |
| 1-5 | H | —C2H4OH | H | —C$_2$H$_4$OH |
| 1-6 | CH3 | —C2H4OH | H | —C$_2$H$_4$OH |
| 1-7 | H | —CH2CH(OH)CH3 | H | —CH2CH(OH)CH3 |
| 1-8 | CH3 | —CH2CH(OH)CH3 | H | —CH2CH(OH)CH3 |
| 1-9 | CH3 | —C2H4OH | CH3 | —C$_2$H$_4$OH |
| 1-10 | CH3 | —CH2CH(OH)CH3 | CH3 | —CH2CH(OH)CH3 |

It is possible for the compound represented by formula (Bk-1) to be manufactured by the method disclosed in Japanese Patent No. 4764829.

Although suitable examples of the compound represented by formula (Bk-1) are not particularly limited, specific examples include the following structures.

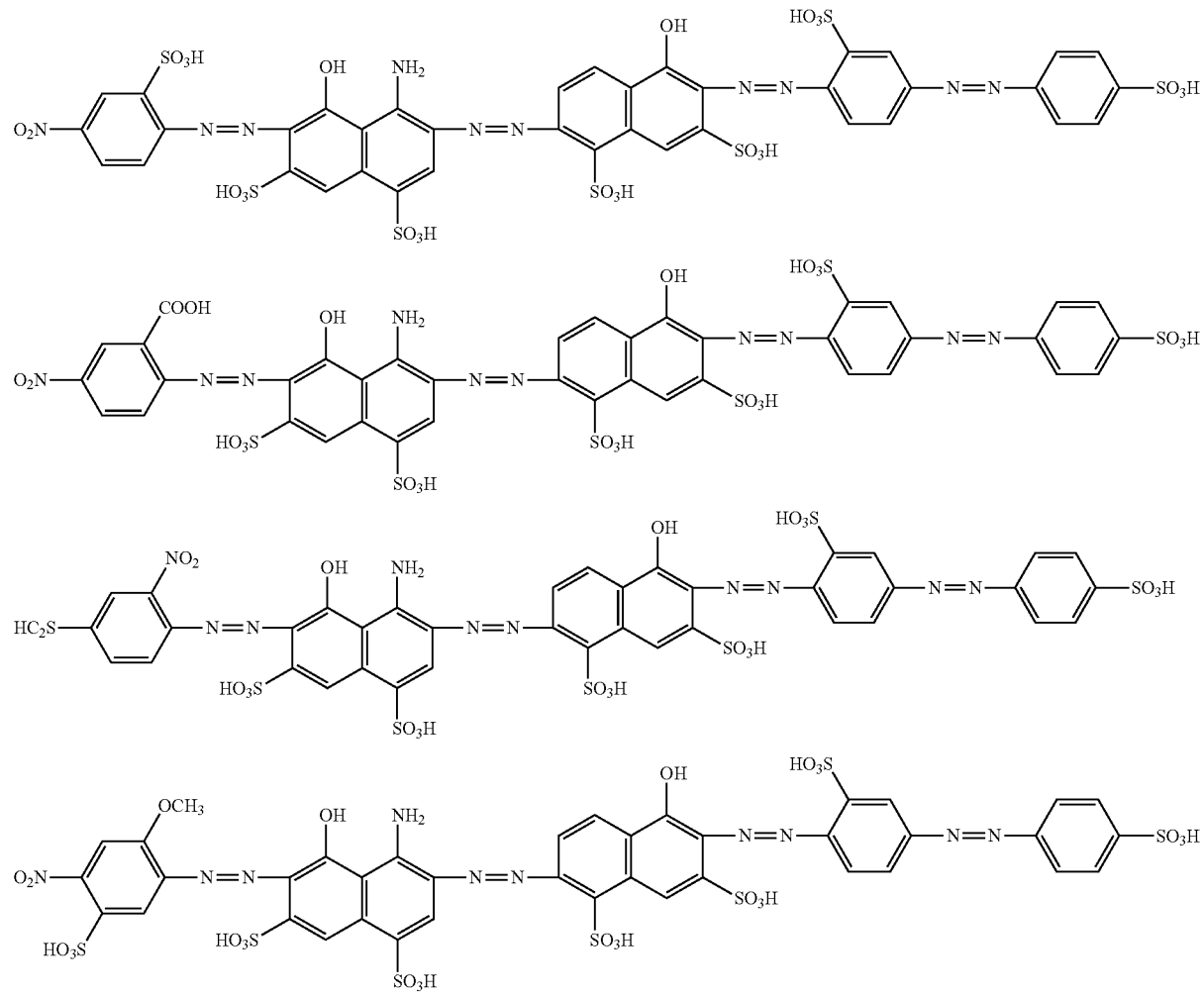

-continued
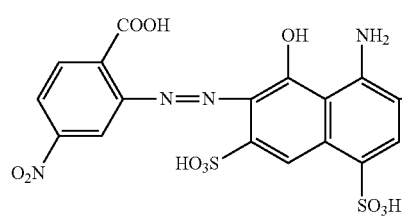 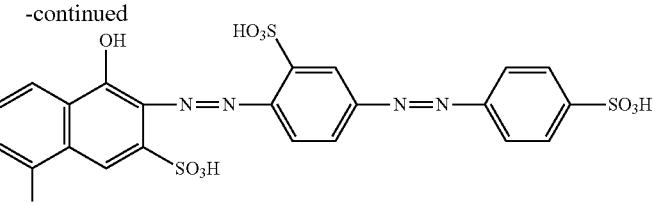
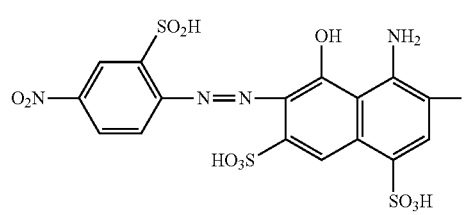 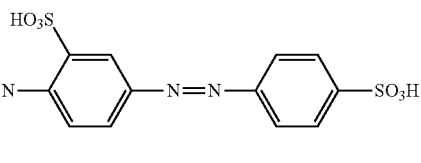
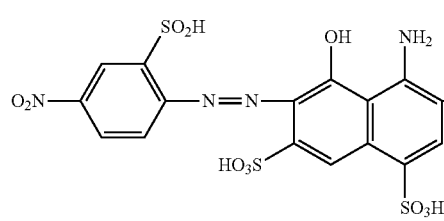 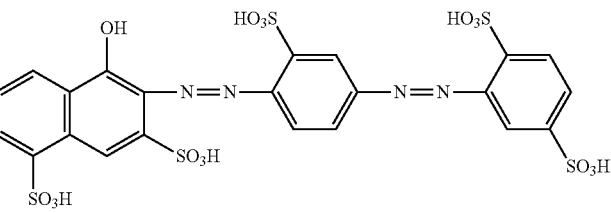
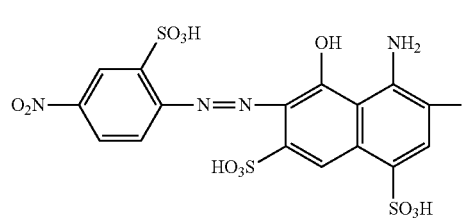 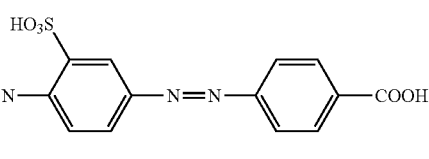
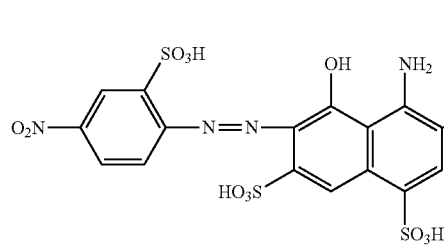 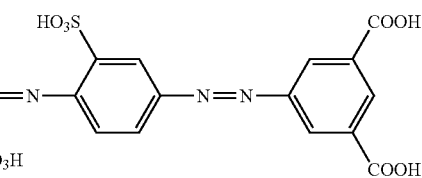
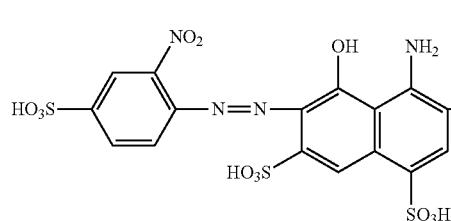 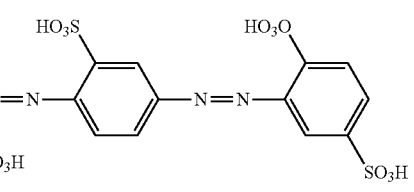
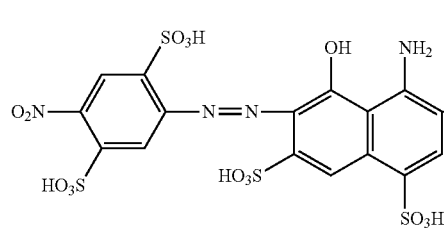 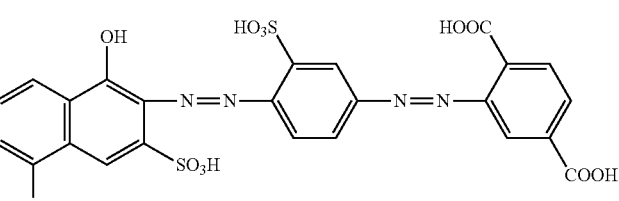

-continued
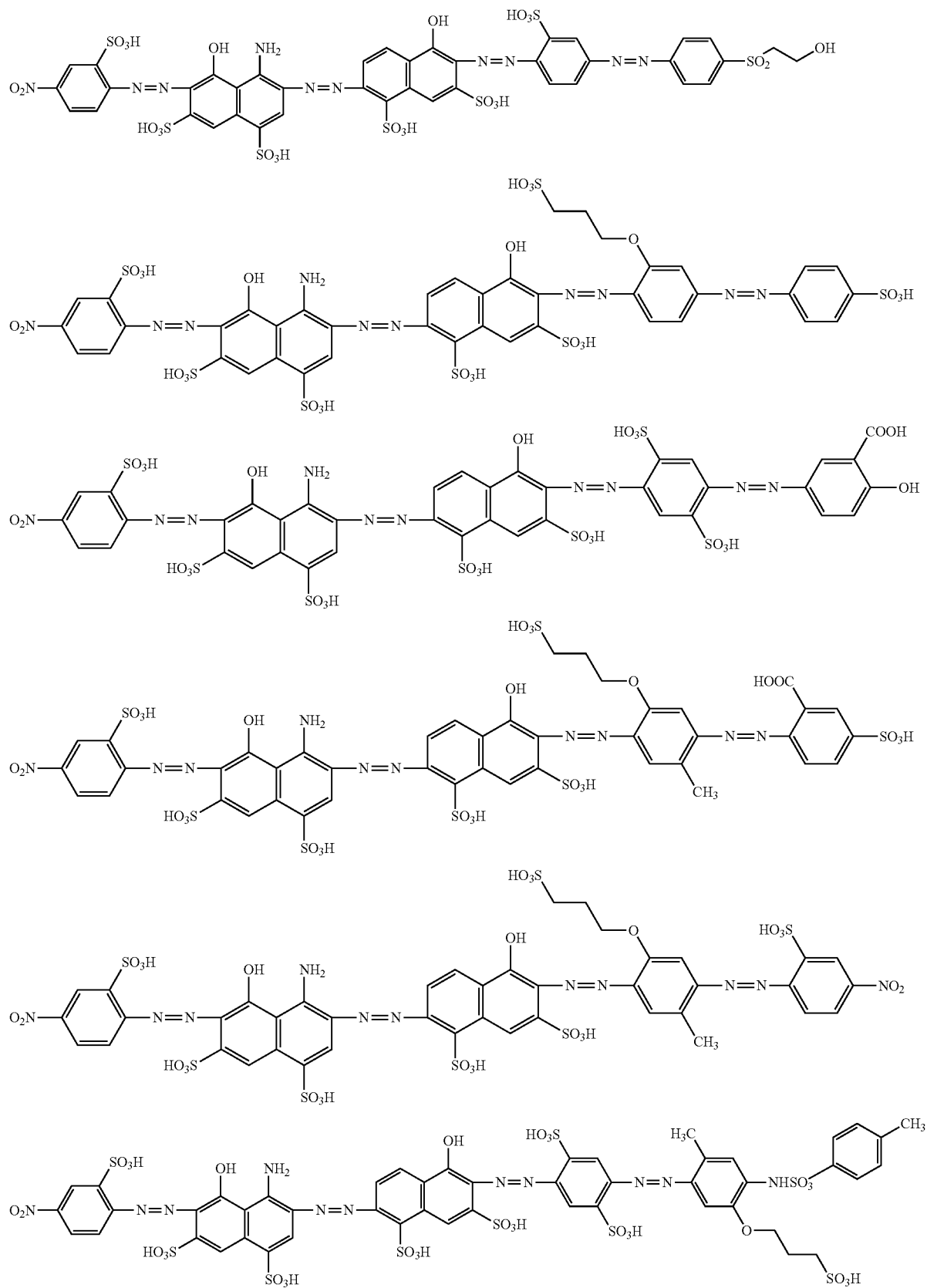

-continued

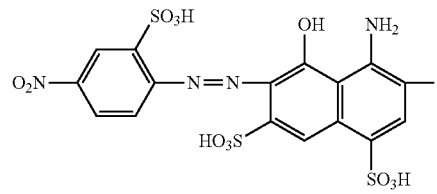

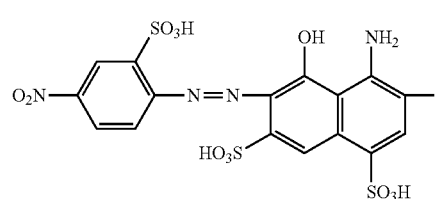

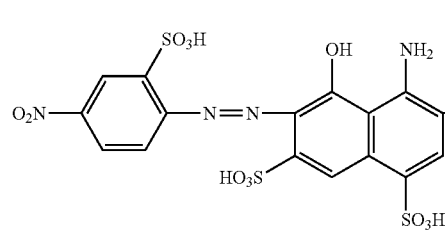

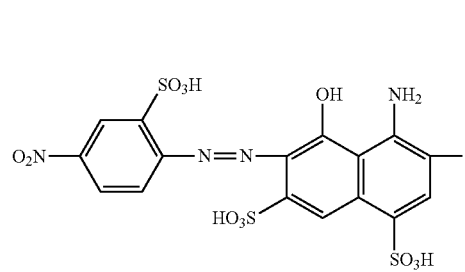

The content of the coloring material represented by the formula (Bk-1) is preferably 2.0 to 7.5 mass % to the total content of the ink, more preferably 2.5 to 5.0 mass %, and still more preferably 3.0 to 4.5 mass %. By the content of the coloring material represented by the formula (Bk-1) being within the above range, a visually superior black tends to be exhibited.

Dye (Bw-1) Represented by Formula (Bw-1)

Below the coloring material represented by the formula (Bw-1) will be described in detail. The coloring material represented by the formula (Bw-1) is a color correction for color correction of the coloring material represented by the formula (Bk-1). Therefore, in the ink, it is possible for the hue of an image formed using the ink to easily approach a neutral color by adjusting the content of the coloring material represented by the formula (Bk-1) and the coloring material represented by the formula (Bw-1) or the content ratio of the dyes. That is, the tone of an image recorded using the can express superior black to the naked eye, by the complementary action between the coloring material represented by the formula (Bk-1) and the coloring material represented by the formula (Bw-1).

In the specification, the wording "superior black" signifies a color in which the a* value of the image is in a range from −3 to 3, and the b* value is in the range from −3 to 3. The a* value and the b* value are stipulated by the International Commission on Illumination (CIE) as an L*a*b* color system.

It is possible to obtain an image with superior color development by the coloring material represented by the formula (Bw-1) being included in the ink with the coloring material represented by the formula (Bk-1). In particular, even in a case of performing recording of an image with a high duty value using the ink containing the coloring material represented by the formula (Bk-1) and the coloring material represented by the formula (Bw-1), it is difficult for a bronzing phenomenon to occur. The wording "bronzing phenomenon" refers to a phenomenon that easily occurs in the case where recording of an image is carried out at high duty value, and is a phenomenon in which the chromagenicity and hue are impaired by expressing a hue different to the original hue or expressing a metallic gloss.

The wording "duty value" refers to a value calculated by "duty (%)=actual number of discharged dots/(vertical resolution×horizontal resolution)×100 (in the formula, the "actual number of discharged dots" is the actual number of dots discharged per unit area, and the "vertical resolution" and the "horizontal resolution" are both resolutions per unit area)".

The coloring material represented by the formula (Bw-1) includes a substance that does not easily breakdown in the ink, similarly to the coloring material represented by the formula (Bk-1). Therefore, the ink has superior storage stability. The coloring material represented by the formula (Bw-1) includes a substance that does not easily breakdown in the ink even when irradiated with light and exposed to gases (in particular, ozone) in the atmosphere, similarly to the coloring material represented by the formula (Bk-1). Therefore, an image formed using the ink has excellent light resistance and gas resistance (in particular, ozone resistance), and color changes or fading due to the influence of light or the atmosphere are not easily caused. Since the coloring material represented by the formula (Bk-1) and the coloring material represented by the formula (Bw-1) ace synergistically in the ink, the storage stability of the ink is further improved, and the color density, light resistance, ozone resistance and the like of an image recorded using the ink are further improved.

The content ratio A (dye (Bk-1):dye (Bw-1)) of the dye (Bk-1) and the dye (Bw-1) is 100:18 to 100:40, and preferably 100:18 to 100:37.5, and more preferable 100:18 to 100:35. By the content ratio A being within the above range, the hue is further improved (further approaches a neutral color).

Below the dye (Bw-1) represented by the formula (Bw-1) is shown.

sulfonylamino group in which a benzene ring is substituted with at least one group selected from a halogen atom, a (C1-C4)alkyl group, a nitro group, a sulfo group, and a carboxy group.)

In the formula (Bw-1), X represents a bivalent crosslinking group.

In formula (Bw-1), examples of the halogen atom in $R^{21}$ to $R^{28}$ include a fluorine atom, a chlorine atom, a bromine atom, and an iodine atom. Among these, a fluorine atom, a chlorine atom, and a bromine atom are preferable, and an iodine atom is particularly preferable.

In formula (Bw-1), examples of the (C1-C4) alkyl group in $R^{21}$ to $R^{28}$ include linear or branched groups, and a linear group is preferable. Examples of the (C1-C4) alkyl group include linear groups such as methyl, ethyl, n-propyl, and n-butyl; and branched groups such as isopropyl, isobutyl, sec-butyl, and t-butyl. Preferable examples include methyl and ethyl, and methyl is particularly preferable.

In formula (Bw-1), examples of the (C1-C4) alkoxy group in $R^{21}$ to $R^{28}$ include linear or branched groups. Specific examples include linear groups such as methoxy, ethoxy, n-propoxy, and n-butoxy; and branched groups such as isopropoxy, isobutoxy, sec-butoxy, and t-butoxy. Preferable specific examples include methoxy and ethoxy, and methoxy is particularly preferable.

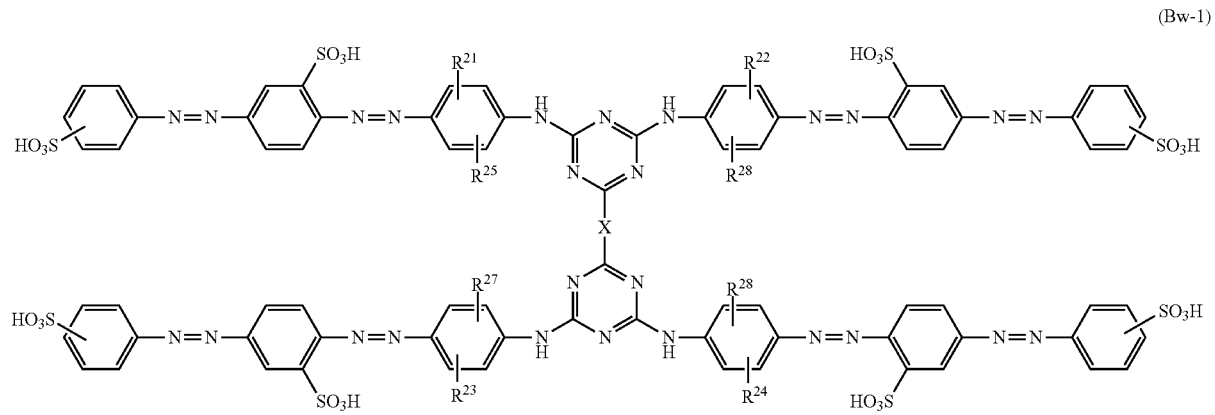

(Bw-1)

(in formula (Bw-1), $R^{21}$, $R^{22}$, $R^{24}$, $R^{25}$, $R^{26}$, $R^{27}$ and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4) alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4)alkyl group, a nitro group, a sulfo group, and a carboxy group; a benzenesulfonylamino group; or a phenyl- In formula (Bw-1), in $R^{21}$ to $R^{28}$, examples of the (C1-C4) alkoxy group substituted with at least one group selected from a group consisting of a hydroxy group, a (C1-C4) alkoxy group, a hydroxy-(C1-C4) alkoxy group, a sulfo group, and a carboxy group as a substituent include groups having the substituent at an arbitrary carbon atom in a (C1-C4) alkoxy group. The number of the substituents is normally one or two, and preferably one. Although the position of the substituents is not particularly limited, a position at which two or more oxygen atoms are not substituted for the same carbon atom is preferable. Specific examples include a hydroxy (C1-C4) alkoxy group such as 2-hydroxyethoxy, 2-hydroxypropoxy, and 3-hydroxypropoxy; a (C1-C4) alkoxy (C1-C4) alkoxy group such as methoxyethoxy, ethoxyethoxy, n-propoxy-ethoxy, iso-propoxy-ethoxy, n-butoxyethoxy, methoxy propoxy, ethoxy propoxy, n-propoxy propoxy, isopropoxy butoxy, and n-propoxy butoxy; a hydroxy (C1-C4) alkoxy (C1-C4) alkoxy group such as 2-hydroxy-ethoxy ethoxy; a carboxy (C1-C4) alkoxy group such as carboxymethoxy, 2-carboxyethoxy, and 3-carboxypropoxy; and a sulfo (C1-C4) alkoxy group such as 2-sulfoethoxy, 3-sulfopropoxy, and 4-sulfobutoxy.

In formula (Bw-1), examples of the (C1-C4) alkylcarbonylamino group in $R^{21}$ to $R^{28}$ include linear or branched groups, and a linear group is preferable. Specific examples include linear groups such as acetylamino (methylcarbonylamino), ethylcarbonylamino, propylcarbonylamino, and butylcarbonylamino; and branched groups such as isopropyl carbonyl amino, and t-butyl carbonyl amino.

In the formula (Bw-1), specific examples of the (C1-C4) alkylcarbonylamino group substituted with a carboxy group in $R^{21}$ to $R^{28}$ include carboxy (C1-C4) alkylcarbonylamino groups such as 2-carboxyethylcarbonylamino, 3-carboxypropylcarbonylamino and the like. The number of the substituents of the carboxy group is normally one or two, and preferably one.

In formula (Bw-1), in $R^{21}$ to $R^{28}$, examples of the mono (C1-C4) alkyl ureido group include groups in which the alkyl moiety is linear or branched. Although the substitution position of the (C1-C4) alkyl is not particularly limited, substitution is preferable at "N'". In the specification, the wording "mono-(C1-C4) alkylureido group" signifies a "(C1-C4) alkyl NH—CO—NH—" group or a "H₂N—CO—N((C1-C4) alkyl)-" group, and, in the benzene ring to which $R^{21}$ to $R^{28}$ are bonded, the nitrogen atom which is directly bonded to the benzene ring is denoted as "N" and the nitrogen atom which is bonded to the benzene ring via the nitrogen atom and a carbonyl (CO) group is denoted as "N'". Accordingly, as the substitution position of the (C1-C4) alkyl, the former is "N'", and the latter is "N". Specific examples include a linear groups such as N'-ethyl ureido, N'-propyl ureido, N'-butyl ureido, and branched groups such as N'-isopropyl ureido, N'-isobutyl ureido, N'-t-butyl ureido.

In the formula (Bw-1), examples of the (C1-C4) alkylene ureido group in $R^{21}$ to $R^{28}$ include linear or branched groups. The substitution position of the (C1-C4) alkyl is not particularly limited, and although "N'" and "N" may be substituted one at a time or two "N'" may be substituted based on the substitution position in the "mono-(C1-C4) alkyl ureido group"; the latter is preferable. Although two of the above (C1-C4) alkyls may be the same or different, it is preferable that they are the same. Specific examples thereof include linear groups such as N', N'-dimethyl-ureido, N', N'-diethyl ureido, N', N'-di-propyl-ureido, and N', N' dibutyl ureido; and branched groups such as N', N'-diisopropyl ureido, and N', N'-diisobutyl ureido.

In formula (Bw-1), in $R^{21}$ to $R^{28}$, examples of the mono-(C1-C4) alkylureido group substituted with at least one group selected from a group consisting of a hydroxy group, a sulfo group, and a carboxy group as a substituent include groups having the substituent at an arbitrary carbon atom in the mono-(C1-C4) alkylureido group. The number of substituents is normally one or two, and preferably one. Although the position of the substituents is not particularly limited, one in which a nitrogen atom and a hydroxy group are not substituted for the same carbon atom is preferable. Specific examples include N'-mono(hydroxy (C1-C4) alkyl) ureido groups such as N'-2-hydroxyethyl ureido, and N'-3-hydroxy-propyl-ureido; N'-mono(sulfo (C1-C4) alkyl) ureido groups such as N'-2-sulfo ethyl ureido, and N'-3-sulfo-propyl-ureido; and N'-mono(carboxy (C1-C4) alkyl) ureido groups such as N'-carboxymethyl ureido, N'-2-carboxyethyl ureido, N'-3-carboxypropyl ureido, and N'-4-carboxybutyl ureido.

In formula (Bw-1), in $R^{21}$ to $R^{28}$, examples of the di-(C1-C4) alkylureido group substituted with at least one group selected from a group consisting of a hydroxy group, a sulfo group, and a carboxy group as a substituent include groups having the substituent at an arbitrary carbon atom in the di-(C1-C4) alkylureido group. The number of the substituents is normally one or two, and preferably two. Although the position of the substituents is not particularly limited, one in which a nitrogen atom and a hydroxy group are not substituted for the same carbon atom is preferable. When a plurality of substituents is included, although the types thereof may be the same or different, it is preferable that they are the same. Specific examples include N',N'-di(hydroxy (C1-C4) alkyl) ureido groups such as N',N-di(2-hydroxyethyl) ureido, N',N-di(2-hydroxy propyl) ureido, and N',N'-di(3-hydroxy propyl) ureido; N',N'-di(sulfo (C1-C4) alkyl) ureido groups such as N'N'-di(3-sulfo propyl) ureido; and N'N'-di(carboxy (C1-C4) alkyl) ureido groups such as N'N'-dicarboxymethyl ureido.

In formula (Bw-1), in $R^{21}$ to $R^{28}$, examples of the benzoylamino group in which the benzene ring is substituted with at least one type of group selected from a group consisting of a halogen atom (examples include a fluorine atom, a chlorine atom, a bromine atom, and an iodine atom, and a chlorine atom is particularly preferable), a (C1-C4) alkyl group, a nitro group, a sulfo group and a carboxy group include those having one to 3, and preferable one or two, of these substituents. When a plurality of substituents is included, although the types thereof may be the same or different, it is preferable that they are the same. Specific examples thereof include halogen atom-substituted benzoylamino groups such as 2-chlorobenzoylamino, 4-chlorobenzoylamino, and 2,4-dichlorobenzoylamino; (C1-C4) alkyl-substituted benzoylamino groups such as 2-methylbenzoylamino, 3-methyl-benzoylamino, and 4-methylbenzoylamino; nitro-substituted benzoylamino groups such as 2-nitro-benzoylamino, 4-nitro-benzoylamino, and 3,5-dinitro-benzoylamino; sulfo-substituted benzoylamino groups such as 2-sulfo-benzoylamino, and 4-sulfo-benzoylamino; carboxy-substituted benzoylamino groups such as 2-carboxy-benzoylamino, 4-carboxy-benzoylamino, and 3,5-dicarboxy-benzoylamino.

In formula (Bw-1), in $R^{21}$ to $R^{28}$, examples of the phenylsulfonylamino group in which a benzene ring is substituted with at least one group selected from the group consisting of a halogen atom, a (C1-C4) alkyl group, a nitro group, a sulfo group, and a carboxy group as a substituent include groups in which the number of the substituents is one to three, preferably one or two, and most preferably one. When a plurality of substituents is included, the types thereof may be the same or different. Specific examples thereof include halogen atom-substituted phenylsulfonylamino groups such as 2-chlorophenylsulfonylamino, and 4-chlorophenylsulfonylamino; (C1-C4) alkyl-substituted phenylsulfonylamino groups such as 2-methylphenylsulfonylamino, 4-methylphenylsulfonylamino, and 4-t-butyl-phenylsulfonylamino; nitro-substituted phenylsulfonylamino groups such as 2-nitro-phenylsulfonylamino, 3-nitro-phenylsulfonylamino, and 4-nitro-phenylsulfonylamino; sulfo-substituted phenylsulfonylamino groups such as 3-sulfo-phenylsulfonylamino, and 4-sulfo-phenylsulfonylamino; carboxy-substituted phenylsulfonylamino groups such as 3-carboxy-phenylsulfonylamino, and 4-carboxy-phenylsulfonylamino.

In the formula (Bw-1), it is preferable that $R^{21}$ and $R^{28}$ are a (C1-C4) alkoxy group substituted with a hydrogen atom, a halogen atom, a (C1-C4) alkyl group, a (C1-C4) alkoxy group, a sulfo group or a carboxy group and a (C1-C4) alkylcarbonylamino group. Among these, a hydrogen atom, methyl, ethyl, t-butyl, 2-carboxy ethoxy, 3-carboxy propoxy, 2-sulfo ethoxy, 3-sulfo propoxy, and 4-sulfo butoxy are more preferable. Even among these, a hydrogen atom, methyl, and 3-sulfo propoxy are particularly preferable.

In the formula (Bw-1), it is preferable that $R^{21}$ to $R^{28}$ are a (C1-C4) alkoxy group substituted with at least one sulfo group. It is more preferable that $R^{21}$ to $R^{24}$ are each independently a hydrogen atom, a (C1-C4) alkyl group, or a (C1-C4) alkoxy group substituted with a sulfo group, and at least one of $R^{21}$ to $R^{24}$ is a (C1-C4) alkoxy group substituted with a sulfo group, and $R^{25}$ to $R^{28}$ are each independently a hydrogen atom or a (C1-C4) alkyl group. It is still more preferable that at least one of $R^{25}$ and $R^{28}$ is a sulfopropoxy group, at least one of $R^{23}$ and $R^{24}$ is a sulfopropoxy group, and $R^{21}$ to $R^{28}$ are (C1-C4) alkyl groups.

In formula (Bw-1), although the position of $R^{21}$ to $R^{28}$ to be substituted is not particularly limited, it is preferable that, in each benzene ring in which $R^{21}$ to $R^{28}$ are substituted, the substitution position of the nitrogen atom bonding to the triazine ring is the first position, the substitution position of the azo group is the fourth position, and $R^{21}$ to $R^{24}$ are substituted at the second position, and $R^{25}$ to $R^{23}$ are substituted at the fifth position.

In formula (Bw-1), the crosslinking group represented by X is not particularly limited as long as it is a bivalent group within a range where a compound represented by the formula (Bw-1) exhibits solubility in water. Here, regarding the solubility of the compound represented by the formula (Bw-1) in water, 5 g or more of the compound represented by the formula (Bw-1) is usually dissolved with respect to 1 liter of water, 10 g or more is preferable, 25 g or more is more preferable, 50 g or more is still more preferable, and 100 g or more is particularly preferable, respectively. Specific examples thereof include bivalent atoms such as nitrogen atoms, oxygen atoms, and sulfur atoms, (preferably bivalent hetero atoms); an alkylenediamino group, an alkylenedioxy group, or an alkylenethio group, each with (C1-C8); an N,N'-hydrazine-diyl group; an amino alkoxyalkylamino group in which two alkylamino groups are substituted for an oxygen atom; and a group in which one of an amino group and an alkylamino group is substituted at the end of an alkylene oxide chain including one or more ether bonds of the aminoalkoxyalkoxyalkylamino group. The bivalent crosslinking group represented by X may include a group selected from the group consisting of a hydroxy group, a carboxy group, and an alkoxy group, as a substituent for a carbon atom; and an alkyl group in which an alkyl moiety may be substituted with a hydroxy group or a carboxy group as a substituent for a nitrogen atom, respectively.

In formula (Bw-1), it is preferable that the bivalent crosslinked group expressed by X is any group selected from a group formed of a (C1-C8) alkylenediamino group; a (C1-C8) alkylenediamino group substituted with a hydroxy group or a carboxy group; an N—(C1-C4) alkyl-(C1-C6) alkylenediamino group; an N—(C1-C4) alkyl-(C1-C6) alkylenediamino group in which the alkyl moiety is substituted with a hydroxy group or a carboxy group; an amino (C1-C6) alkoxy (C1-C6) alkylamino group; an amino (C1-C4) alkoxy (C1-C4) alkoxy (C1-C4) alkylamino group; a xylylenediamino group; a piperazine-1,4-diyl group; a piperazine-1,4-diyl group substituted with a (C1-C4) alkyl group or a (C1-C4) alkoxy group; or a phenylenediamino group. The bivalent crosslinked groups are "diamino" groups having two of any amino group. Accordingly, the wording "diamino" includes both a case where a group of a part of piperazine-1,4 diyl or the like is removed, and crosslinking is performed with any one nitrogen atom (that is, becoming N,N-diyl) and a case where crosslinking is performed with two different nitrogen atoms (that is, becoming N,N'-diyl). Of these, the latter case of "N,N'diyl" is particularly preferable.

In formula (Bw-1), in X, examples of the (C1-C8) alkylenediamino group include linear or branched groups, and a linear group is preferable. The carbon number range is normally (C1-C8), preferably (C2-C8), more preferably (C2-C6), and still more preferably (C2-C4). Specific examples thereof include linear groups such as ethylenediamino, 1,3-propylenediamino, 1,4-butylenediamino, 1,5-pentylenediamino, 1,6-hexylenediamino, 1,7-heptylenediamino, and 1,8-octylene diamine; branched 2-methyl-1,3-propylene diamine, 3-methyl-1,4-butylenediamino, and 4-methyl-1,6-hexylenediamino.

In formula (Bw-1), in X, examples of the (C1-C8) alkylenediamino group substituted with a hydroxy group or a carboxy group include groups having these substituents at arbitrary carbon atom in the (C1-C8) alkylenediamino group. Although the number of substituents is not particularly limited, one or two is preferable. When a plurality of substituents is included, the kinds thereof may be the same as or different from one another, and are preferably the same as one another. Specific examples thereof include hydroxy-substituted (C1-C8) alkylenediamino groups such as 2-hydroxy-1,3-propylenediamino, 2-hydroxy-1,4-butylenediamino, and 3-hydroxy-1,6-hexylenediamino; carboxy-substituted (C1-C8) alkylenediamino groups such as 1-carboxy-ethylenediamino, 1-carboxy-1,3-propylenediamino, 1-carboxy-1,4-butylenediamino, 1-carboxy-1,5-pentylenediamino, and 1,5-dicarboxy-1,5-pentylenediamino.

In formula (Bw-1), in X, as the N—(C1-C4) alkyl-(C1-C6) alkylenediamino group, one nitrogen atom of the (C1-C6) alkylenediamino group signifies one substituted with a (C1-C4) alkyl group. In the specification, the nitrogen atom substituted with the (C1-C4) alkyl group from the diamino groups is denoted as "N", and other nitrogen atoms are denoted as "N'", as necessary. The range of the carbon number in the alkylene moiety is usually (C1-C6), (C2-C4) is preferable, and (C2) or (C3) is particularly preferable. Examples of the (C1-C4) alkyl group include linear or branched groups, and linear groups are preferable. Specific examples thereof include N-linear (C1-C4) alkyl-C1-C6 alkylenediamino groups such as an N-methyl ethylenediamino group, an N-ethyl ethylenediamino group, an N-propyl ethylenediamino group, and an N-butyl ethylenediamino group; N-branched (C1-C4) alkyl-C1-C6 alkylenediamino groups such as an N-isopropyl ethylenediamino group, an N-isobutyl ethylenediamino group, an N-sec-butyl ethylenediamino group, and an N-tert-butyl ethylenediamino group.

In formula (Bw-1), in X, examples of the N—(C1-C4) alkyl-(C1-C6) alkylenediamino group in which the alkyl moiety is substituted with a hydroxy group or a carboxy group include groups having these substituents for an arbitrary carbon atom of the alkyl moiety of the N—(C1-C4) alkyl group in the N—(C1-C4) alkyl-(C1-C6) alkylenediamino group. Although the position of the substituents is not particularly limited, one in which a nitrogen atom and a hydroxy group are not substituted for the same carbon atom is preferable. Examples of the carbon number range of the alkylene moiety include the same range as the N—(C1-C4) alkyl-(C1-C6) alkylenediamino group, including the same preferred groups. The carbon number range of the alkylene moiety is normally (C1-C4), preferably (C2-C4), and more preferably (C2-C3). The number of the substituents is normally one or two, and preferably one. When a plurality of substituents is included, although the types thereof may be the same or different, it is preferable that they are the same.

Specific examples thereof include N-hydroxy substituted (C1-C4) alkyl-C1-C6 alkylenediamino groups such as an N-(2-hydroxyethyl) ethylenediamino group, an N-(3-hydroxy propyl) ethylenediamino group, an N-(2-hydroxy propyl) ethylenediamino group, and an N-(4-hydroxy butyl) ethylenediamino group; N-carboxy substituted (C1-C4) alkyl-(C1-C6) alkylenediamino groups such as an N-(carboxy dimethyl) ethylenediamino group, an N-(2-carboxy ethyl) ethylenediamino group, an N-(3-carboxy propyl) ethylenediamino group, and an N-(4-carboxy butyl) ethylenediamino group.

In formula (Bw-1), in X, examples of the amino (C1-C6) alkoxy (C1-C6) alkylamino group include a linear or branched group, and a linear group is preferable. In the amino (C1-C6) alkoxy (C1-C6) alkylamino group, examples of a group having a preferable carbon number range include an amino (C2-C4) alkoxy (C2-C4) alkylamino group, examples of a group having a particularly preferable carbon number range include an amino (C2-C3) alkoxy (C2-C3) alkylamino group. Specific examples thereof include aminoethoxyethylamino, aminoethoxypropylamino, aminopropoxypropylamino, and aminoethoxypentylamino.

In formula (Bw-1), in X, examples of the amino (C1-C4) alkoxy (C1-C4) alkylamino group include a linear or branched group, and a linear group is preferable. In the amino (C1-C4) alkoxy (C1-C4) alkoxy (C1-C4) alkylamino group, examples of a group having a preferable carbon number range include an amino (C2-C4) alkoxy (C2-C4) alkoxy (C2-C4) alkylamino group, and examples of groups having a particularly preferable carbon number range include an amino (C2-C3) alkoxy (C2-C3) alkoxy (C2-C3) alkylamino group. Specific examples thereof include linear groups such as aminoethoxyethoxyethylamino, aminoethoxypropoxyethylamino, and aminoethoxybutoxyethylamino, and branched groups such as aminoethoxy (2-methyl ethoxy) ethylamino, and aminoethoxy (2-methyl propoxy) ethylamino.

In formula (Bw-1), examples of the xyleneamino group in X include an o-xyleneamino group, an m-xyleneamino group, and a p-xyleneamino group, and the m-xyleneamino group, or the p-xyleneamino group is preferable.

In formula (Bw-1), examples of the piperazine-1,4-diyl group substituted with a (C1-C4) alkyl group or a (C1-C4) alkoxy group in X include groups having these substituents for an arbitrary carbon atom of the ring-structure atoms of the piperazine ring. The number of the substituents is normally one or two, and preferably one. When a plurality of substituents is included, the types thereof may be the same or different from one another; and it is preferable that they are the same as one another. Specific examples thereof include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, and a 2-methyl-5-ethylpiperazine-1,4-diyl group.

In formula (Bw-1), examples of the phenylenediamino group in X include o-, m-, and p-phenylenediamino groups, and the m-, and p-phenylenediamino groups are preferable.

Among the above, it is preferable that X is a (C1-C8) alkylenediamino group; a (C1-C8) alkylenediamino group substituted with a carboxy group; an N—(C1-C4) alkyl-C1-C6 alkylenediamino group in which the alkyl moiety is substituted with hydroxy; an amino (C1-C4) alkoxy (C1-C4) alkoxy (C1-C4) alkylamino group; a xylylenediamino group; or a piperazine-1,4-diyl group. Among these, it is more preferable that X is a (C1-C8) alkylenediamino group; a xylylenediamino group; or a piperazine-1,4-diyl group. Among these, preferred specific examples thereof include 1,2-ethylenediamino; 1,3-propylenediamino; 1,4-butylenediamino; 1-carboxypentylene-1,5-diamino; N-2-hydroxyethyl-ethylenediamino; aminoethoxyethoxyethylamino; m-xylenediamino; or piperazine-1,4-diyl.

In formula (Bw-1), the substituent position of the four sulfo groups for which the substituent position is not specified is not particularly limited. With the substitution position of the azo bond as the first position, a sulfo group which is substituted on a benzene ring having one azo bond, may be substituted at the second, third, or fourth positions and is preferably substituted at the fourth position.

The coloring material represented by the formula (Bw-1) is preferably a compound represented by the following formula (Bw-1-1), and more preferably a compound represented by the following formula (Bw-1-2).

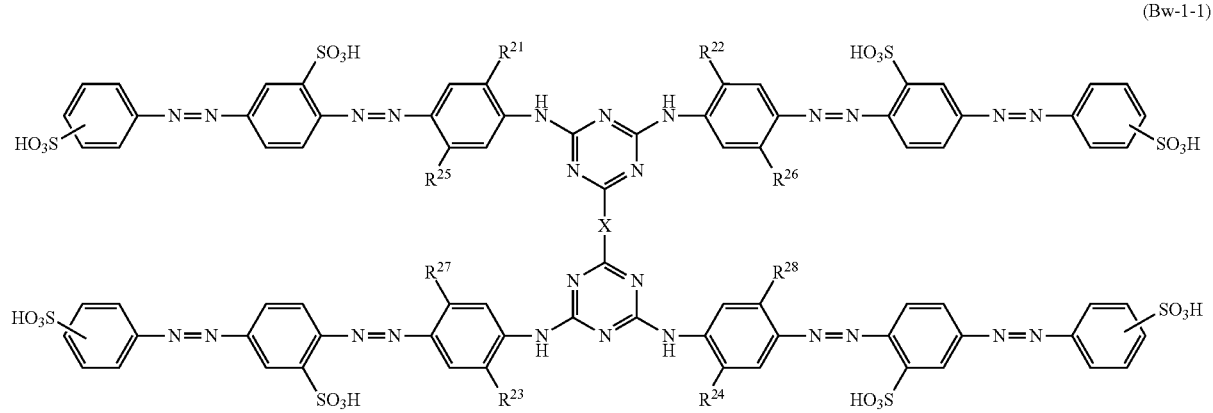

(Bw-1-1)

(In the formula (Bw-1-1), $R^{21}$ to $R^{28}$ and X represent the same meaning as in formula (Bw-1).)

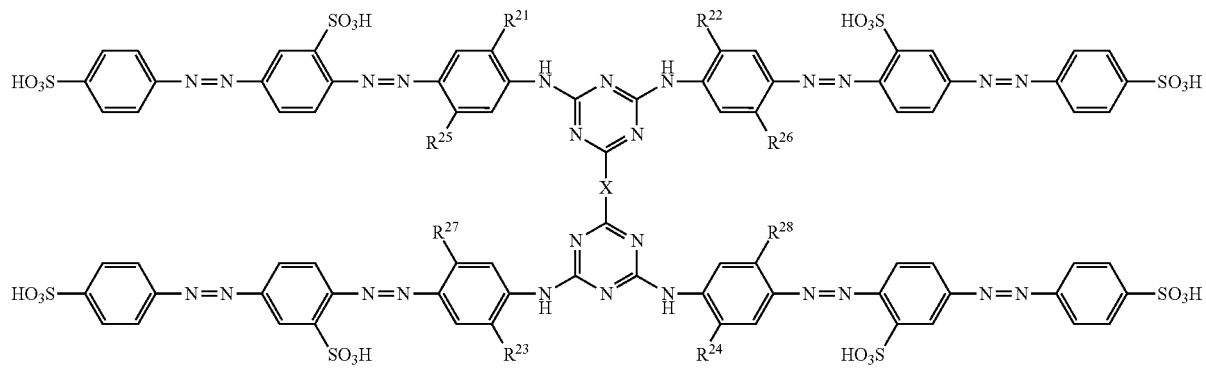

(Bw-1-2)

(In the formula (Bw-1-2), $R^{21}$ to $R^{28}$ and X represent the same meaning as in formula (Bw-1).)

Regarding $R^{21}$ to $R^{28}$ in formulae (Bw-1) to (Bw-1-2), the substitution positions of $R^{21}$ to $R^{28}$ in formula (Bw-1), and the substitution positions of the sulfo groups in which the substitution position is not specified in formulae (Bw-1) and (Bw-1-1), a compound in which preferable kinds are combined with one another is more preferable, and a compound in which more preferable kinds are combined with one another is even more preferable. Further, the same applies to combinations of preferable groups with each other, combinations of preferable groups and more preferable groups, and the like.

It is possible for a salt of a compound represented by the formula (Bw-1) to be an inorganic or organic cationic salt. Examples of the inorganic salt include an alkali metal salt, an alkaline earth metal salt, and an ammonium salt. Among these, preferable inorganic salts are alkali metal salts such as lithium, sodium, and potassium, and an ammonium salt. Although examples of the organic cationic salt include a quaternary ammonium ion represented by the above formula (Bk-2), there is no limitation thereto.

A free acid of the coloring material represented by the formula (Bw-1) and various salts thereof may be a mixture. Any combination of a mixture of a sodium salt of the coloring material represented by the formula (Bw-1) and an ammonium salt of the coloring material represented by formula (Bw-1), a mixture of a free acid of the coloring material represented by the formula (Bw-1) and a sodium salt of the coloring material represented by the formula (Bw-1), and a mixture of a lithium salt of the coloring material represented by the formula (Bw-1), a sodium salt of the coloring material represented by the formula (Bw-1), and an ammonium salt of the coloring material represented by the formula (Bw-L) may be used. There are cases where the physical properties such as solubility differ according to the type of salt, and, it is possible to obtain a mixture having suitable physical properties by selecting, as necessary, appropriate types of salt and modifying the ratio thereof in cases where a plurality of salts and the like are included.

Although suitable specific examples of the coloring material represented by the formula (Bw-1) are not particularly limited, examples included compounds and the like represented by the structural formula shown below. The functional groups of the sulfo group, the carboxy group, and the like in each table are disclosed in the form of free acids for convenience.

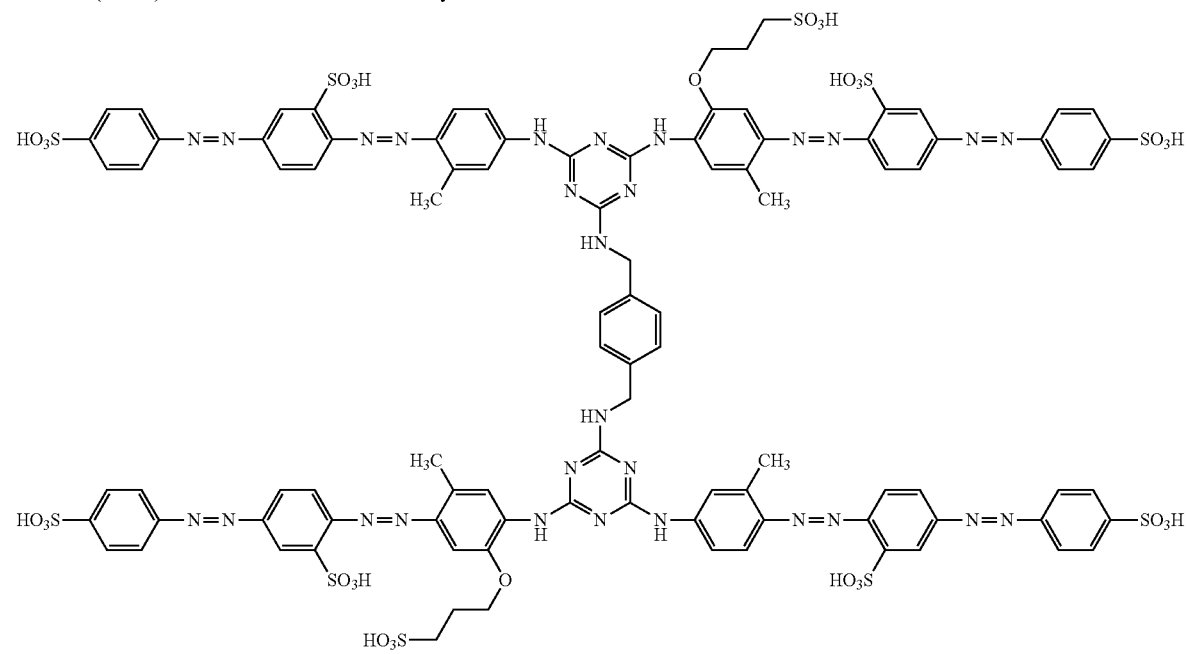

-continued
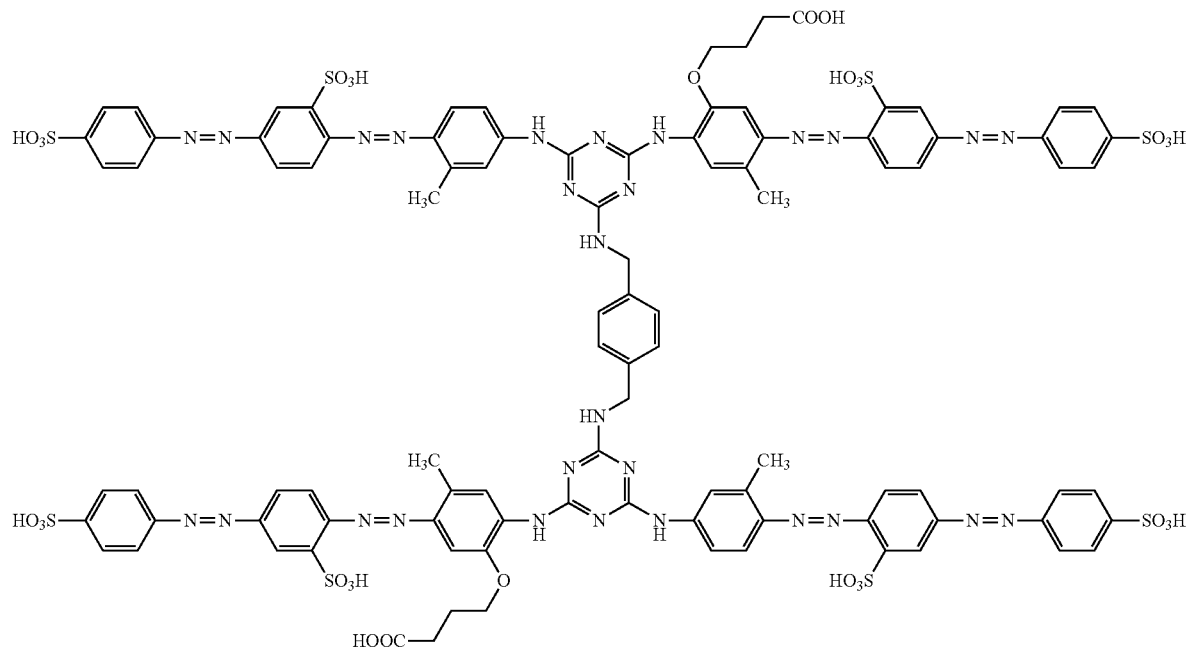
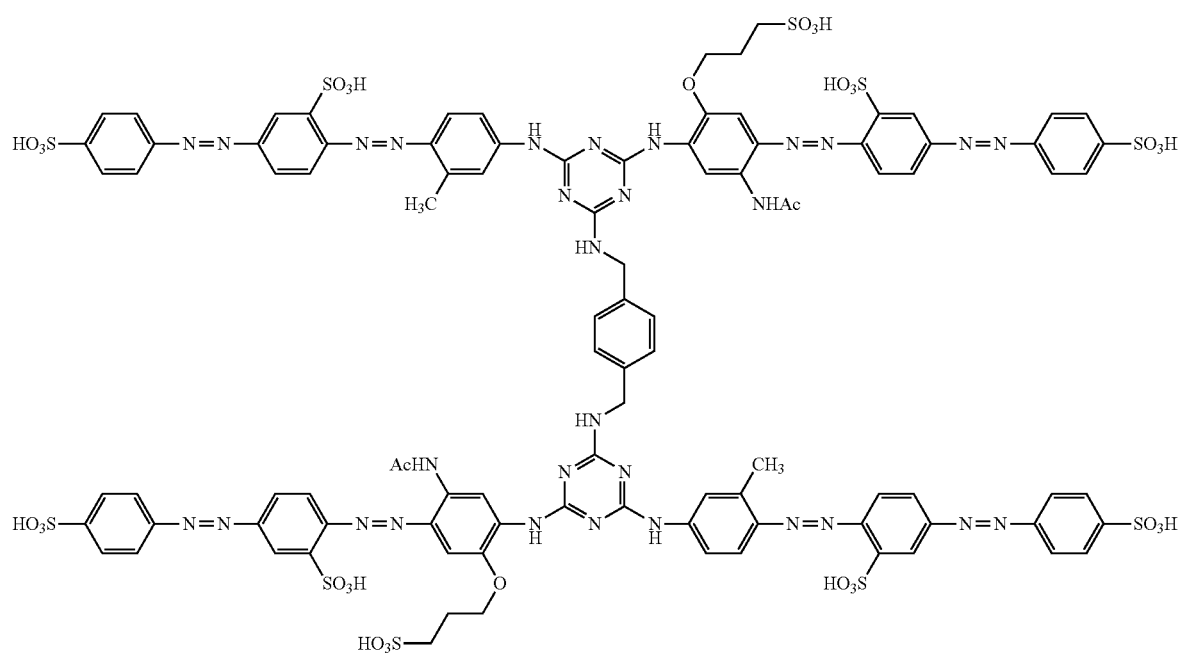

33 34
-continued
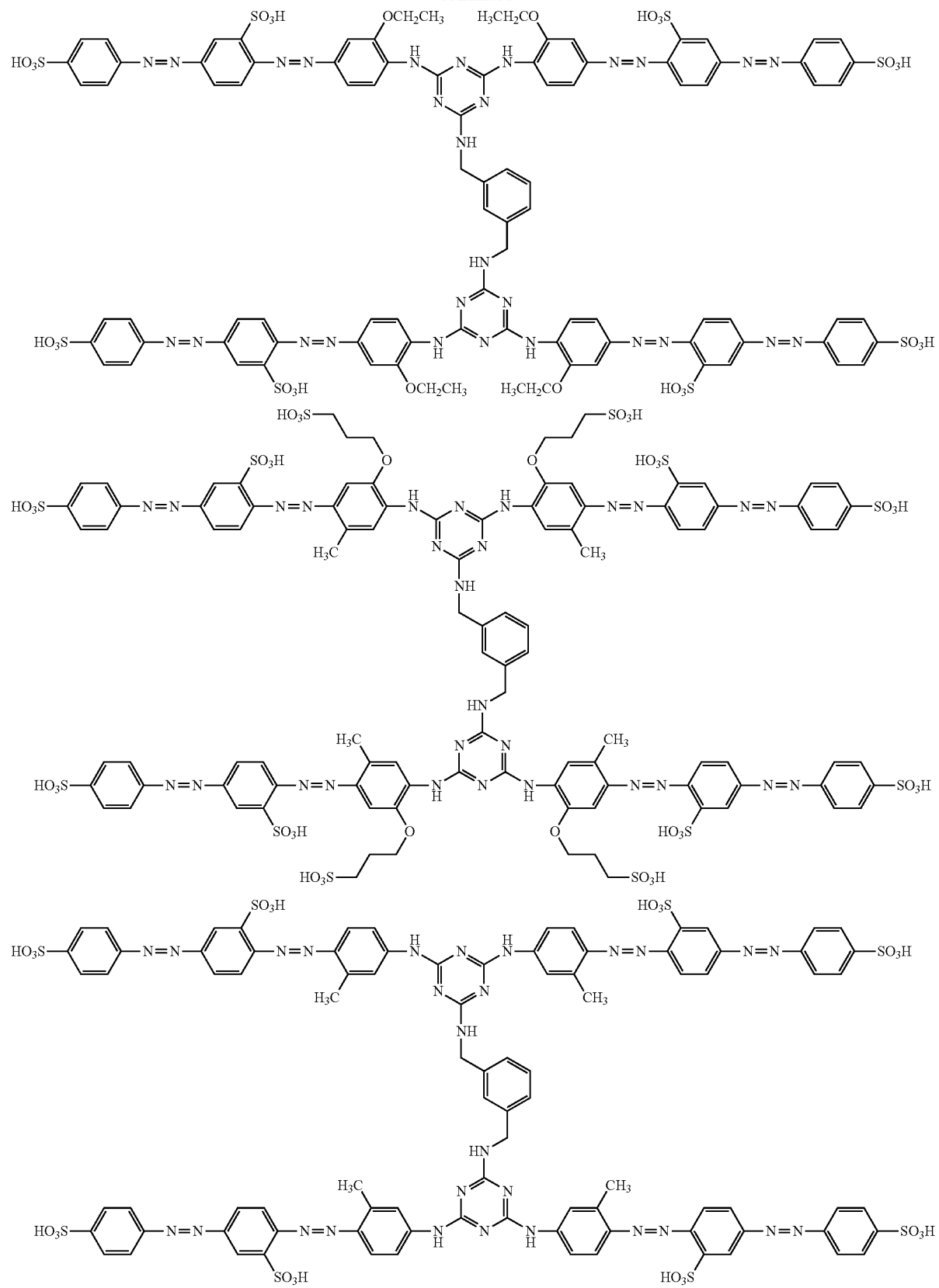

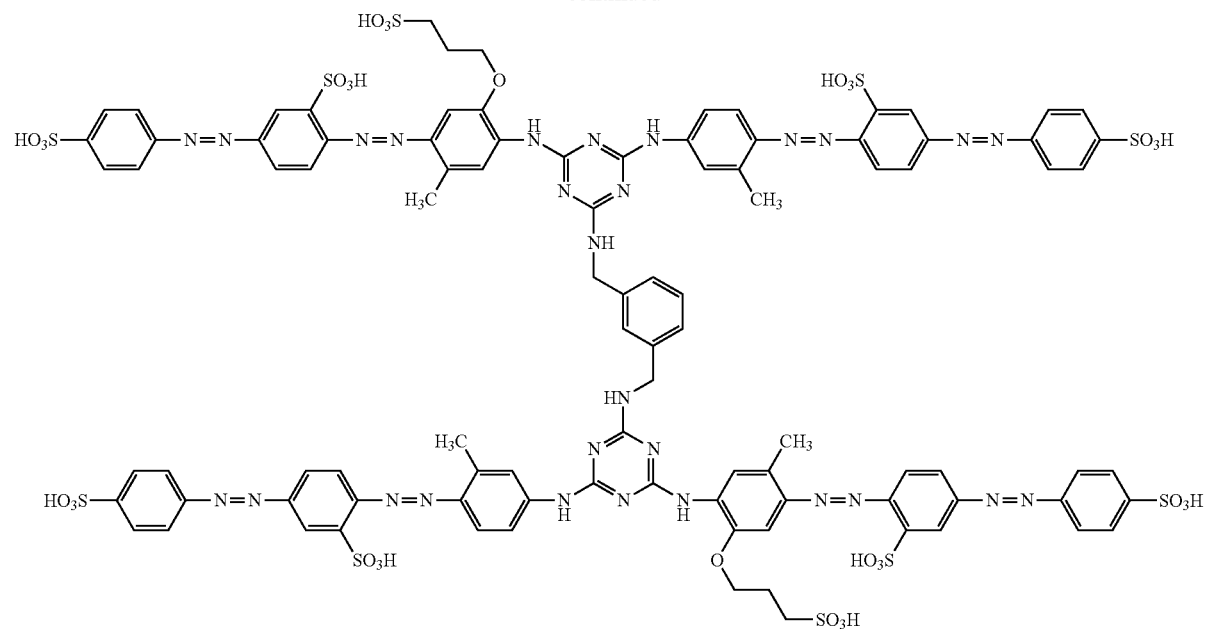
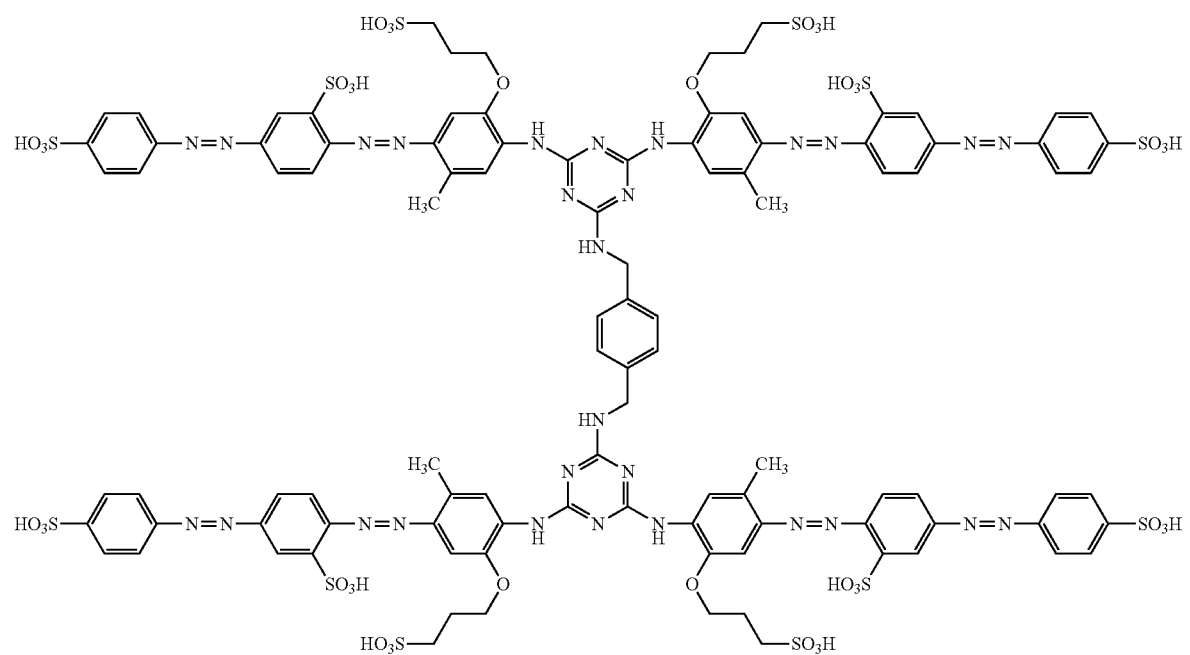

-continued
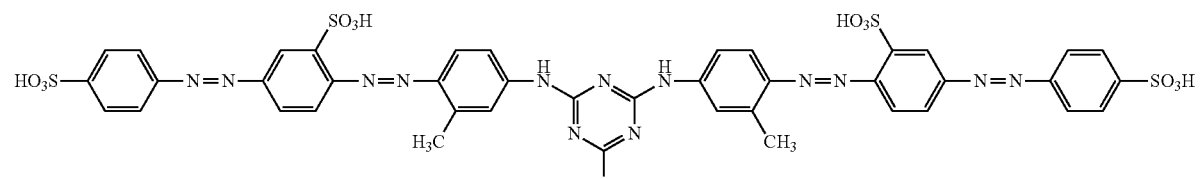
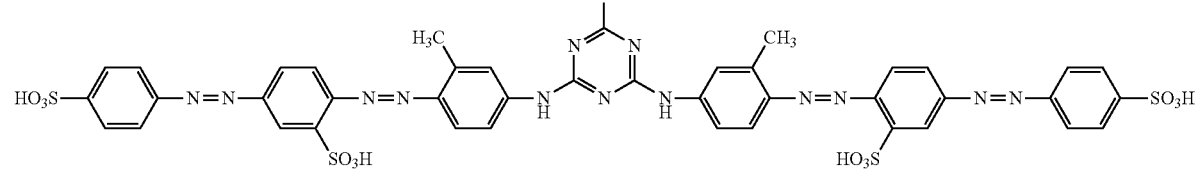
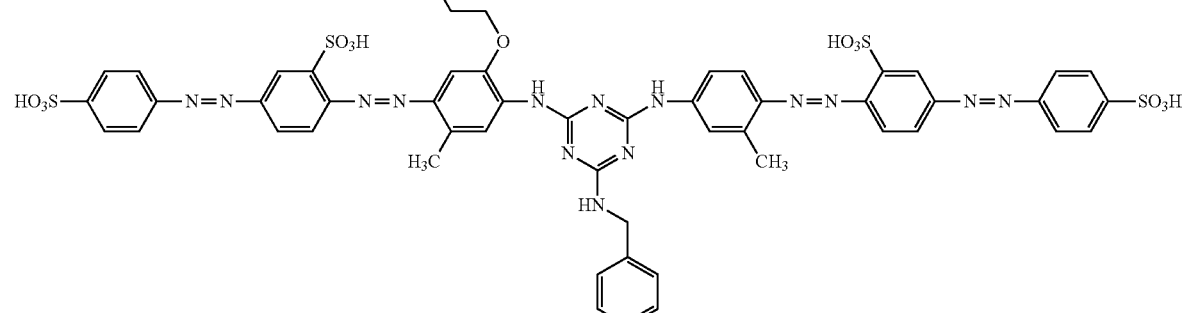
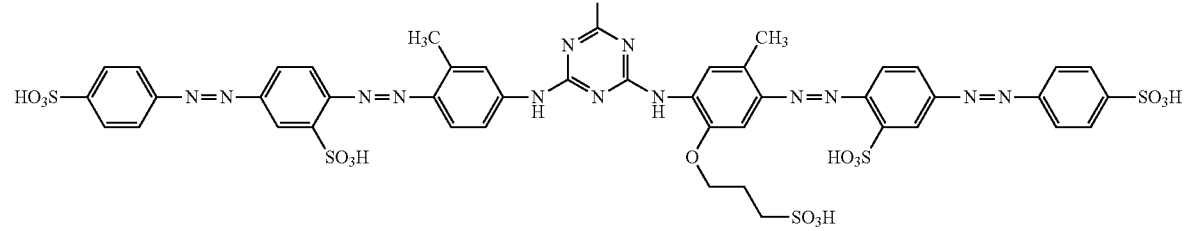
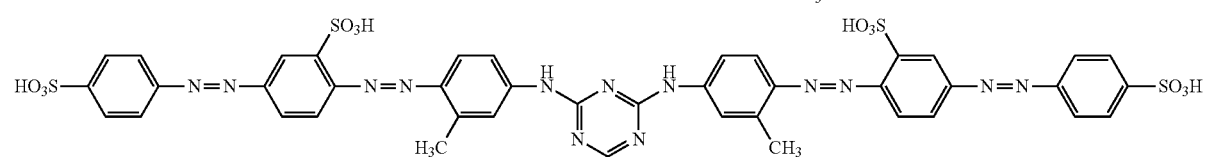
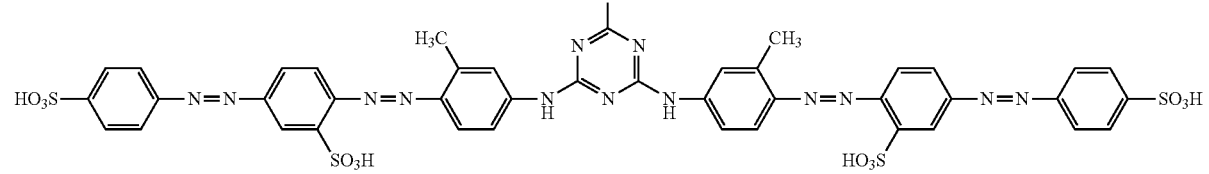

-continued
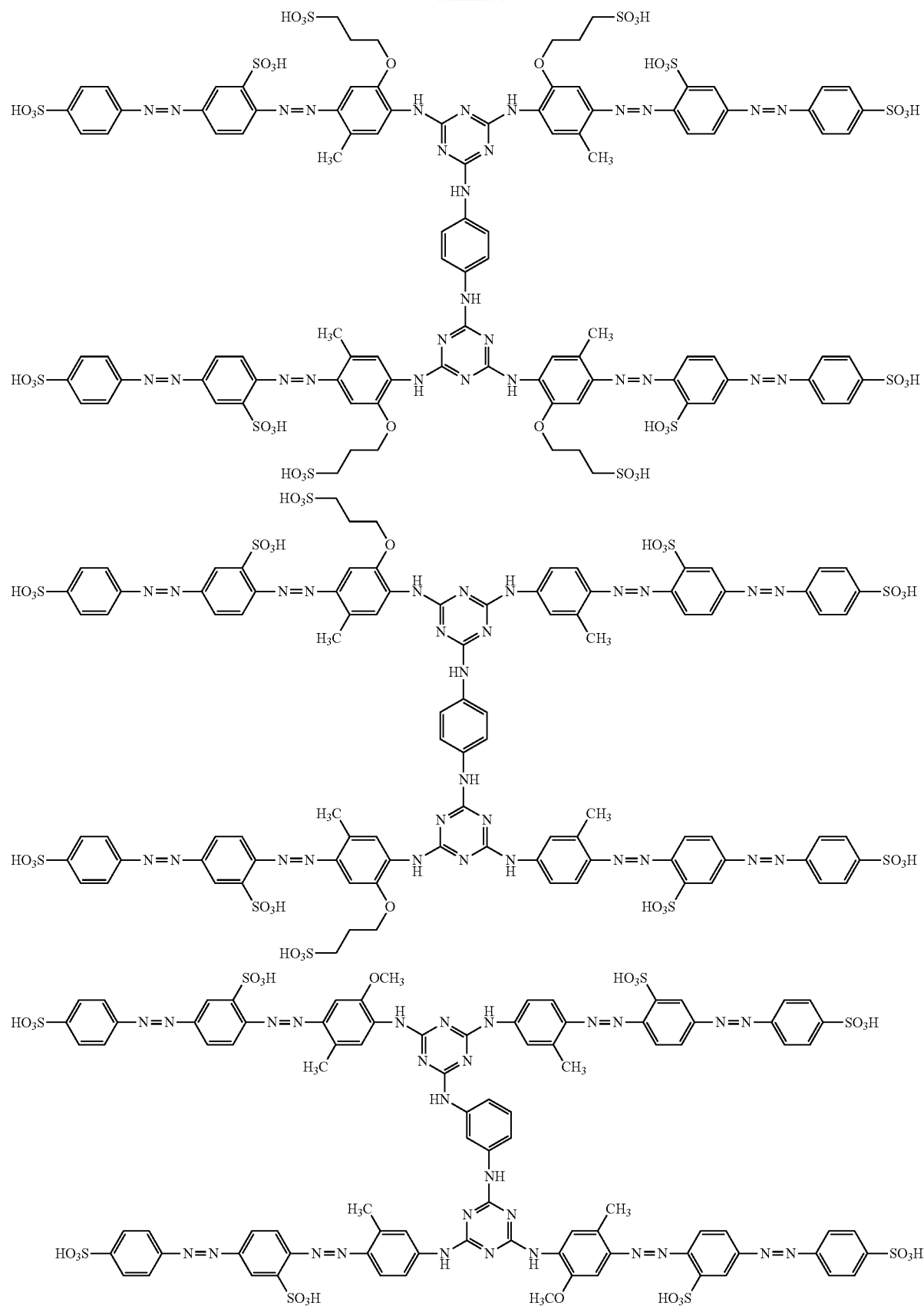

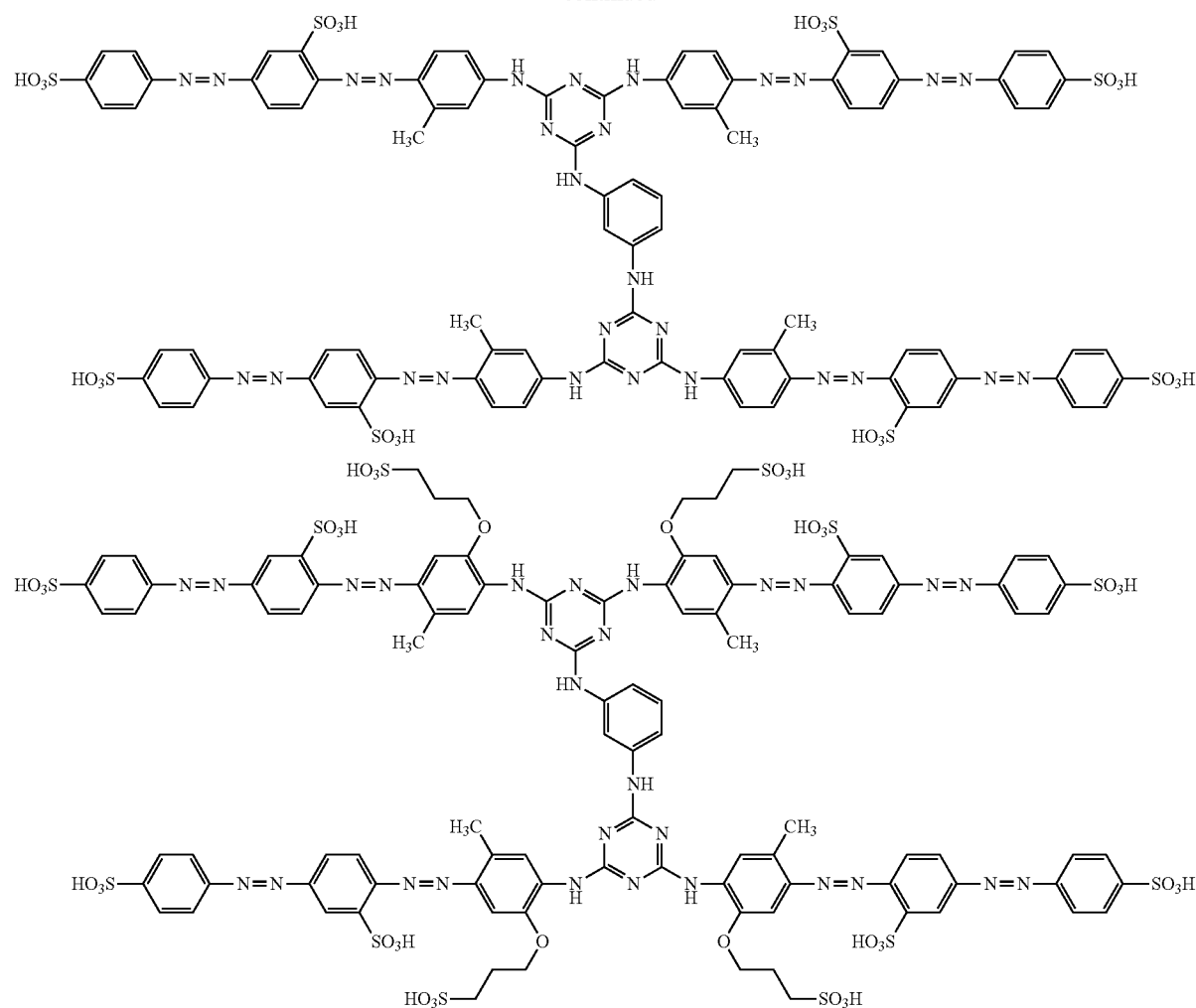
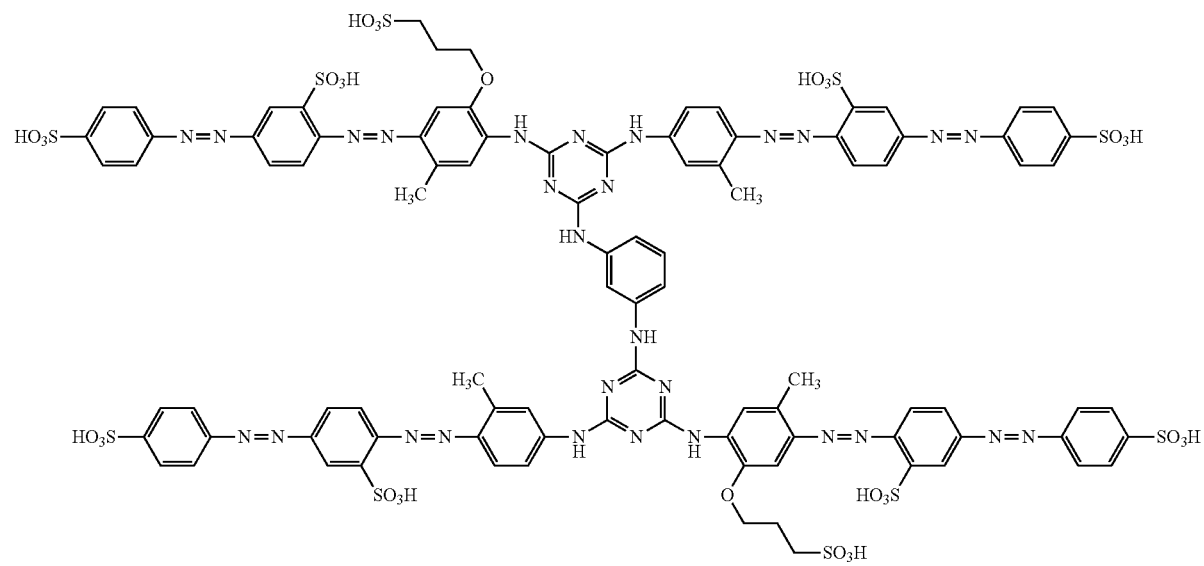

-continued
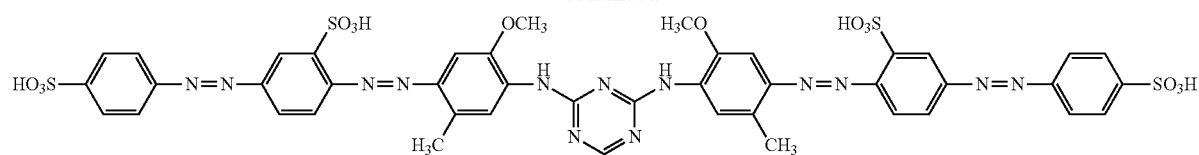
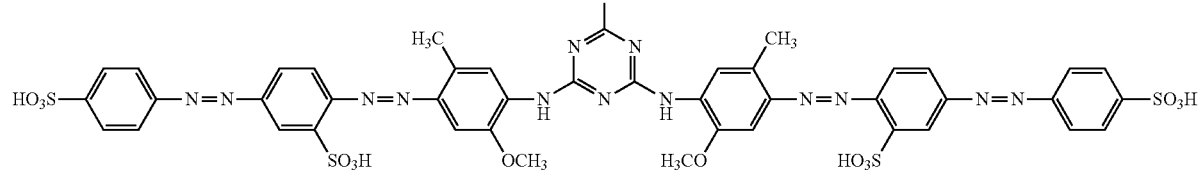
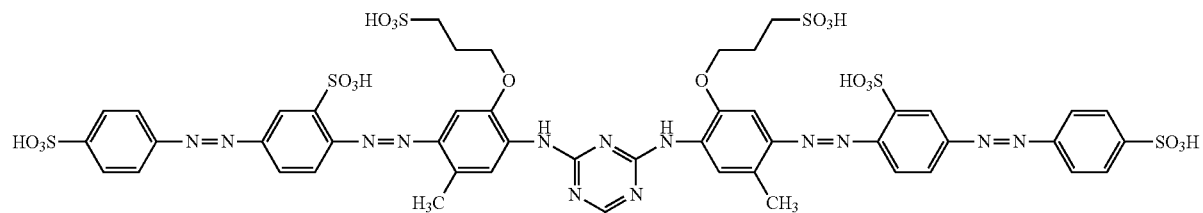
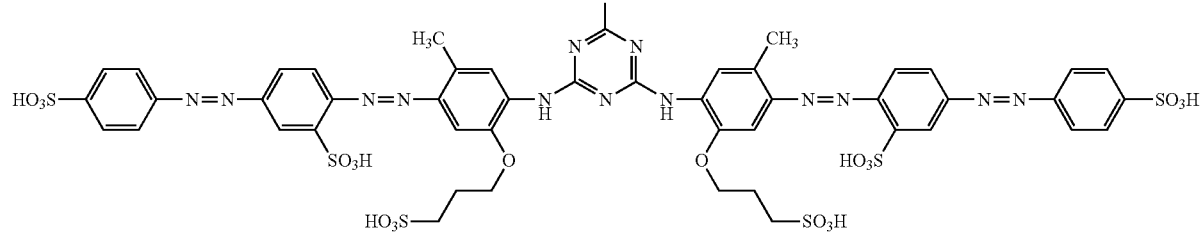
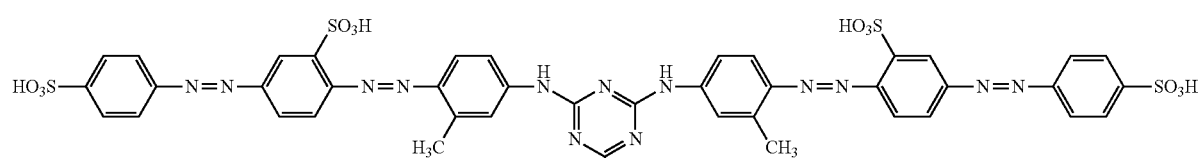
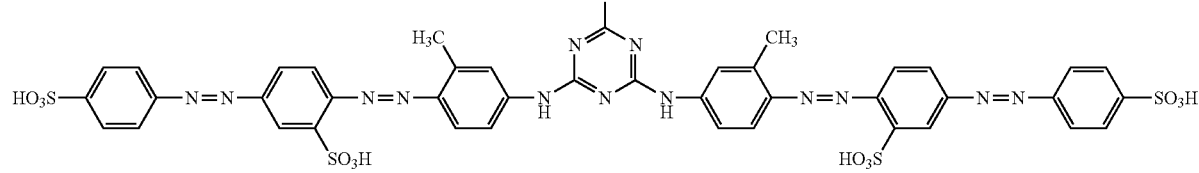

-continued
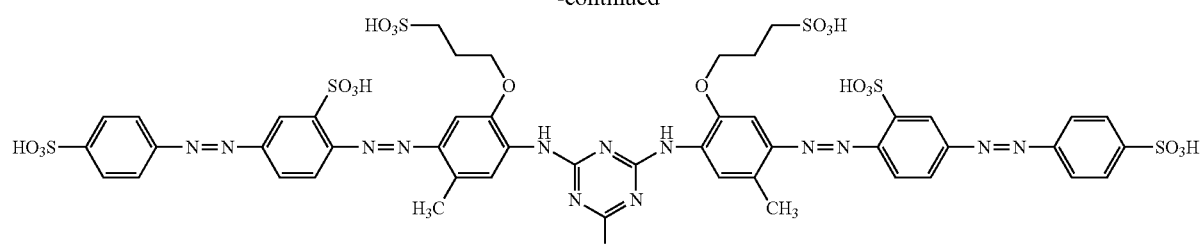
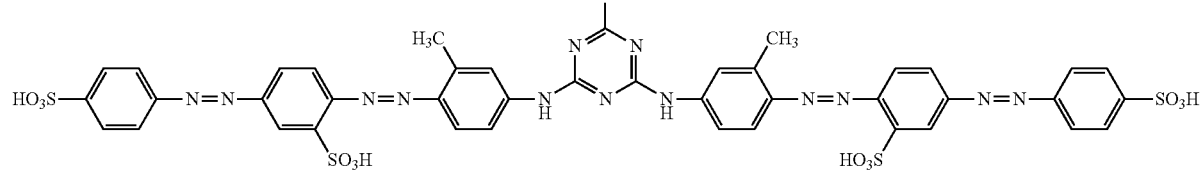
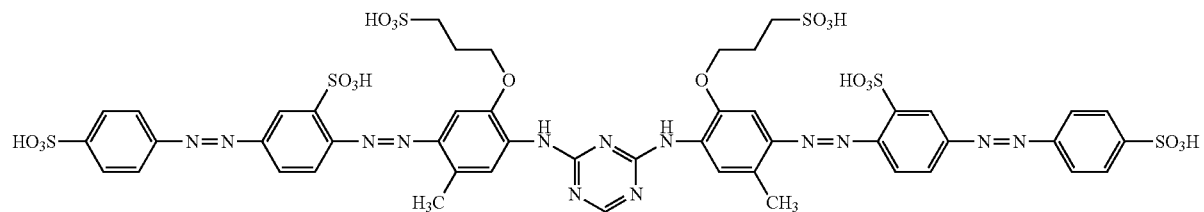
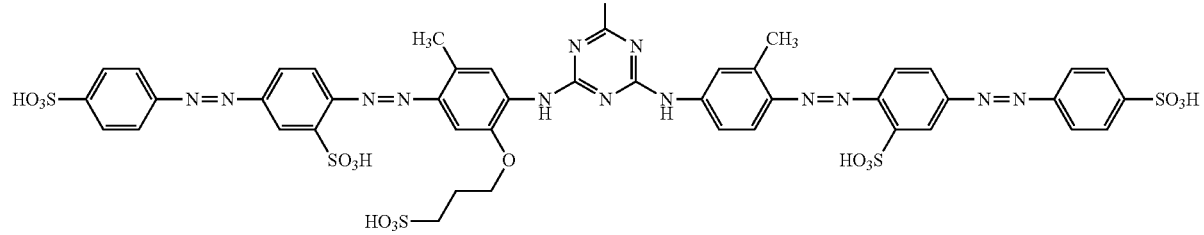
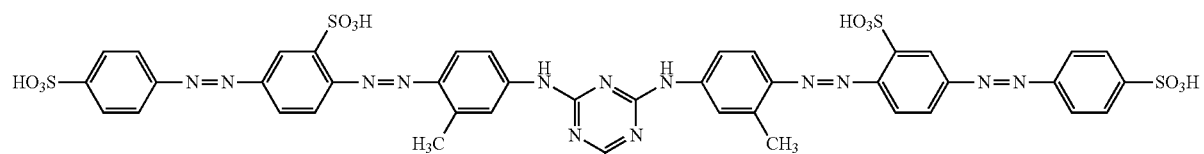
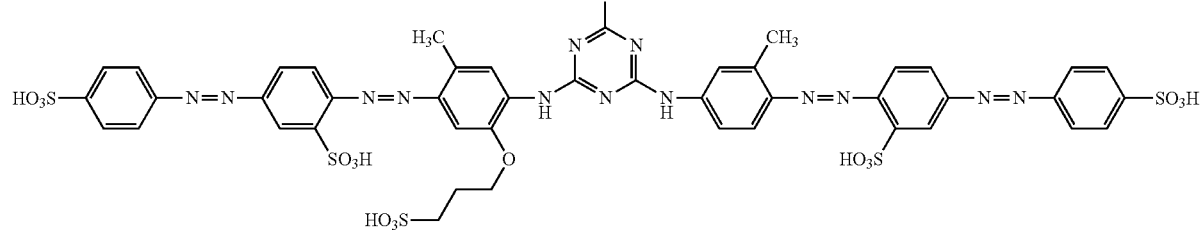

-continued
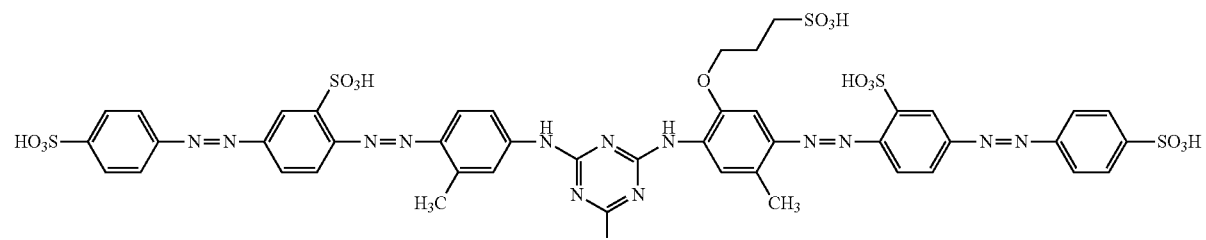
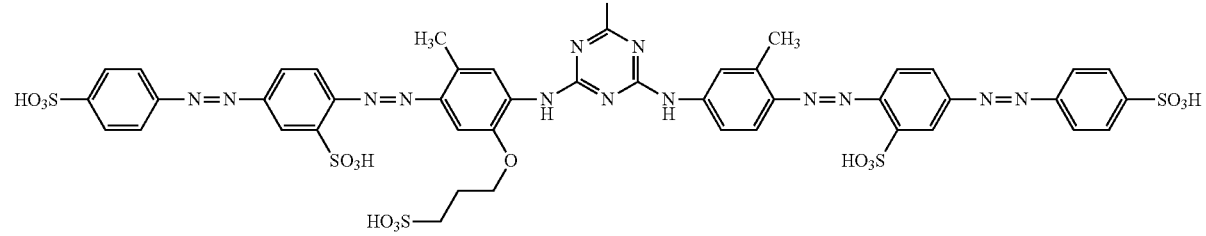
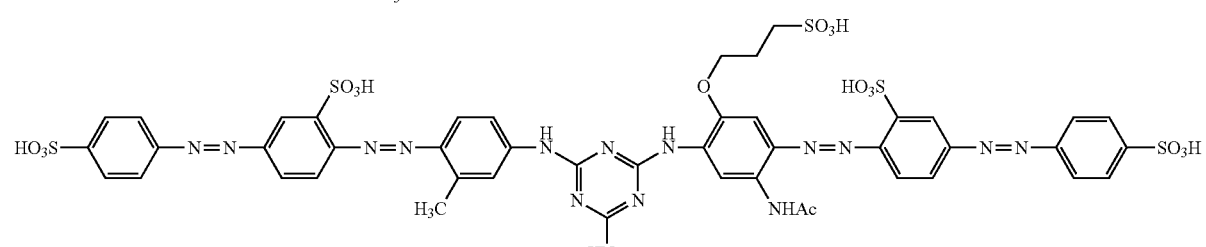
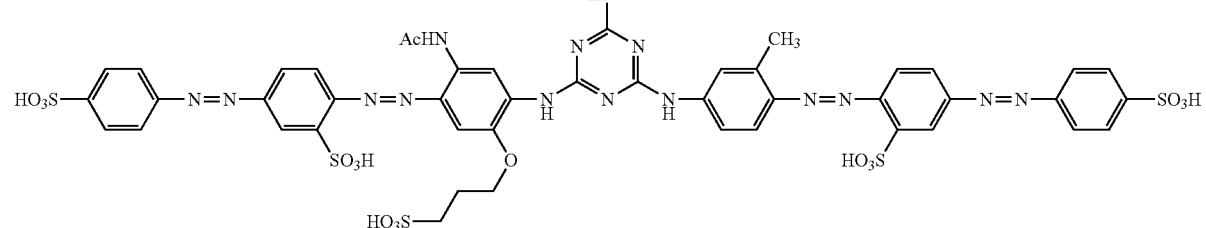
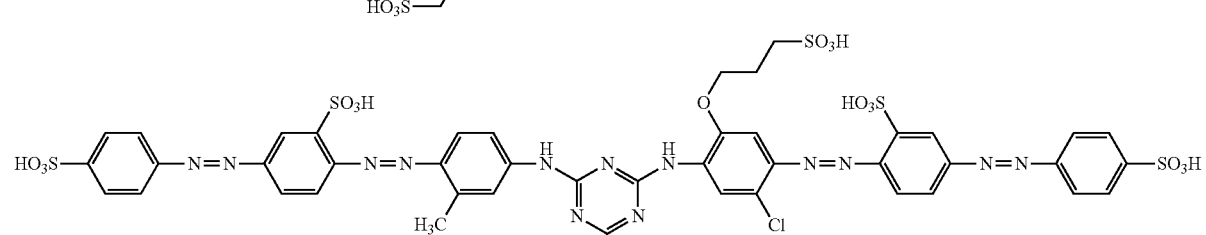
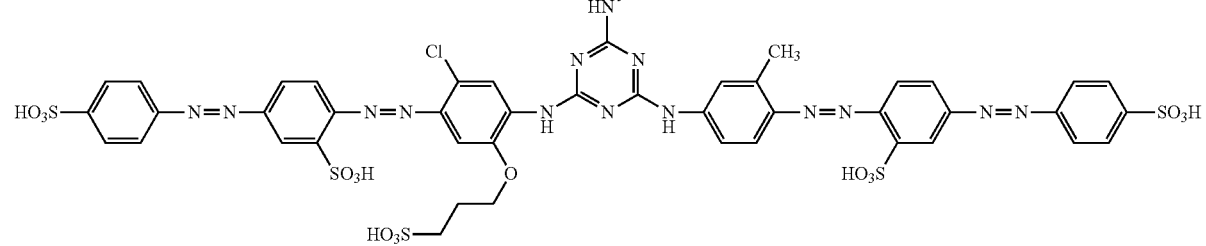

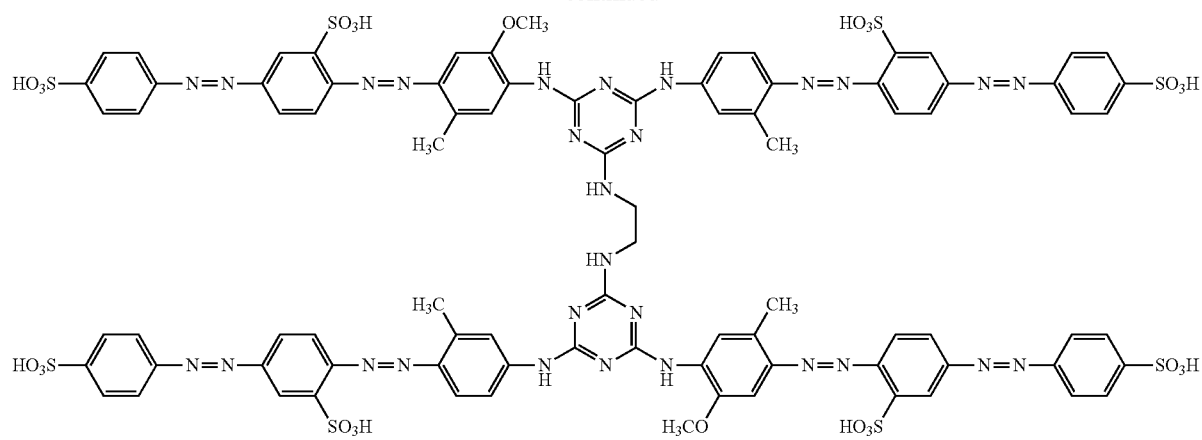
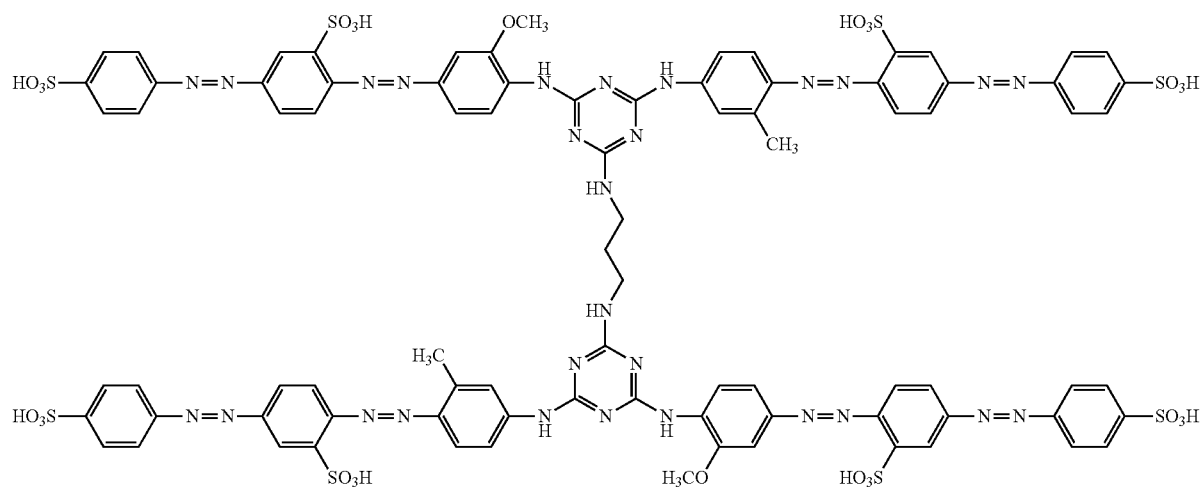
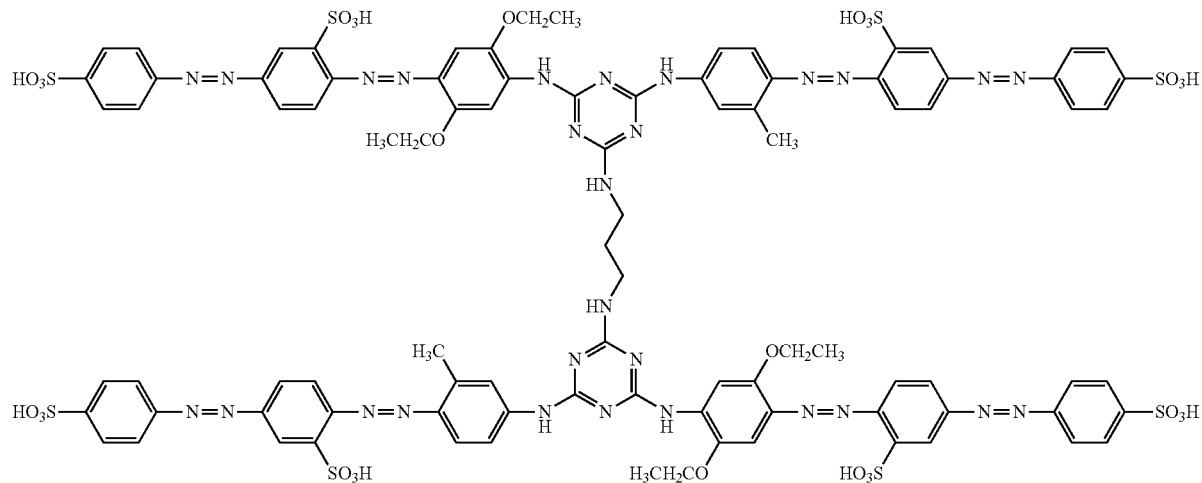

51 52
-continued
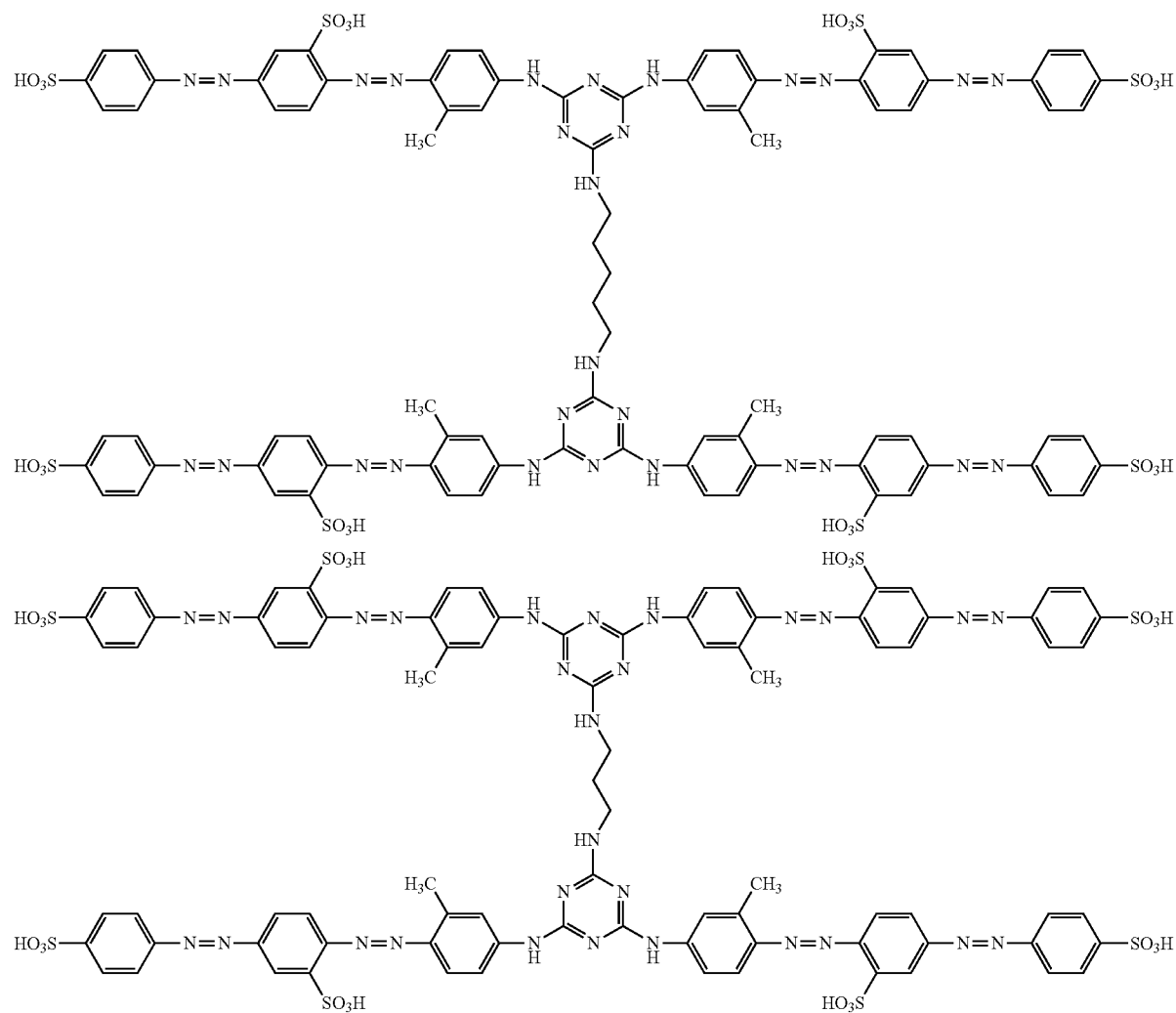
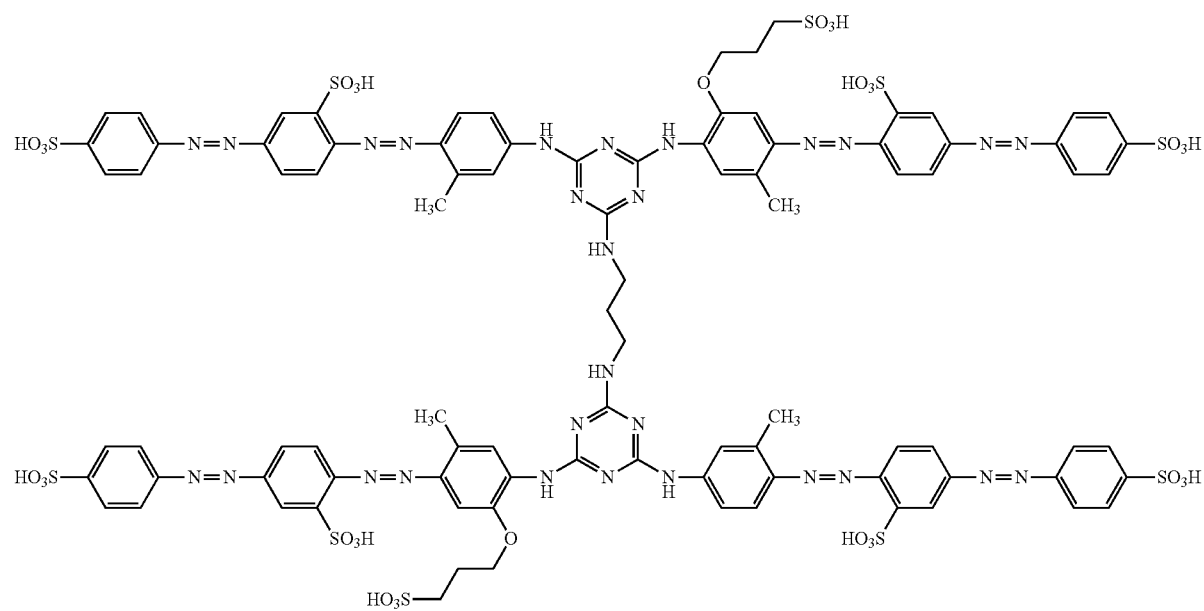

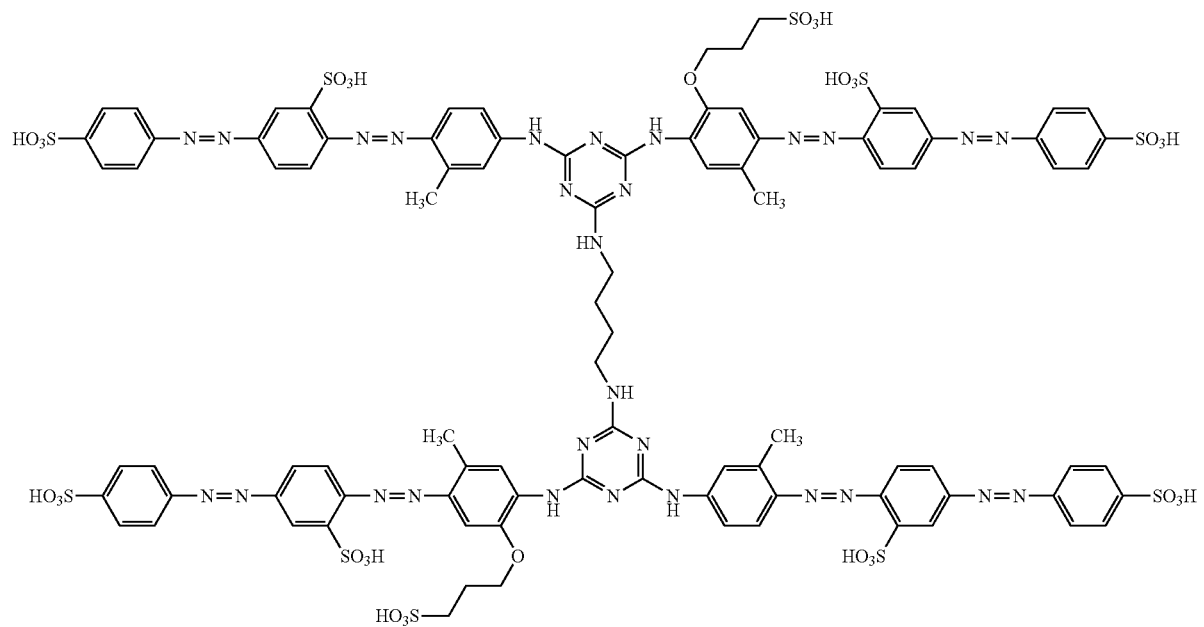
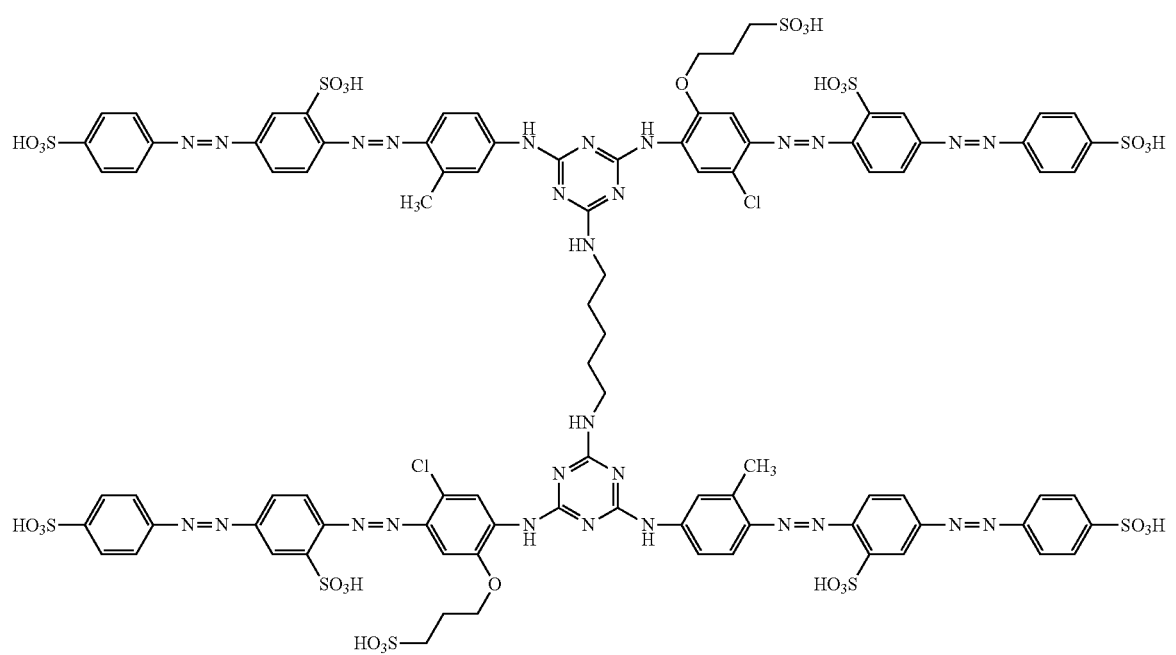

-continued
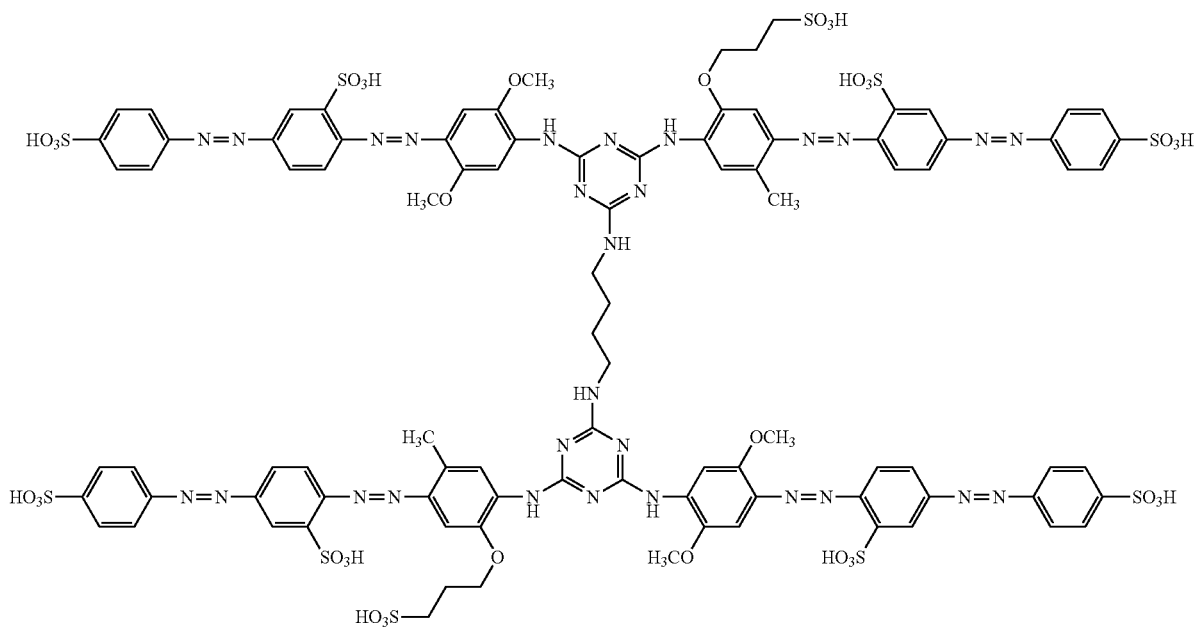

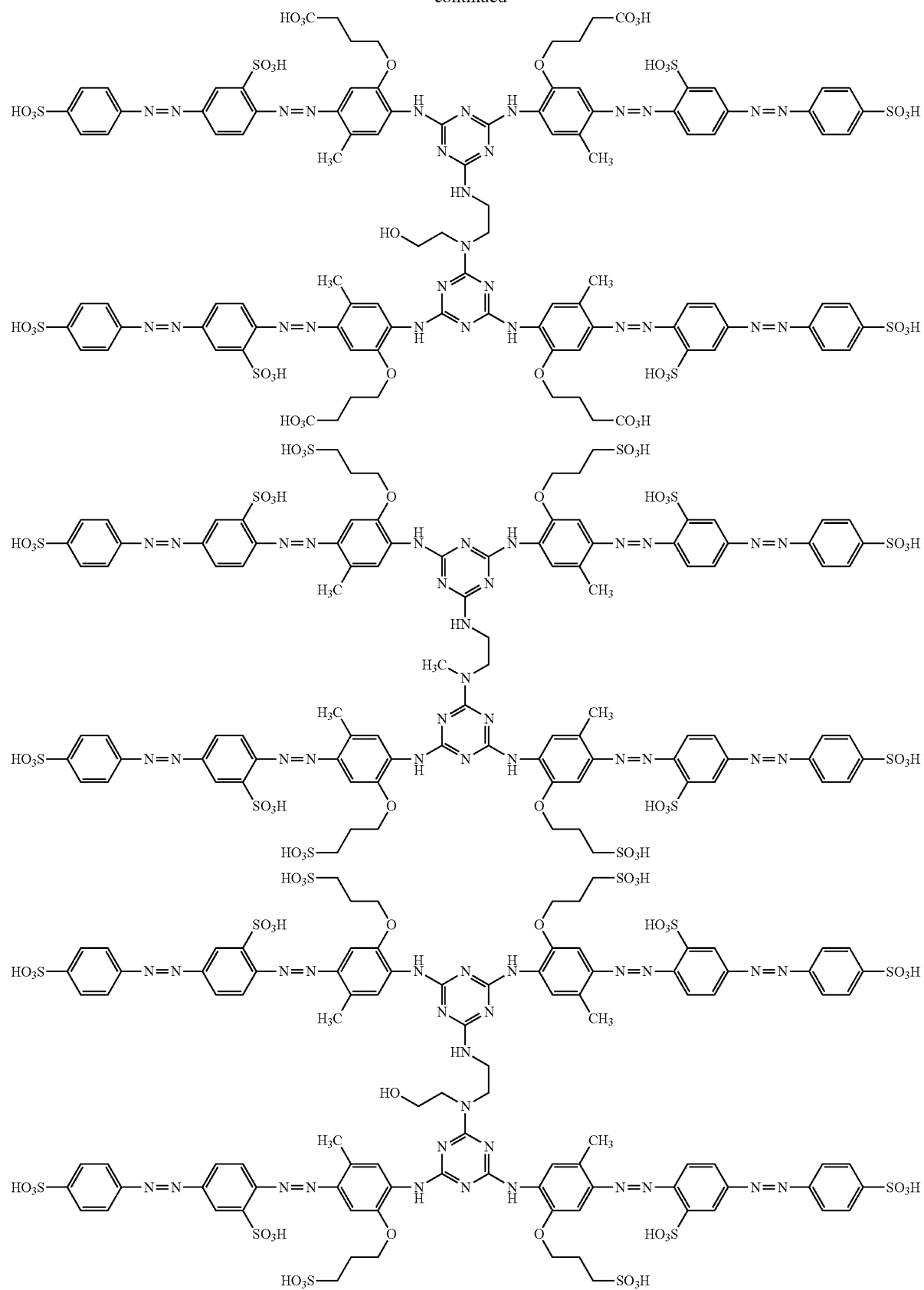

-continued
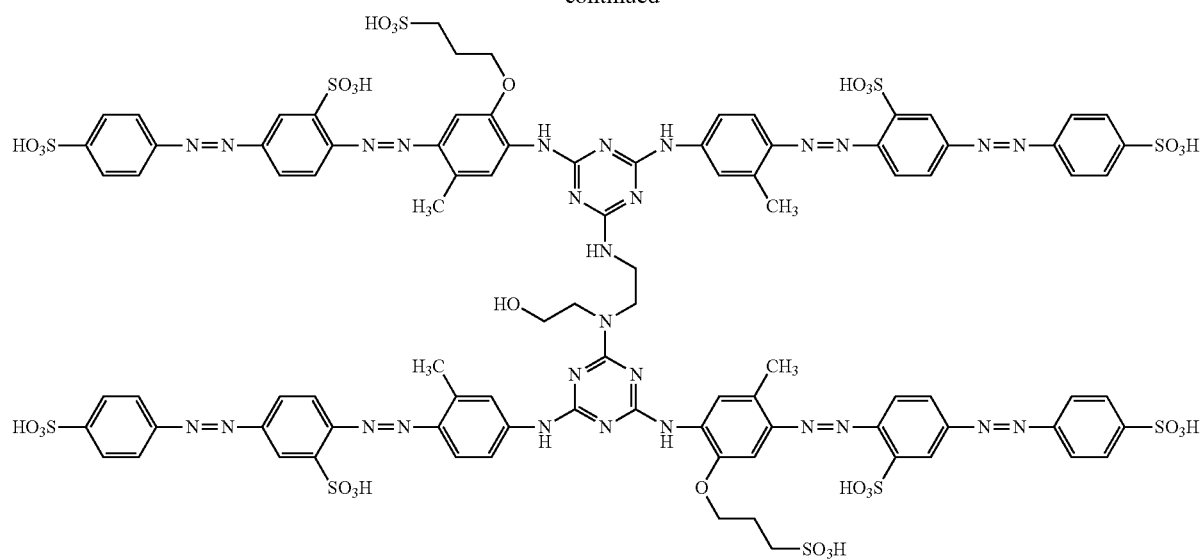
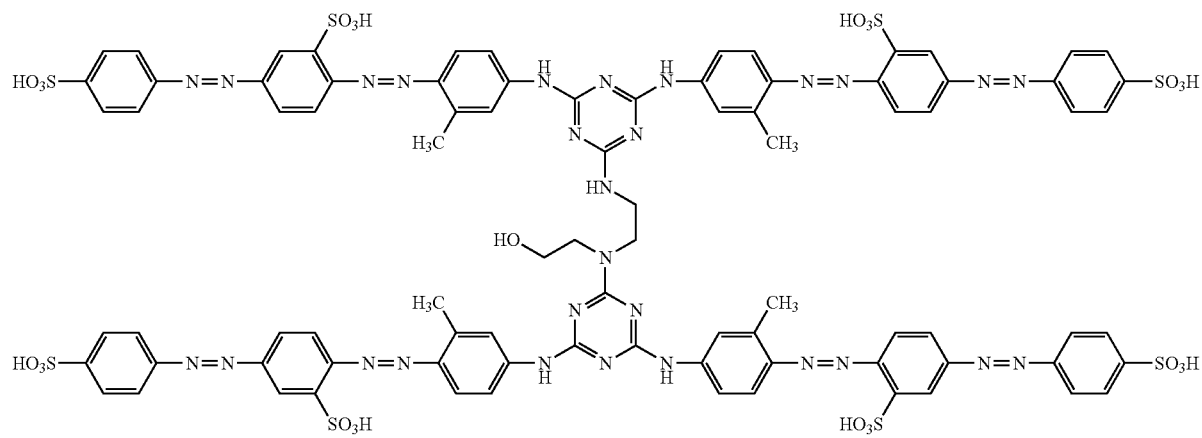
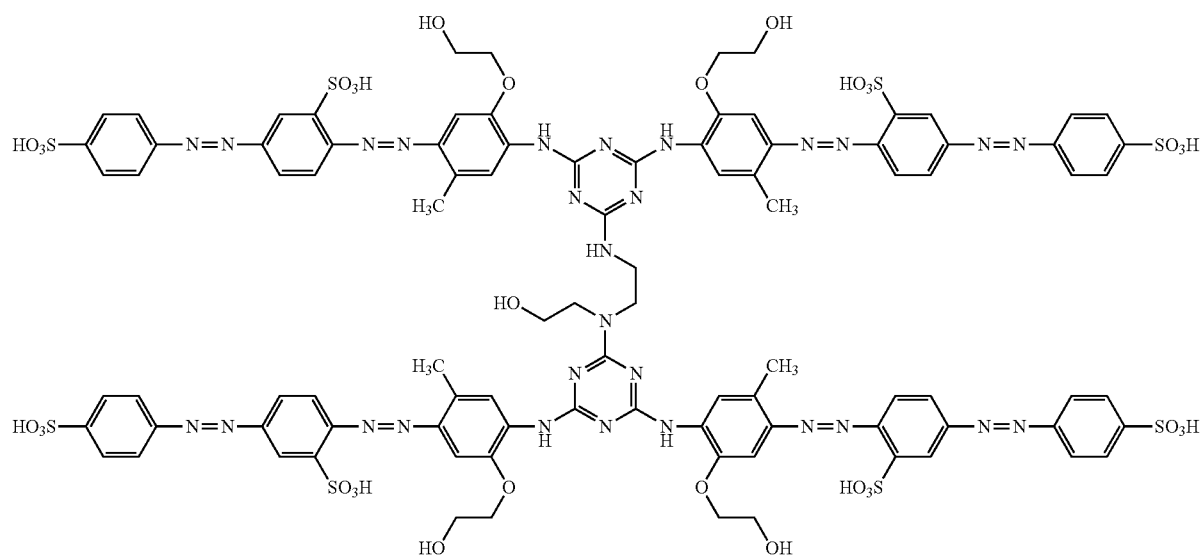

-continued
61
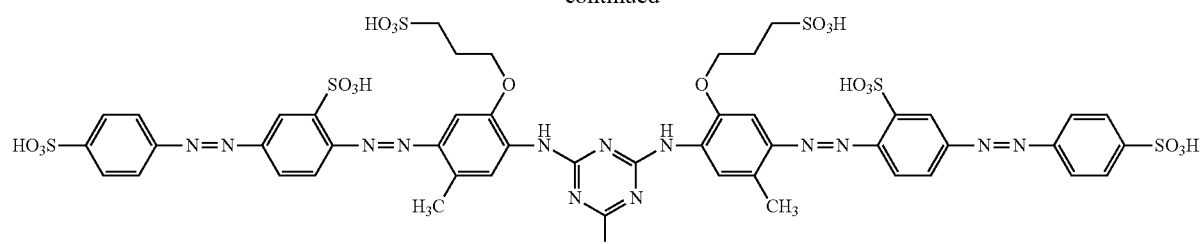
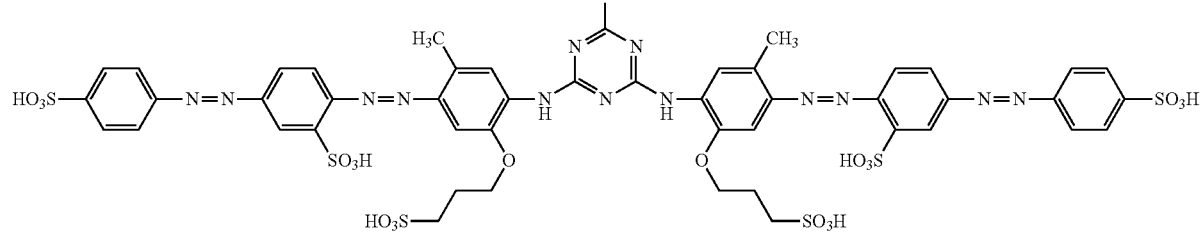
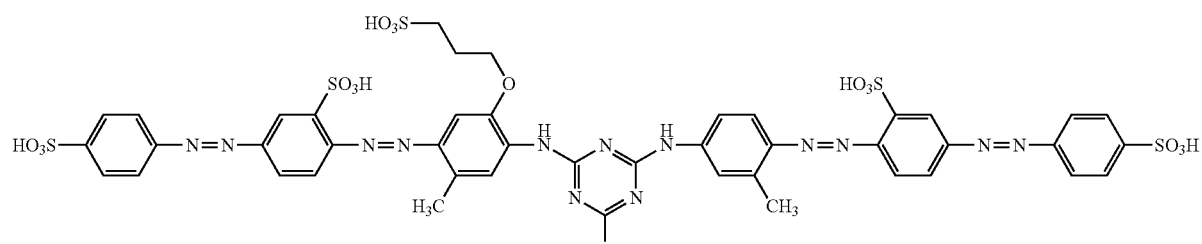
62
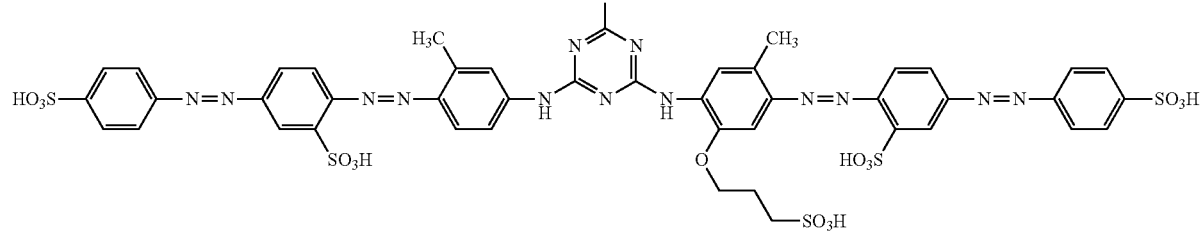
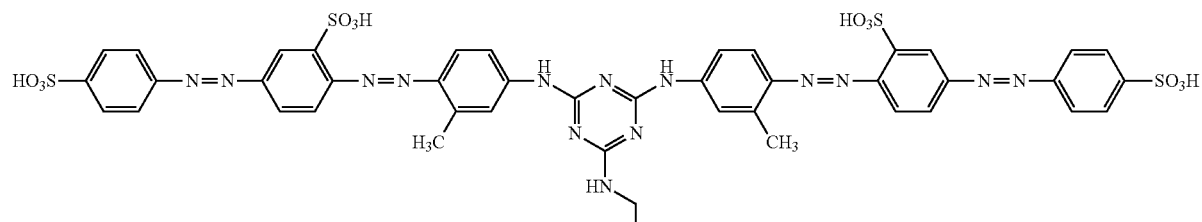
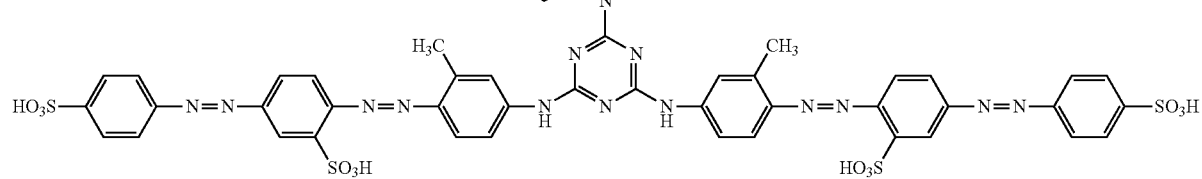

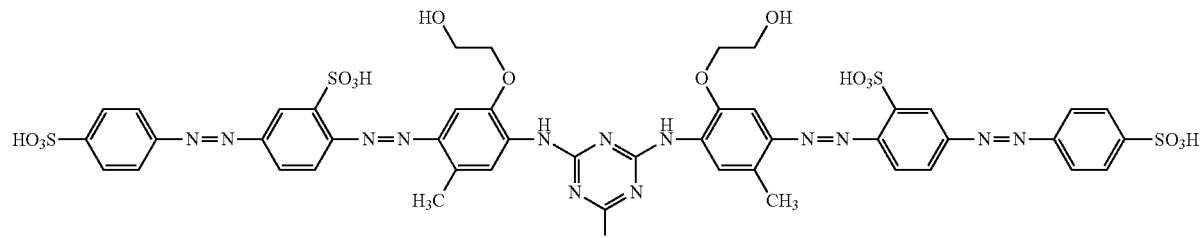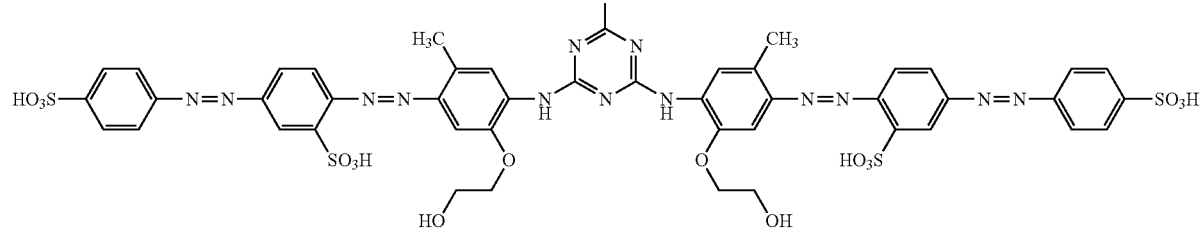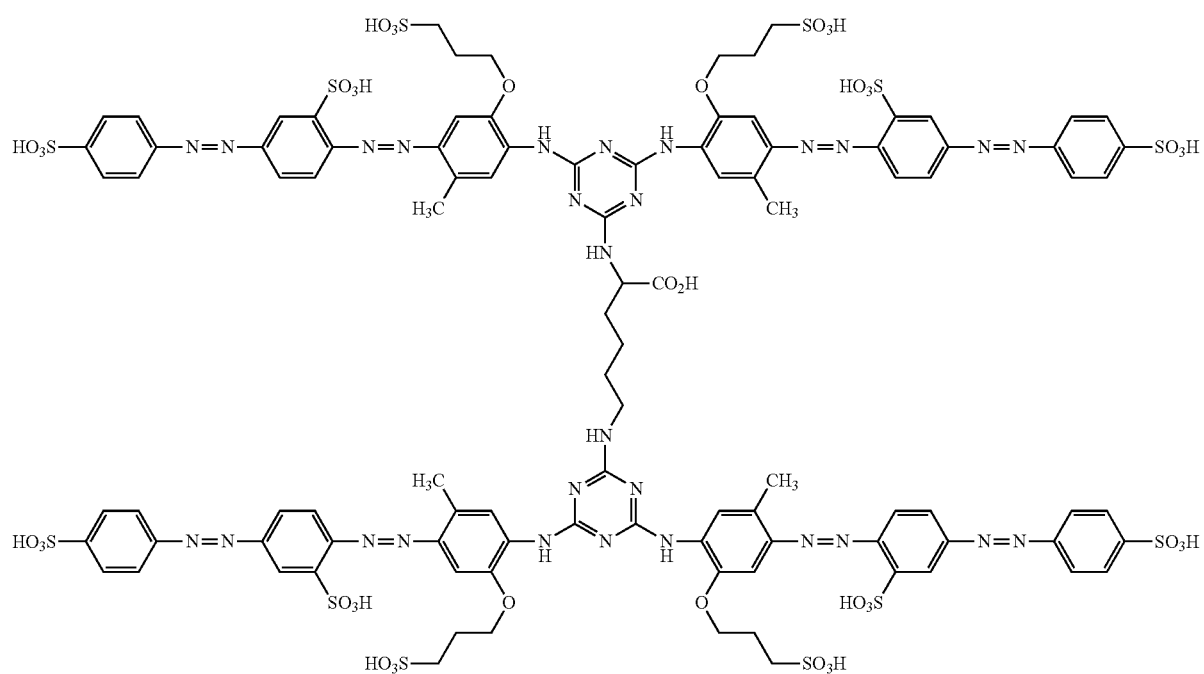

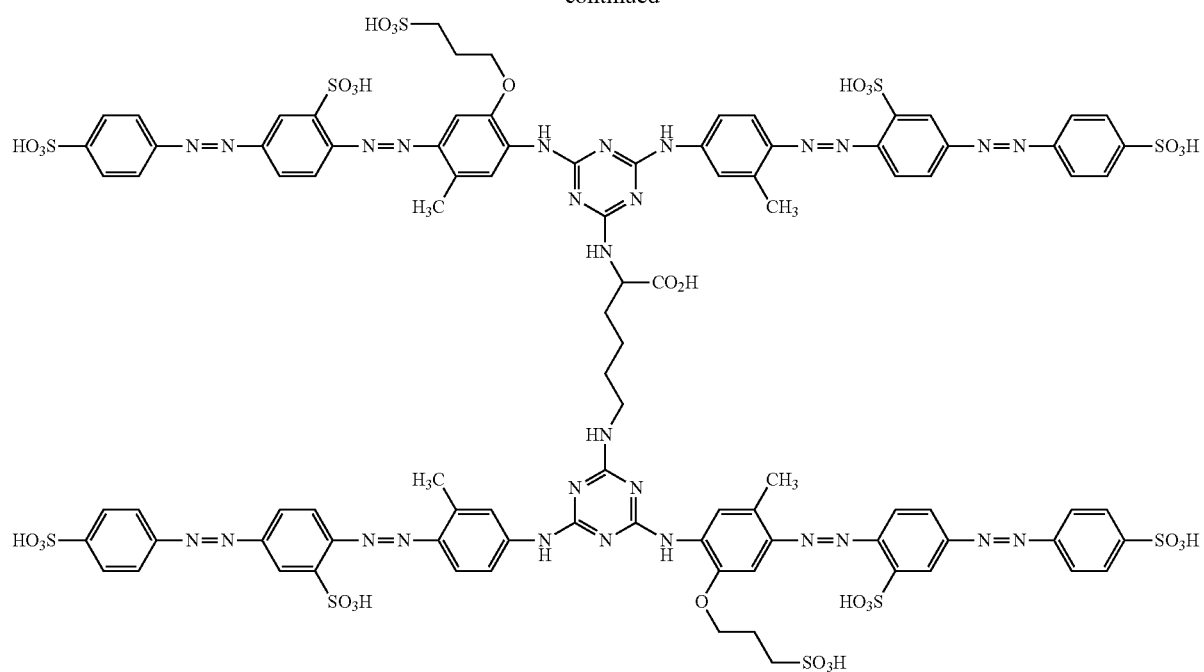
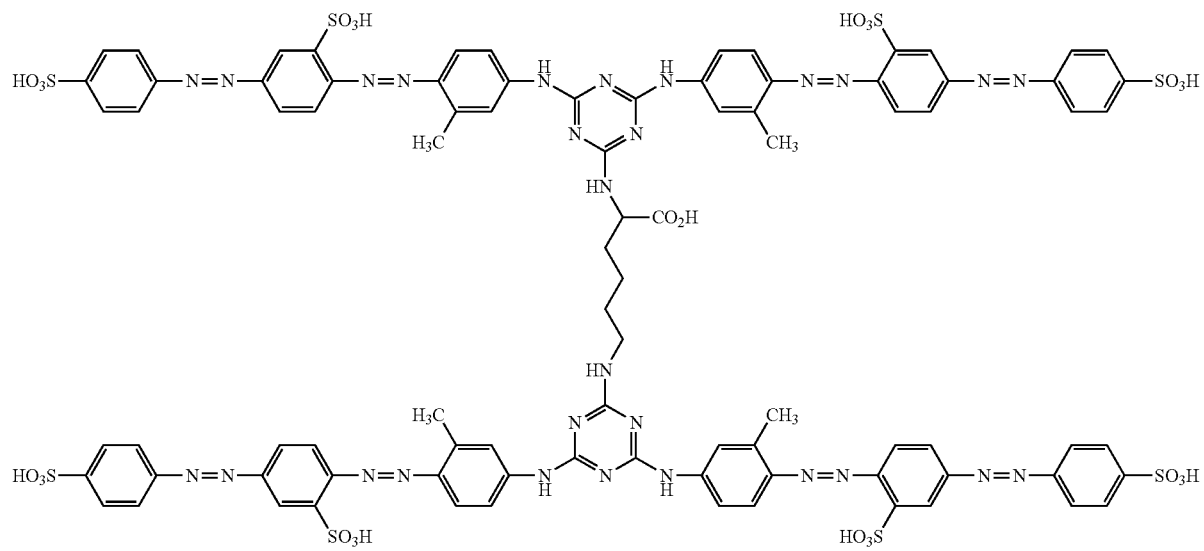

-continued
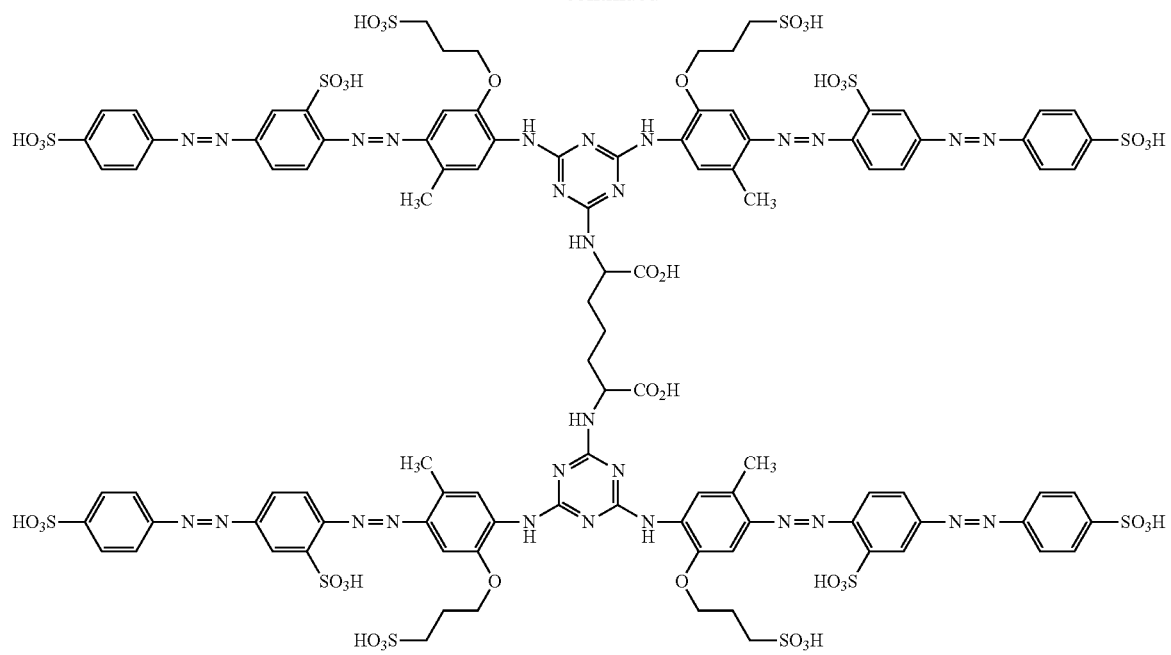
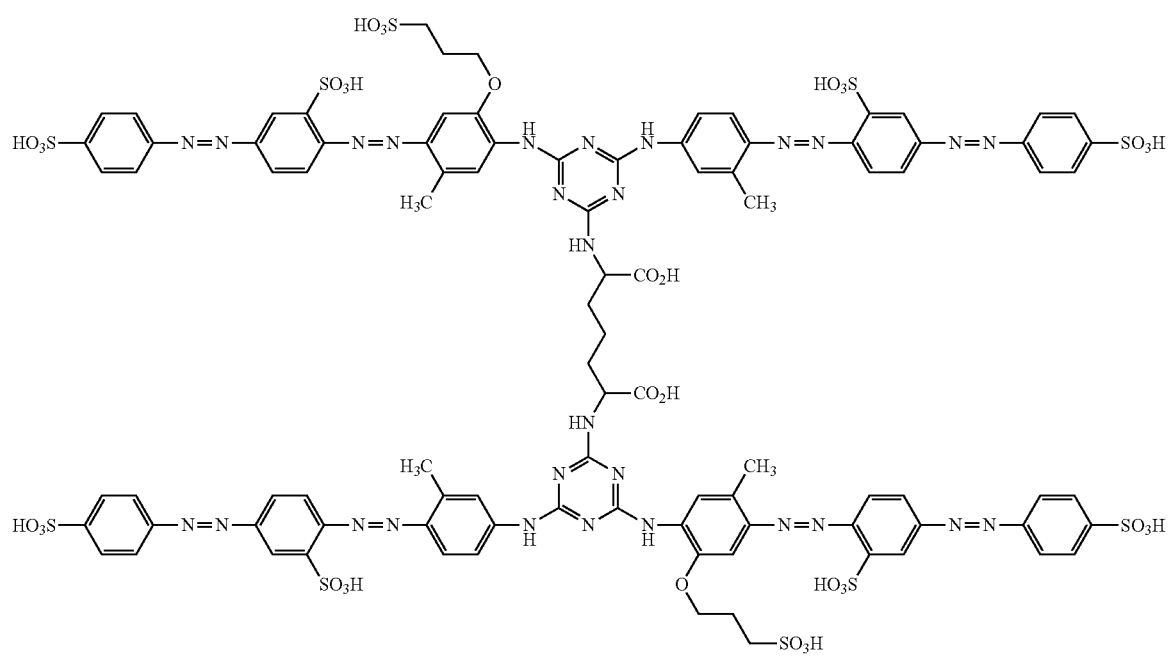

-continued
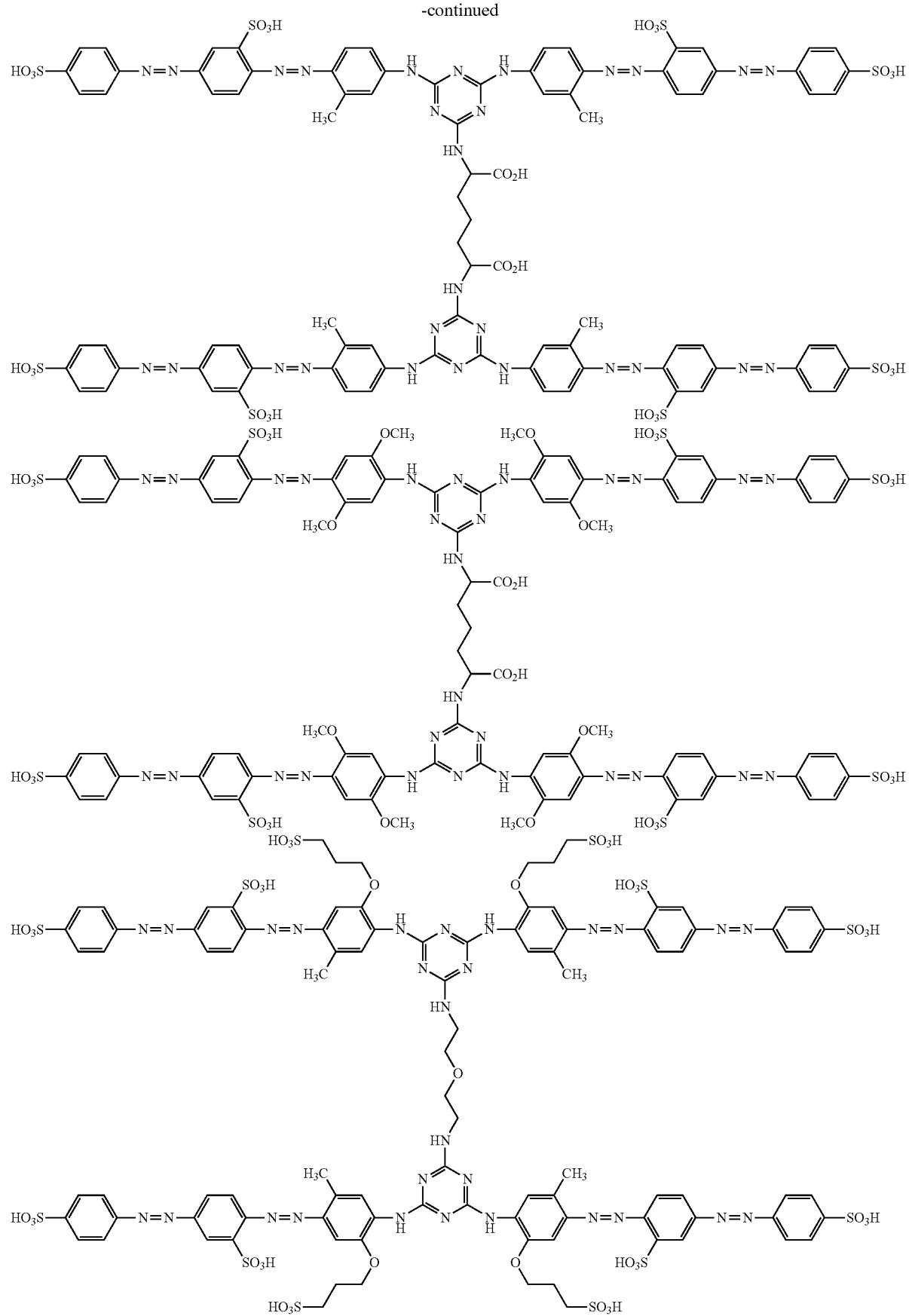

71 72
-continued
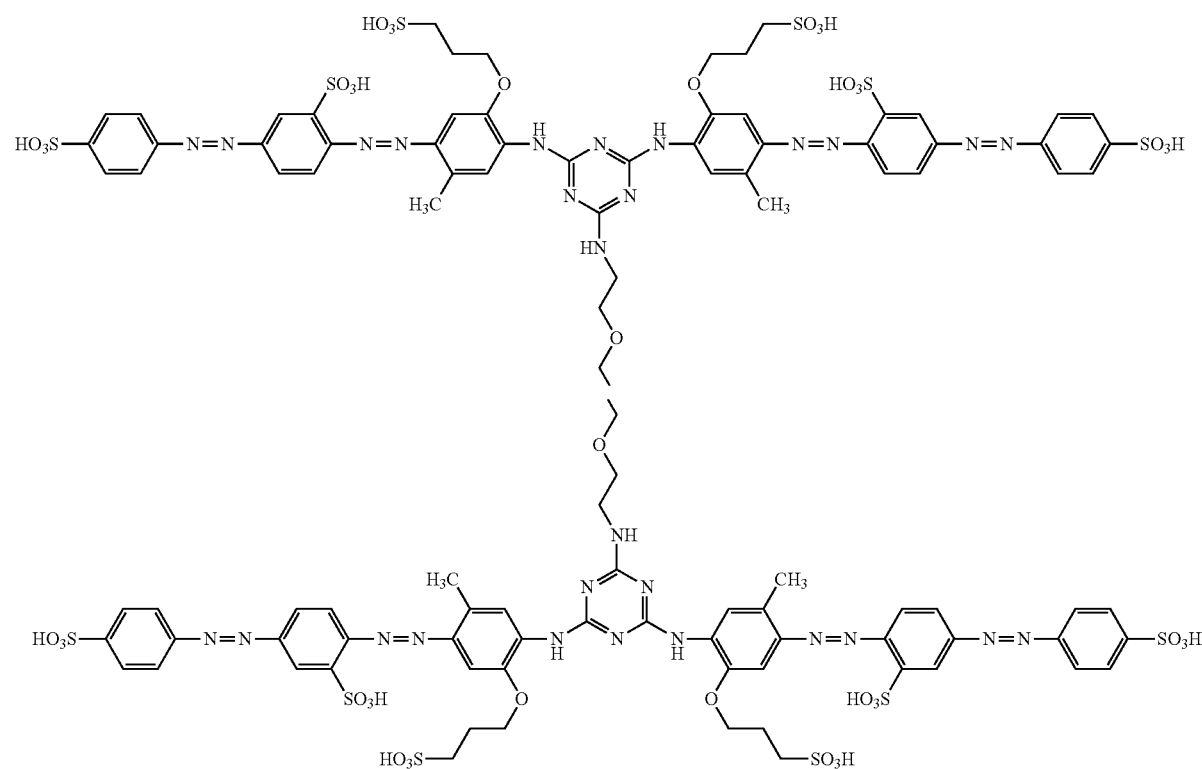

-continued
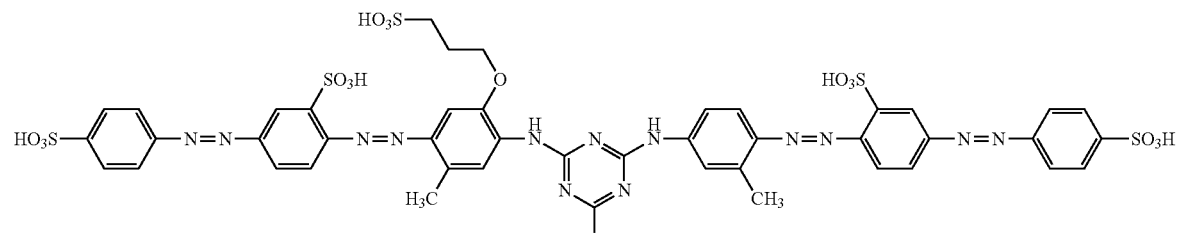
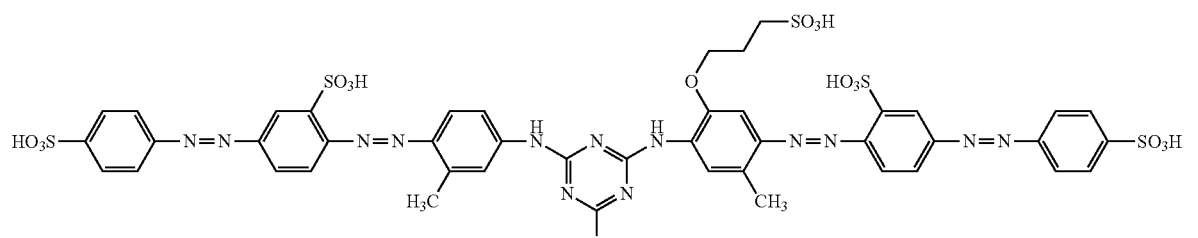

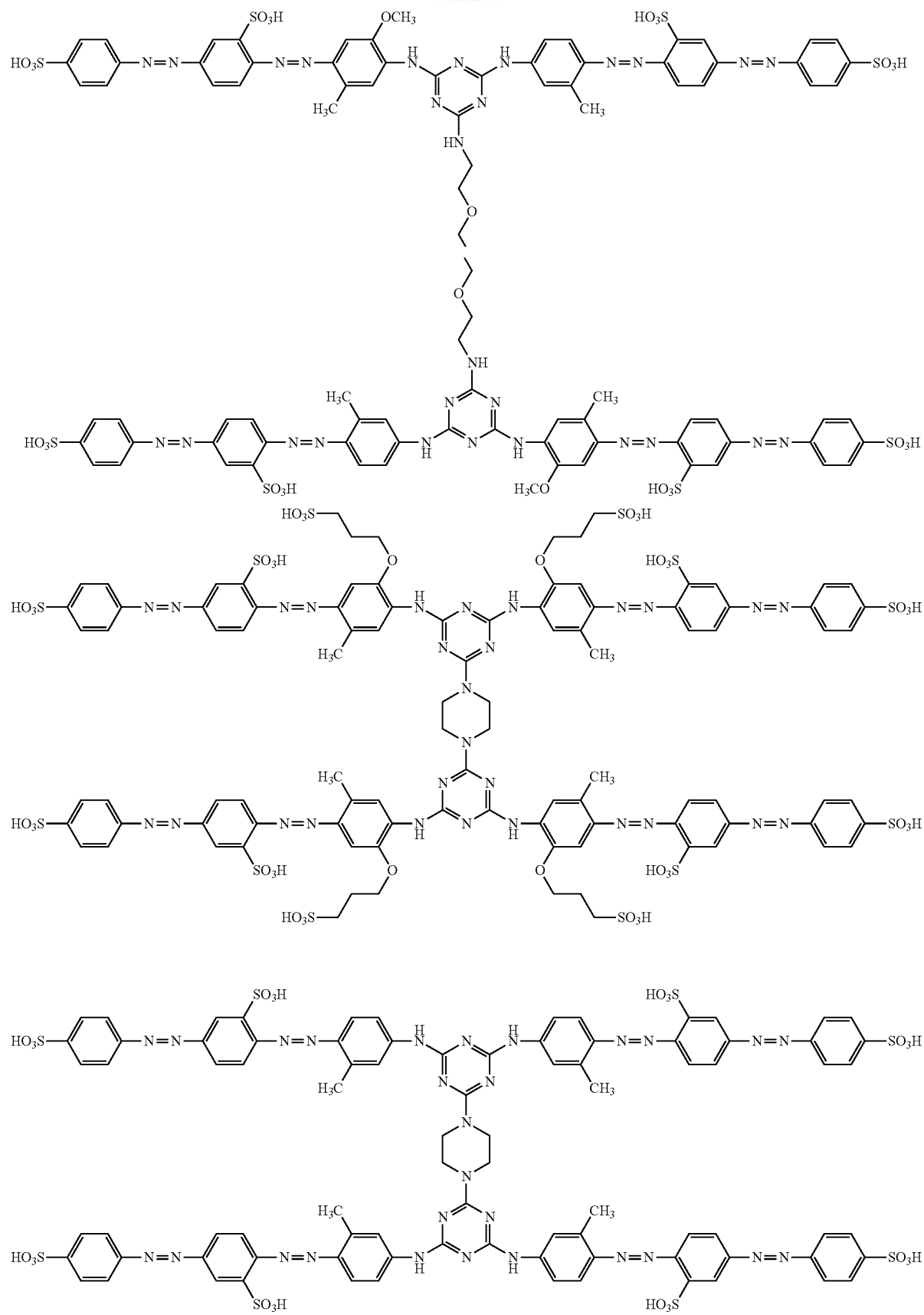

-continued
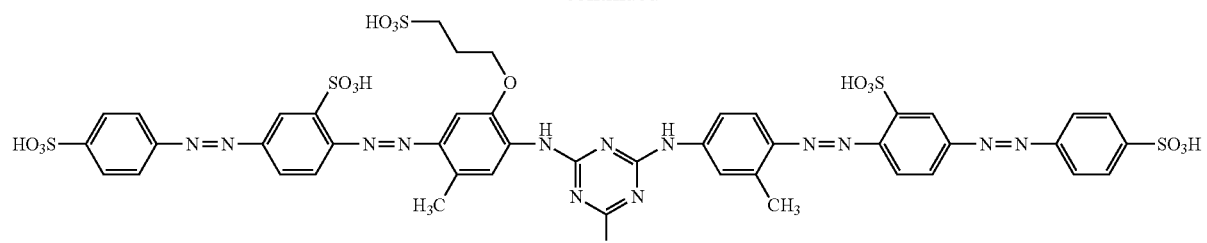
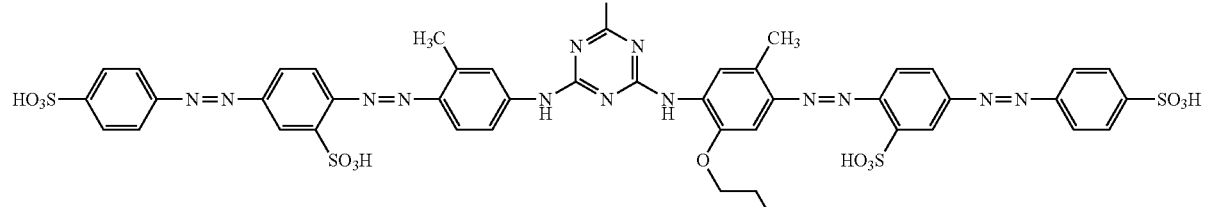
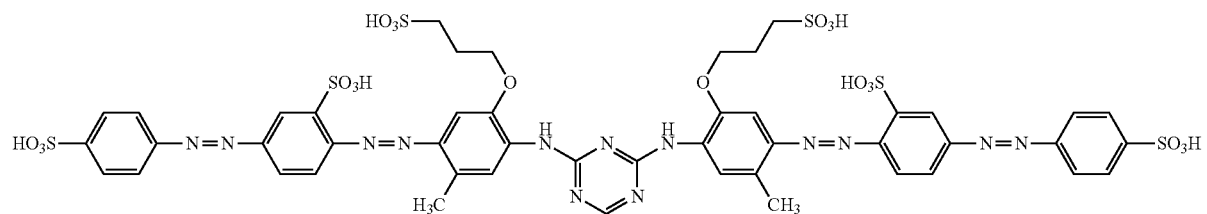
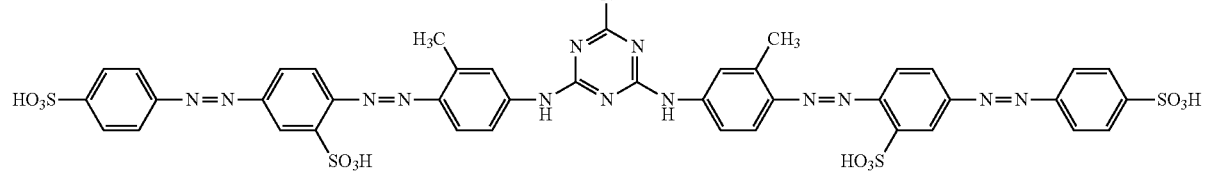
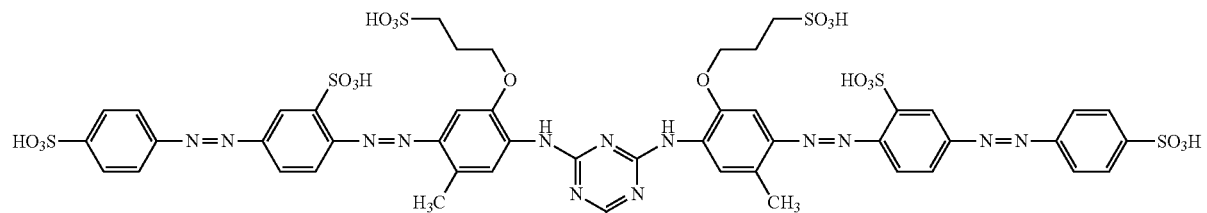
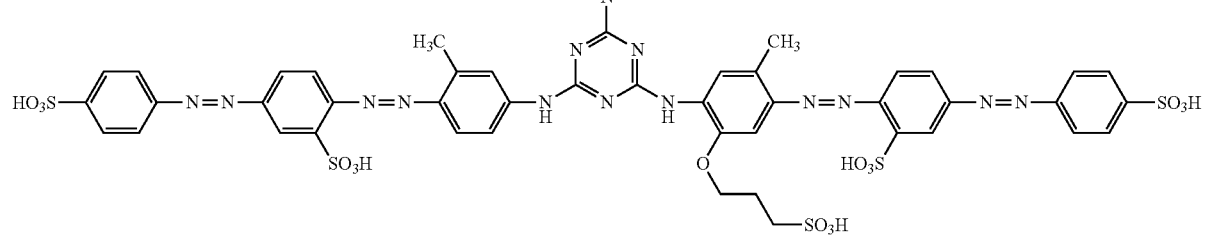

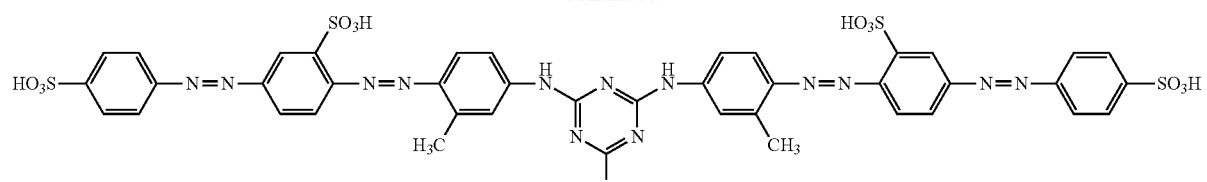
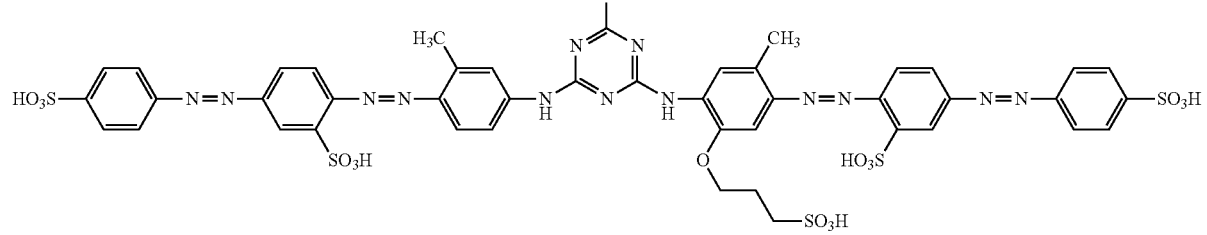
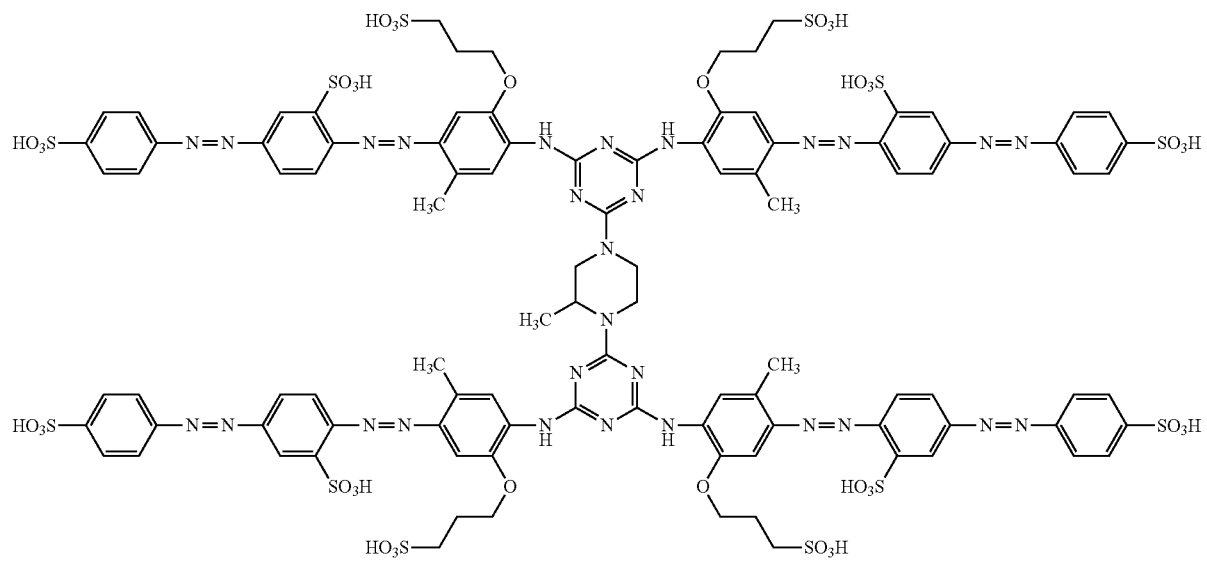 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O]
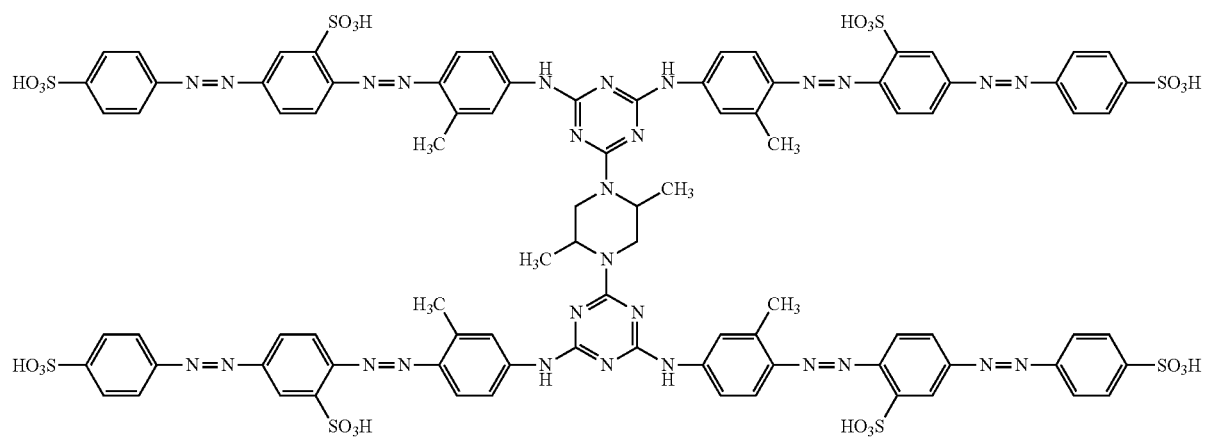

-continued
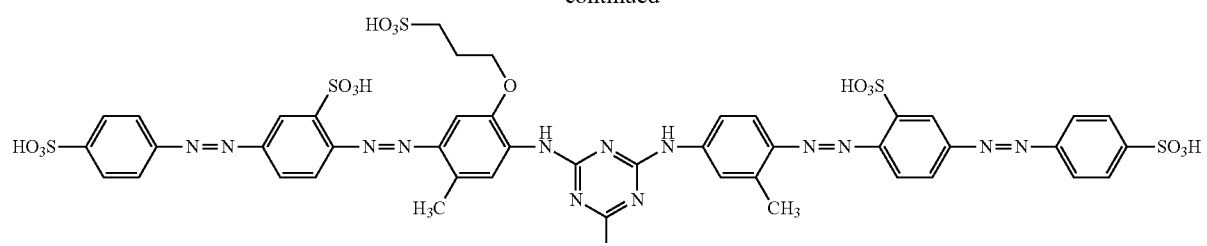
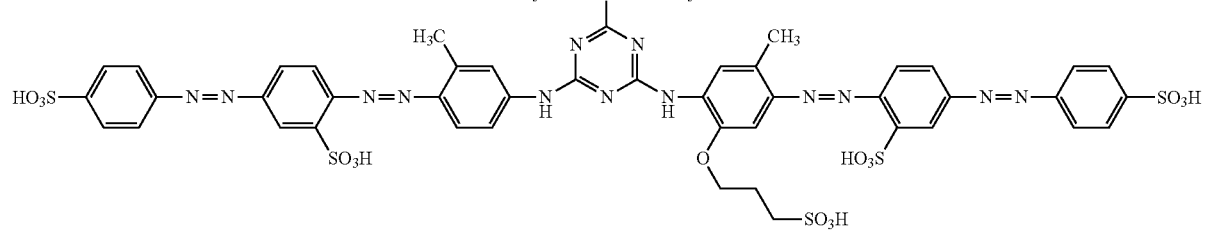
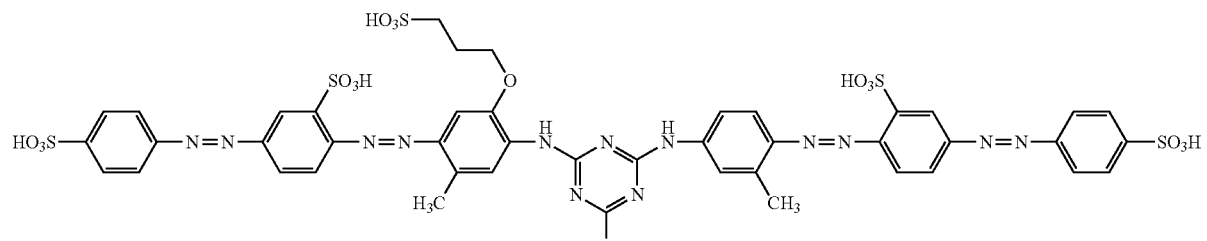
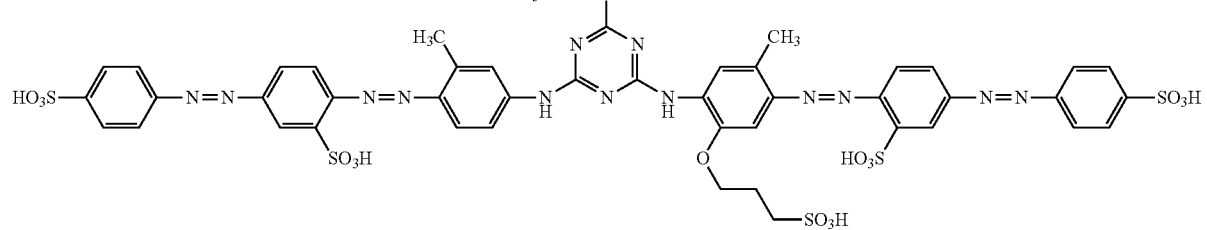
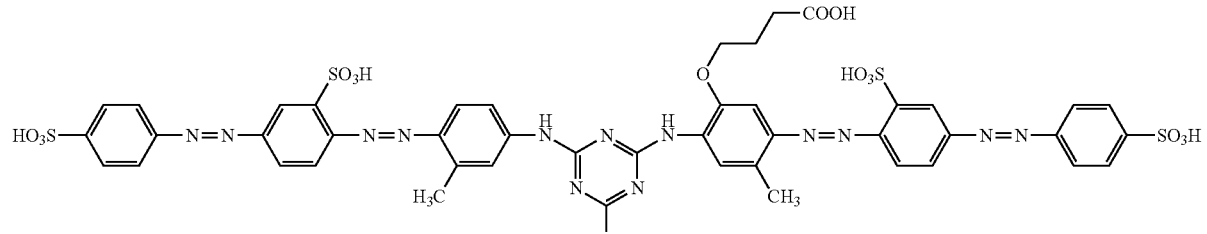
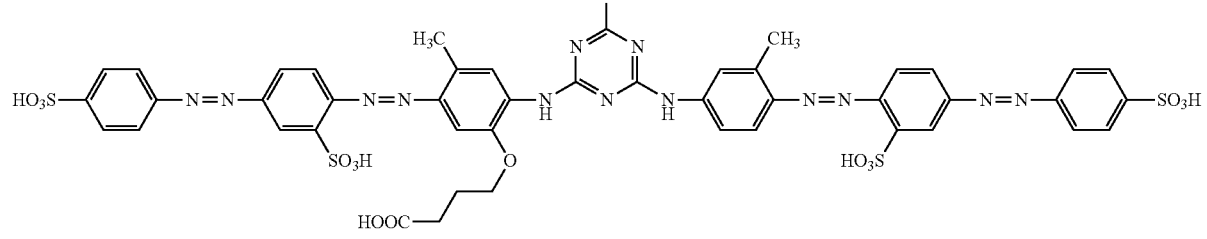

-continued
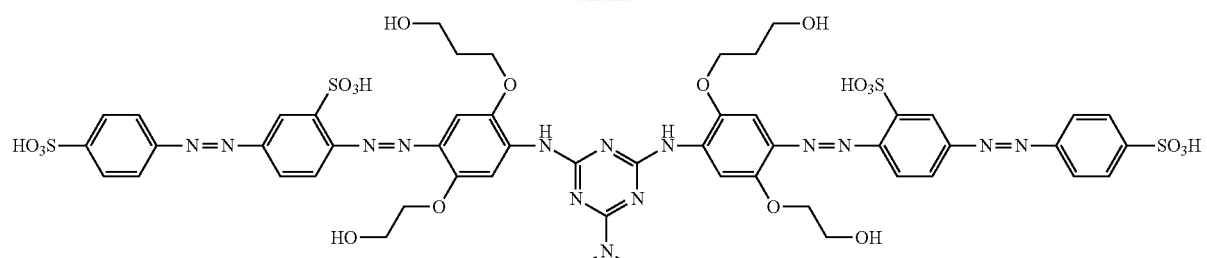
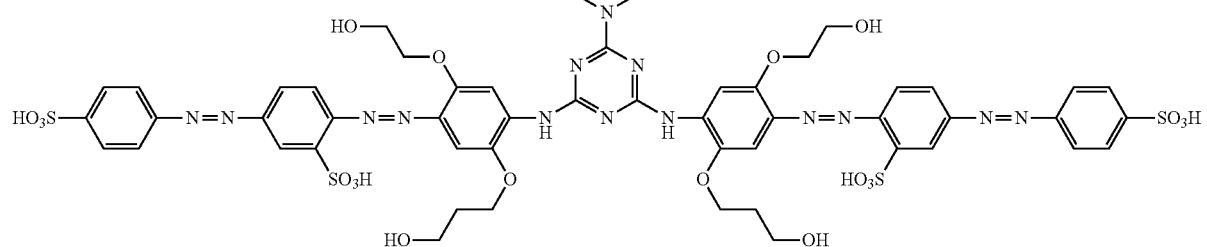
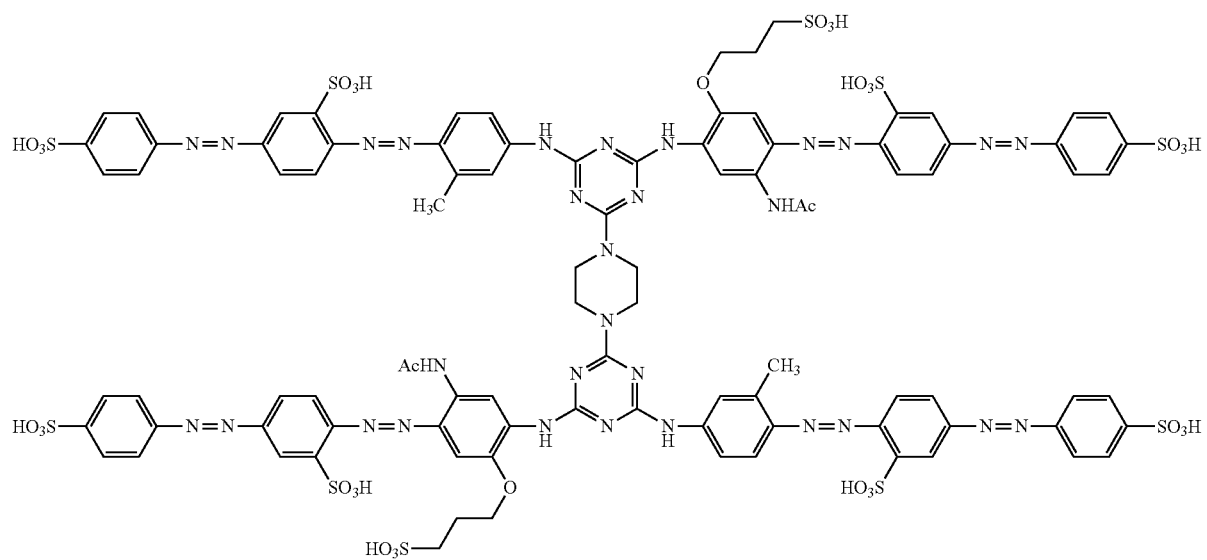

-continued
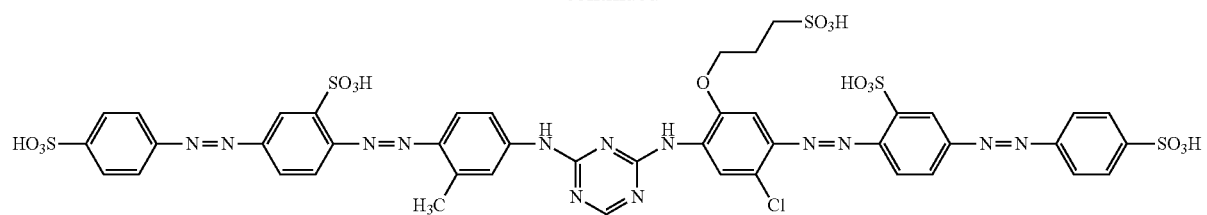
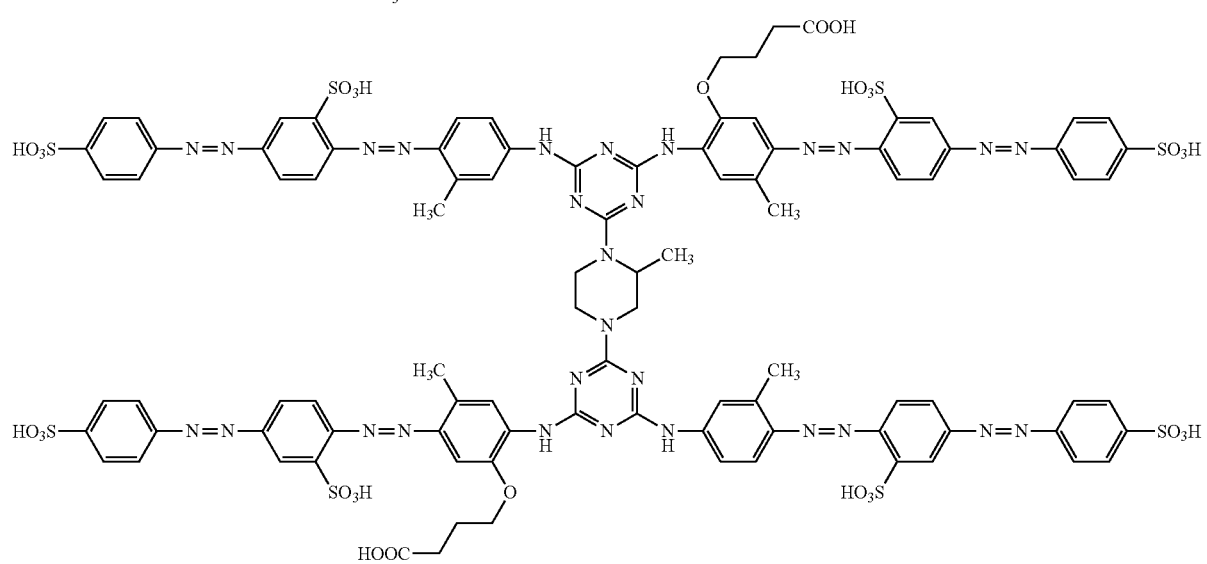
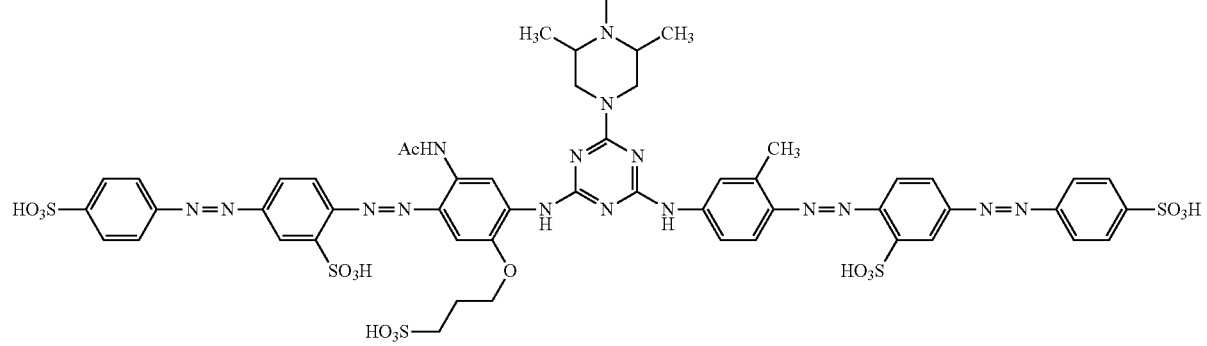

-continued

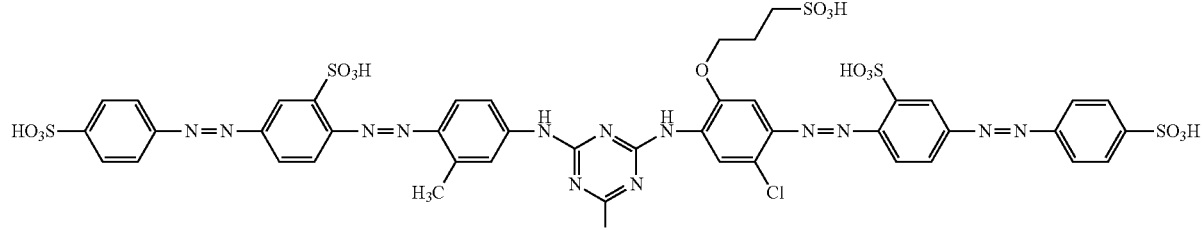

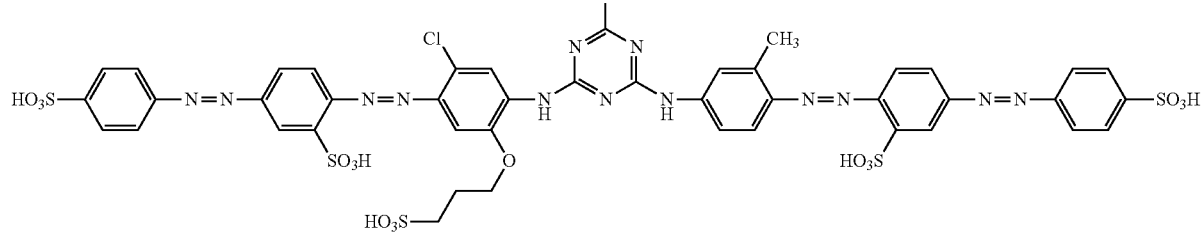

Although the method of synthesizing the coloring material represented by the formula (Bw-1) is not particularly limited, it is possible to use the method disclosed in JP-A-2012-172031.

The content of the coloring material represented by the formula (Bw-1) is preferably 0.050 to 3.0 mass % to the total content of the ink, more preferably 0.10 to 2.0 mass %, and still more preferably 0.50 to 1.5 mass %. By the content of the coloring material represented by formula (Bw-1) being within the above range, a visually superior black tends to be exhibited.

Dye (Y-1) Represented by Formula (Y-1) and Dye (Y-2) Represented by Formula (Y-2)

It is preferable that the ink composition of the embodiment further includes a dye represented by the following formulae (Y-1) and (Y-2). By including the dye (Y-2) represented by the following formulae (Y-1) and (Y-2), the image obtained tends to have superior coloring power, light resistance and hue.

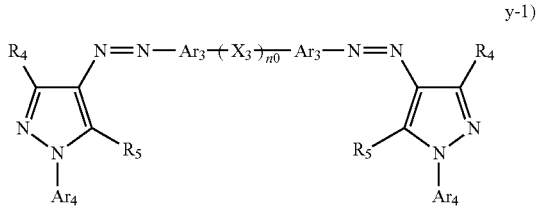

(in formula (Y-1), $R_4$ represents a substituent, $R_5$ represents —$OR_6$ or —$NHR_7$, $R_6$ and $R_7$, represents a hydrogen atom or a substituent, $X_3$ represents a bivalent linking group, n0 is 0 or 1, $Ar_3$ represents a bivalent hetero ring group, and $Ar_4$ represents an alkyl group, an aryl group or a triazine group.)

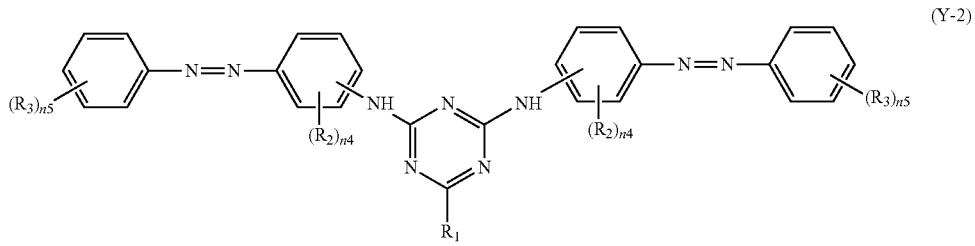

(Y-2)

(in formula (Y-2), $R_1$ represents a hydrogen atom or a substituent, $R_2$ represents a substituent, $R_3$ represents an alkyl group which may form an ionic hydrophilic group or a ring, n4 is 0 to 4, and n5 is 2 to 5.)

It is preferable that the content ratio B (dye (Bk-1):dye (Bw-1):dye (Y-1):dye (Y-2)) of the dye (Bk-1), the dye (Bw-1), the dye (Y-1), and the dye (Y-2) is 100:20:5:5 to 100:40:12:12, more preferably 100:20:5:5 to 100:37.5:12:12, and still more preferably 100:20:5:5 to 100:35:7:7. By the content ratio B being within the above range, the hue tends to be further improved.

Substituent Group A

First, the substituent group A and the ionic hydrophilic group will be defined.

Although the substituent group A is not particularly limited, example thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group, a sulfonamido group, and an ionic hydrophilic group. These substituents maybe be further substituted, and possible examples of the further substituents include groups selected from the substituent group A described above.

More specifically, examples of the halogen atoms include a fluorine atom, a chlorine atom, a bromine atom, and an iodine atom.

As the alkyl group, examples include a linear, branched or cyclic substituted or unsubstituted alkyl group, and also encompass a cycloalkyl group, a bicycloalkyl group, a tricyclo structure or the like with still more cyclical structures. The alkyl group (for example, an alkyl group of an alkoxy group and an alkylthio group) in the substituents described below represents an alkyl group of such a concept. Specifically, the alkyl group is preferably a (C1-C30) alkyl group, and examples thereof include a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group, the cycloalkyl group is preferably a (C3-C30) substituted or unsubstituted cycloalkyl group, and examples thereof include a cyclohexyl group, a cyclopentyl group, and a 4-n-dodecylcyclohexyl group, and the bicycloalkyl group is preferably (C5-C30) substituted or unsubstituted bicycloalkyl group, that is a monovalent group with one hydrogen atom is removed from the (C5-C30) bicycloalkane, and examples include a bicyclo [1,2,2] heptane-2-yl group and a bicyclo [2,2,2] octane-3-yl group.

Examples of the aralkyl group include a substituted or unsubstituted aralkyl group, and it is preferable that the substituted or unsubstituted aralkyl group is a (C7-C30) aralkyl group. For example, examples include a benzyl group and 2-phenethyl group.

Examples of the alkenyl group include a linear, branched, and cyclic substituted or unsubstituted alkenyl group, and encompass a cycloalkenyl group and a bicycloalkenyl group. Specifically, the alkenyl group is preferably a (C2-C30) substituted or unsubstituted alkenyl group, and examples thereof include a vinyl group, an allyl group, a prenyl group, a geranyl group and an oleyl group, the cycloalkenyl group is preferably a (C3-C30) substituted or unsubstituted cycloalkenyl group, that is a monovalent group with one hydrogen atom of the (C3-C30) cycloalken is removed, and examples thereof include 2-cyclopentene-1-yl group, and a 2-cyclohexene-1-yl group, and the bicycloalkenyl group is a substituted or unsubstituted cycloalkenyl group, and preferably a (C5-C30) substituted or unsubstituted bicycloalkenyl group, that is a monovalent group with one hydrogen atom of the bicycloalkene having a double bond removed, and examples thereof include a bicyclo [2,2,1] hepto-2-en-1-yl group and a bicyclo [2,2,2] octo-2-en-4-yl group.

The alkynyl group is preferably a (C2-C30) substituted or unsubstituted alkynyl group, and examples thereof include an ethynyl group, a propargyl group, and a trimethylsilylethynyl group.

The aryl group is preferably a (C6-C30) substituted or unsubstituted aryl group, and examples thereof include a phenyl group, a p-tolyl group, a naphthyl group, an m-chlorophenyl group, and an o-hexadecanoylaminophenyl group.

The heterocyclic group is preferably a monovalent group in which one hydrogen atom from a 5- or 6-member substituted or unsubstituted aromatic or non-aromatic heterocyclic compound is removed, and more preferably a (C3-C30) 5- or 6-member aromatic heterocyclic group, and examples thereof include a 2-furyl group, a 2-thienyl group, a 2-pyrimidyl group, and a 2-benzothiazolyi group.

The alkoxy group is preferably a (C1-C30) substituted or unsubstituted alkoxy group, and examples thereof include a methoxy group, an ethoxy group, an isopropoxy group, a t-butoxy group, an n-octyloxy group, and a 2-methoxyethoxy group.

The aryloxy group is preferably a (C6-C30) substituted or unsubstituted aryloxy group, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a (C0-C20) substituted or unsubstituted silyloxy group, and examples thereof include a trimethyl silyloxy group, and a diphenylmethyl silyloxy group.

The heterocyclic oxy group is preferably (C2-C30) substituted or unsubstituted heterocyclic oxy group, and examples thereof include a 1-phenyltetrazole-5-oxy group and a 2-tetrahydropyranyloxy group.

The acyloxy group is preferably a (C2-C30) substituted or unsubstituted alkylcarbonyloxy group, and a (C6-C30) substituted or unsubstituted arylcarbonyloxy group, and examples thereof include an acetyloxy group, a pivaloyloxy group, a stearoyloxy group, a benzoyloxy group, and a p-methoxyphenylcarbonyloxy group.

The carbamoyloxy group is preferably a (C1-C30) substituted or unsubstituted carbamoyloxy group, and examples thereof include an N,N-dimethylcarbamoyloxy group, an N,N-diethylcarbamoyloxy group, a morpholinocarbamoyloxy group, an N,N-di-n-octylamonocarbonyloxy group, and an N-n-octylcarbamoyloxy group.

The alkoxycarbonyloxy group is preferably a (C2-C30) substituted or unsubstituted alkoxycarbonyloxy group, and examples thereof include a methoxycarbonyloxy group, an ethoxycarbonyloxy group, a t-butoxycarbonyloxy group, and an n-octylcarbonyloxy group.

The allyloxycarbonyl group is preferably a (C7-C30) substituted or unsubstituted allyloxycarbonyl group, and examples thereof include a phenoxycarbonyloxy group, a p-methoxyphenoxycarbonyloxy group, p-n-hexadecyloxyphenoxycarbonyloxy group.

The amino group include an alkylalmino group, an arylamino group, and a heterocyclic amino group, is preferably an amino group, a (C1-C30) substituted or unsubstituted alkylamino group, and a (C6-C30) substituted or unsubstituted anilino group, and examples thereof include a methylamino group, a dimethylamino group, an anilino group, an N-methyl-anilino group, a diphenylamino, and a triazinylamino group.

The acylamino group is preferably a formylamino group, a (C1-C30) substituted or unsubstituted alkylcarbonylamino group, a (C6-C30) substituted or unsubstituted arylcarbonylamino group, and examples thereof include an acetylamino group, a pivaloylamino group, a lauroylamino group, a bezoylamino group, and a 3,4,5-tri-n-octyloxyphenylcarbonylamino group.

The aminocarbonylamino group is preferably a (C1-C30) substituted or unsubstituted aminocarbonylamino group, and examples thereof include carbomoylamino group, an N,N-dimethylaminocarbonylamino group, an N,N-diethylaminocarbonylamino group, and a morpholinocarbonylamino group.

The alkoxycarbonylamino group is preferably a (C2-C30) substituted or unsubstituted alkoxycarbonylamino group, and examples thereof include a methoxycarbonylamino group, an ethoxycarbonylamino group, a t-butoxycarbonylamino group, an n-octadecyloxycarbonylamino group, and an N-methyl-methoxycarbonylamino group.

The aryloxycarbonylamino group is preferably a (C7-C30) substituted or unsubstituted aryloxycarbonylamino group, and examples thereof include a phenoxycarbonylamino group, a p-chlorophenoxycarbonylamino group, an m-n-octyloxyphenoxycarbonylamino group.

The sulfamoylamino group is preferably a (C0-C30) substituted or unsubstituted sulfamoylamino group, and examples thereof include a sulfamoylamino group, an N,N-dimethylaminosulfonylamino group, and an N-n-octylaminosulfonylamino group.

The alkyl- or arylsulfonylamino group is preferably a (C1-C30) substituted or unsubstituted arylsulfonylamino group, or a (C6-C30) substituted or unsubstituted arylsulfonylamino group, and examples thereof include a methylsulfonylamino group, a butylsulfonylamino group, a phenylsulfonylamino group, 2,3,5-trichlorophenylsuflonylamino group, and a p-methylphenylsulfonylamino group.

The alkylthio group is preferably a (C1-C30) substituted or unsubstituted, and examples thereof include a methylthio group, an ethylthio group, and an n-hexadecylthio group.

The arylthio group is preferably a (C6-C30) substituted or unsubstituted arylthio group, and examples thereof include a phenylthio group, a p-chlorophenylthio group, and an m-methoxyphenylthio group.

The heterocyclic thio group is preferably a (C2-C30) substituted or unsubstituted heterocyclic thio group, and examples thereof include a 2-benzothiazolylthio group, 1-phenyltetrazole-5-yl thio group.

The sulfamoyl group is preferably a (C0-C30) substituted or unsubstituted sulfamoyl group, and examples thereof include an N-ethylsulfamoyl group, an N-(3-tridecyloxypropyl) sulfamoyl group, an N,N-dimethylsulfamoyl group, an N-acetylsulfamoyl group, an N-benzoylsulfamyl group, and an N—(N'-phenylcarbamoyl)sulfamoyl group.

The alkyl- or arylsulfinyl group is preferably a (C1-C30) substituted or unsubstituted alkylsulfinyl group and a (C6-C30) substituted or unsubstituted arylsulfinyl group, and examples thereof include a methylsulfinyl group, an ethylsulfinyl group, a phenylsulfinyl group, and a p-methylphenylsulfinyl group.

The alkyl- or arylsulfinyl group is preferably a (C1-C30) substituted or unsubstituted alkylsulfonyl group and a (C6-C30) substituted or unsubstituted arylsulfonyl group, and examples thereof include a methylsulfonyl group, an ethylsulfonyl group, a phenylsulfonyl group, and a p-methylphenylsulfonyl group.

The acyl group is preferably a formyl group, a (C2-C30) substituted or unsubstituted alkylcarbonyl group, a (C7-C30) substituted or unsubstituted arylcarbonyl group, or a heterocyclic carbonyl group bonded with a carbonyl group by a (C2-C30) substituted or unsubstituted carbon atom, and examples thereof include an acetyl group, a pivaroyl group, a 2-chloroacetyl group, a stearoyl group, a benzoyl group, a p-n-octyloxyphenylcarbonyl group, a 2-pyridylcarbonyl group and a 2-furylcarbonyl group.

The aryloxycarbonyl group is preferably a (C7-C30) substituted or unsubstituted aryloxycarbonyl group, and examples thereof include a phenoxycarbonyl group, an o-chlorophenoxycarbonyl group, an m-nitrophenoxycarbonyl group, and a p-t-butylphenoxycarbonyl group.

The alkoxycarbonyl group is preferably a (C2-C30) substituted or unsubstituted alkoxycarbonyl group, and examples thereof include a methoxycarbonyl group, an ethoxycarbonyl group, a t-butoxycarbonyl group, and an n-octylcarbonyl group.

The carbamoyl group is preferably a (C1-C30) substituted or unsubstituted carbamoyl group, and examples thereof include a carbamoyl group, an N-methylcarbamoyl group, an N,N-dimethylcarbamoyl group, N,N-di-n-octylcarbamoyl group, and an N-(methylsulfonyl) carbamoyl group.

The aryl- or heterocyclic azo group is preferably a (C6-C30) substituted or unsubstituted aryl azo group, and a (C3-C30) substituted or unsubstituted heterocyclic azo group, and examples thereof include phenylazo, p-chlorophenylazo, and 5-ethylthio-1,3,4-thiadiazole-2-yl azo.

The imide group is preferably an N-succinimide group, and examples thereof include an N-phthalimide group.

The phosphino group is preferably a (C0-C30) substituted or unsubstituted phosphino group, and examples thereof include a dimethylphosphino group, a diphenylphosphino group, and a methylphenoxyphospino group.

The phosphinyl group is preferably a (C0-C30) substituted or unsubstituted phosphinyl group, and examples thereof include a phosphinyl group, dioctyloxyphosphinyl group, and an ethoxyphosphinyl group.

The phosphenyloxy group is preferably a (C0-C30) substituted or unsubstituted phosphenyloxy group, and examples thereof include a diphenoxyphosphenyloxy group, and a dioctyloxyphosphenyloxy group.

The phosphinylamino group is preferably a (C0-C30) substituted or unsubstituted phosphinylamino group, and examples thereof include a dimethoxyphosphinylamino group and a dimethylaminophosphinylamino group.

The silyl group is preferably (C0-C30) substituted or unsubstituted silyl group, and examples thereof a trimethylsilyl group, a t-butyldimethylsilyl group, and a phenyldimethylsilyl group.

Ionic Hydrophilic Group

Examples include a sulfo group, a carboxyl group, a thiocarboxyl group, a sulphino group, a phosphino group, a dihydroxyphosphino group, and a quaternary ammonium group. A sulfo group and a carboxyl group are particularly preferable. The carboxyl group, phosphono group and sulfo group may also be in the form of a salt, an ammonium ions, alkali metal ions (for example, lithium ions, sodium ions, and potassium ions), and organic cations (for example, tetramethylammonium ions, and tetramethylguanidine ions) are included in examples of the counter cation, a lithium salt, a sodium salt, a potassium salt, and an ammonium are preferable, a lithium salt or a mixed salt with a lithium salt as the main component is more preferable, and a lithium salt is most preferable.

Dye (Y-1) Represented by Formula (Y-1)

Below, the azo dye (yellow dye) represented by the formula (Y-1) will be described.

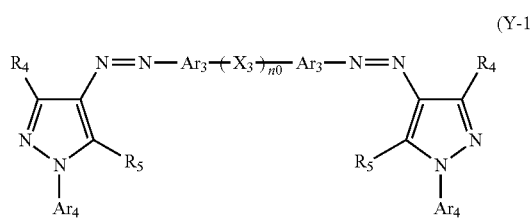

(Y-1)

(in formula (Y-1), $R_4$ represents a substituent, R; represents —$OR_6$ or —$NHR_7$, $R_6$ and $R_7$ represents a hydrogen atom or a substituent, $X_3$ represents a bivalent linking group, n0 is 0 or 1, $Ar_3$ represents a bivalent hetero ring group, and $Ar_4$ represents an alkyl group, an aryl group or a triazine group.)

In formula (Y-1), as the bivalent heterocyclic group represented by $Ar_3$, a 5- or 6-membered ring is preferably, and these maybe further condensed. The group may be an aromatic hetero ring or may be a non-aromatic hetero ring. Examples of the bivalent heterocyclic group represented $Ar_3$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among these, an aromatic heterocyclic group is preferable, when the preferred examples thereof are the same as previously given, examples thereof include pyridine, pyrazine, pyrimidine, pyridazine, triazine, pyrazole, imidazole, benzimidazole, triazole, thiazole, benzothiazole, isothiazole, benzisothiazole, and thiadiazole. Thiadiazole is the most preferable. These may include substituents, and examples of the substituent are the same as the previously described substituent group A.

In formula (Y-1), the substituent represented by $R_4$, $R_6$ and $R_7$ is selected according to the substituent group A.

In formula (Y-1), $R_4$ is preferably an alkyl group, an alkoxy group or an aryl group, a (C1-C4) alkyl group is preferable, a methyl group, an ethyl group, a tertiary butyl group, a phenyl group, a methoxy group, an ethyl group are more preferable, and a tertiary butyl group is still more preferable.

In formula (Y-1), $R_5$ is preferably a substituted or unsubstituted amino group, and $R_5$ is more preferably an unsubstituted amino group.

In formula (Y-1), it is preferable that $Ar_4$ is a substituted or unsubstituted aryl group, and a substituted or unsubstituted phenyl group is more preferable.

In formula (Y-1), examples of the substituent in a case of $R_4$, $R_5$, and $Ar_4$ further including a substituent include the substituent group A, and an alkyl group, an aryl group, a heterocyclic group, a cyano group, a hydroxyl group or an alkoxy group are preferably, and an alkyl group, an aryl group or a heterocyclic group are more preferable.

In formula (Y-1), it is preferable that the bivalent linking group represented by $X_3$ is an alkenylene group (for example, methylene, ethylene, propylene, butylene, and pentylene), an alkenylene group (for example, ethylene and propylene), an arylene group (for example, phenylene, naphthylene), a bivalent heterocyclic group (for example, 6-chloro-1,3,5-triazine-2,4-diyl group, a pyrimidine-2,4-diyl group, and a quinoxaline-2,3-diyl group), —O—, —CO—, —$NR_4$— ($R_4$ is a hydrogen atom, an alkyl group or an aryl group), —S—, —$SO_2$—, —SO— or a combination thereof.

In formula (Y-1), the alkylene group represented by $X_3$, alkynelene group, arylene group, bivalent heterocyclic group, alkyl group or aryl group represented by $R_4$ may include a substituent. Examples of the substituent are the same as the above substituents. The alkyl group and aryl group represented by $R_4$ includes substituted or unsubstituted alkyl groups or aryl groups. The substituted or unsubstituted alkyl group is preferably a (C1-C30) alkyl group, and the substituted or unsubstituted aryl group is preferably a (C6-C30) aryl group.

In formula (Y-1), in the bivalent linking group represented by $X_3$, a (C10) or lower alkenylene group, a (C10) or lower alkenylene group, a (C10) or lower alkynylene group, a (C6-C10) arylene group, a bivalent heterocyclic group, —O—, —S— or a combination thereof is more preferable, and an alkynylene group or —S— or a combination thereof is still more preferable.

It is preferable that the total carbon number in the bivalent linking group is 0 to 50, 0 to 30 is more preferable, and 0 to 10 is most preferably.

In formula (Y-1), the aryl group or arylene group represented by $Ar_4$ is the same as the preferable groups with the same meaning as the aryl group or arylene group represented by the above-described $R_4$. The triazine group represented by $Ar_4$ may include a monovalent substituent (the monovalent substituent is the same as the preferred groups and has the same meaning as the substituent group A).

Although not particularly limited, it is preferable that the dye (Y-1) represented by formula (Y-1) is a compound represented by the following formula (Y-1-1), and a compound represented by the following formula (Y-1-2) is more preferable.

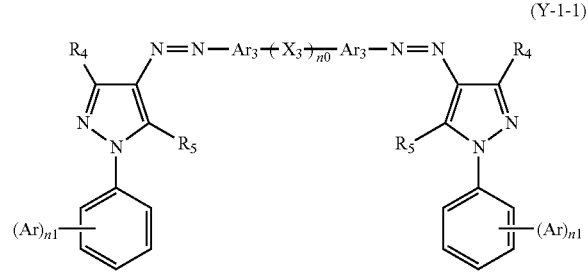

(Y-1-1)

(in formula (Y-1-1), $R_4$ represents a substituent, $R_5$ represents $-OR_6$ or $-NHR_7$, $R_6$ and $R_7$ represents a hydrogen atom or a substituent, $X_3$ represents a bivalent linking group, n0 is 0 or 1, $Ar_3$ represents a bivalent hetero ring group, $A_1$ represents an ionic hydrophilic group, and n1 represents 0 to 2.)

In formula (Y-1-1), $R_4$, $R_5$, $Ar_3$, n0 and $X_3$ are the same as the preferred groups with the same meaning as $R_4$, $R_5$, $Ar_3$, n0, and $X_j$ in formula (Y-1).

In formula (Y-1-1), it is preferable that the ionic hydrophilic group represented by Al is $-SO_3M$ or $-CO_2M$, $-SO_3M$ is more preferable, and $-CO_2K$ is particularly preferable. M each independently represents a hydrogen atom or a monovalent counter cation, and examples of the monovalent counter cation include ammonium ions, alkali metal ions (for example, lithium ions, sodium ions, and potassium ions), and organic cations (for example, tetramethylammonium ions, and tetramethylguanidine ions), a lithium salt, a sodium salt, a potassium salt, and an ammonium salt are preferable, a lithium salt or a mixed salt with a lithium salt as the main component is more preferable, and a lithium salt is most preferable.

Formula (Y-1-2):

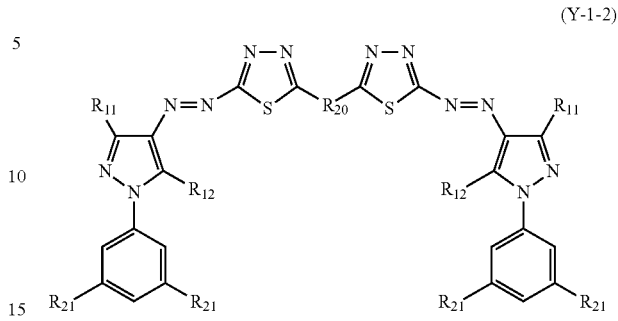

(Y-1-2)

(in formula (Y-1-2), $R_{20}$ represents a linking group formed from an alkylene group, $-S-$ or a combination thereof, $R_{21}$ represents an ionic hydrophilic group, $R_{11}$ represents an alkyl group, and $R_{12}$ represents an amino group.)

In formula (Y-1-2), $R_{20}$ is the same as the preferred groups with the same meaning as the alkylene group in the bivalent group represented by $X_1$ in formula (Y-1).

In formula (Y-1-2), $R_2$: represents a carboxyl group ($-CO_2M$), M each independently represents a hydrogen atom or a monovalent counter cation, and examples of the monovalent counter cation include ammonium ions, alkali metal ions (for example, lithium ions, sodium ions, and potassium ions), and organic cations (for example, tetramethylammonium ions, and tetramethylguanidine ions), a lithium salt, a sodium salt, a potassium salt, and an ammonium salt are preferable, a lithium salt or a mixed salt with a lithium salt as the main component is more preferable, and a lithium salt is most preferable.

In formula (Y-1-2), alkyl group represented by $R_{11}$ and the amino group represented by $R_{12}$ are respectively the same as the preferred groups with the same meaning as the alkyl group and amino group in $R_4$ and $R_5$, in the above-described formula (Y-1).

Although specific examples of the compound represented by formula (Y-1) are shown below, the compound used in the embodiment is not limited to the following examples. In the specific examples Et and Ph signify ethyl and phenyl, respectively.

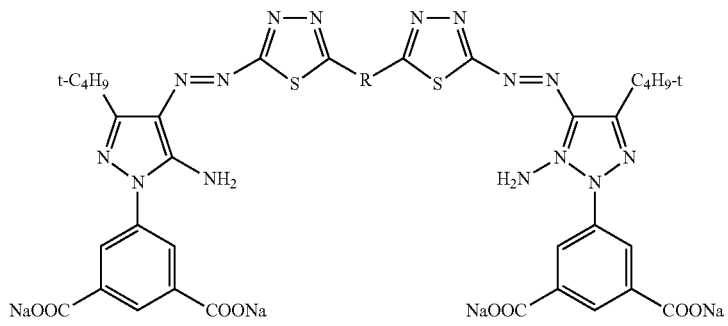

| Pigment | R |
|---------|---|
| 1 | $-SCH_2S-$ |
| 2 | $-SCH_2CH_2S-$ |
| 3 | $-SCH_2CH_2CH_2S-$ |
| 4 | $-SCH_2CH_2CH_2CH_2CH_2S-$ |

-continued
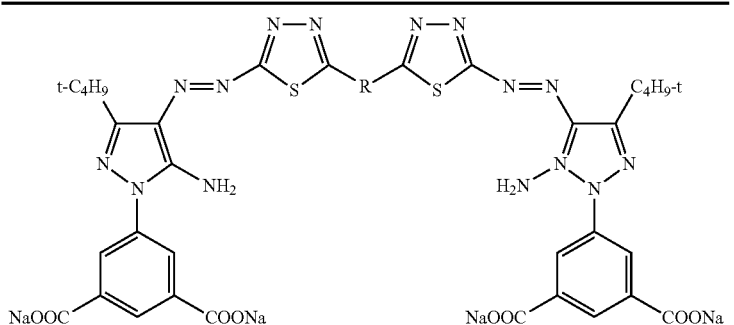
| Pigment | R |
|---|---|
| 5 | 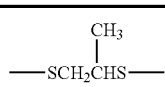 —SCH$_2$CHS— with CH$_3$ |
| 6 | 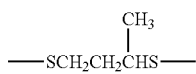 —SCH$_2$CH$_2$CHS— with CH$_3$ |
| 7 | —SC$_2$H$_4$OC$_2$H$_4$S— |
| 8 | —SC$_2$H$_4$OC$_2$H$_4$OC$_2$H$_4$S— |
| 9 | 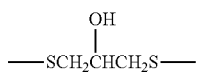 —SCH$_2$CHCH$_2$S— with OH |
| 10 | 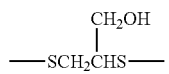 —SCH$_2$CHS— with CH$_2$OH |
| 11 | 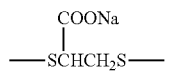 —SCHCH$_2$S— with COONa |
| 12 | 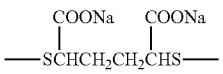 —SCHCH$_2$CH$_2$CHS— with COONa, COONa |
| 13 | 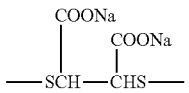 —SCH—CHS— with COONa, COONa |
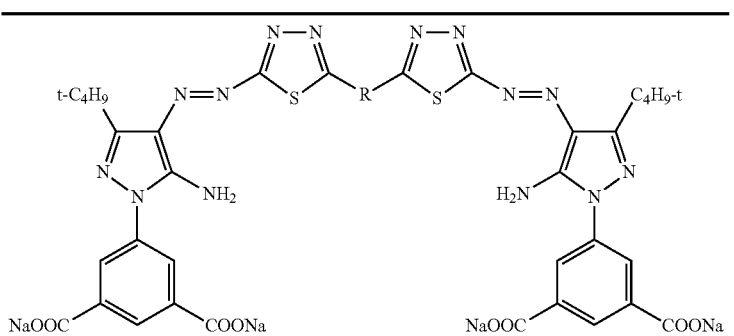
| Pigment | R |
|---|---|
| 14 | 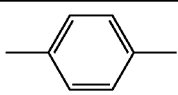 |

-continued
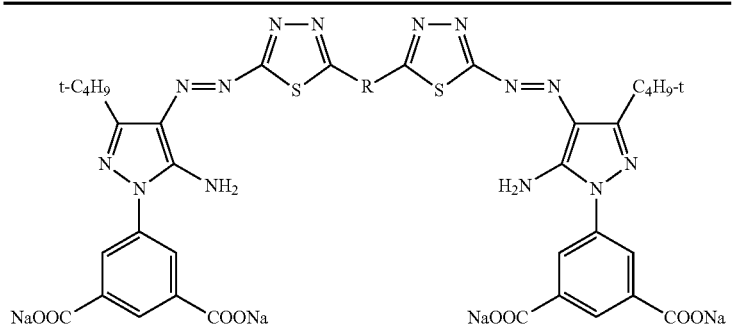
| Pigment | R |
|---|---|
| 15 | 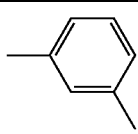 |
| 16 |  |
| 17 |  |
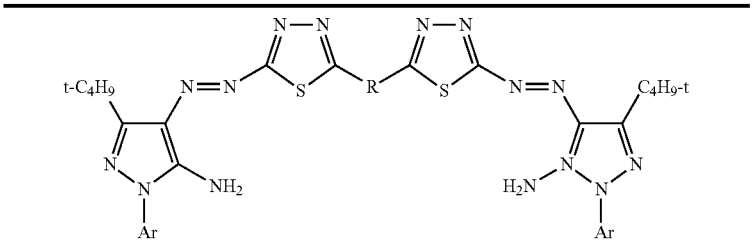
| Pigment | Ar | R |
|---|---|---|
| 18 | 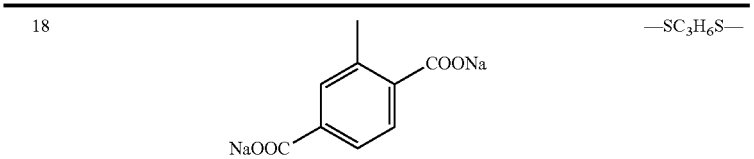 | —SC$_3$H$_6$S— |
| 19 | 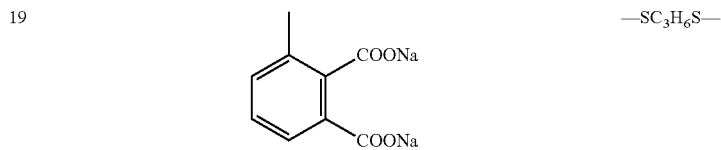 | —SC$_3$H$_6$S— |
| 20 | 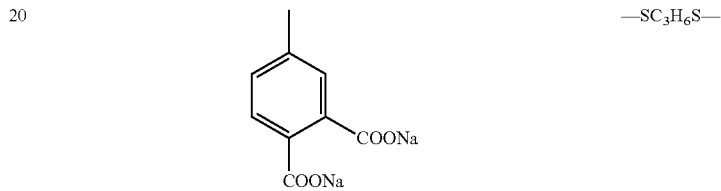 | —SC$_3$H$_6$S— |

-continued

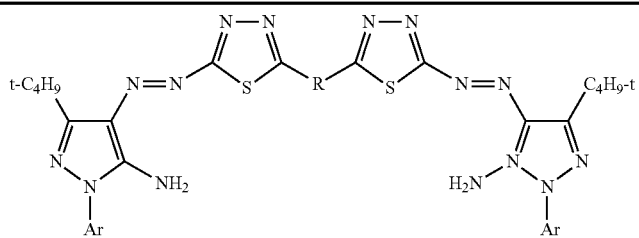

| Pigment | Ar | R |
|---|---|---|
| 21 | (2-methyl-4-NaO3S-phenyl with SO3Na) | —SC3H6S— |
| 22 | (3,5-bis(SO3Na)-phenyl with methyl) | —SC3H6S— |
| 23 | (triazine bridged bis(3,5-COONa-phenylamino) with methyl) | —SC3H6S— |

[Structure: pyrazole-azo-thiadiazole-SCH2CH2 with Ar = 3,5-bis(COOM)-phenyl]

| Pigment | M |
|---|---|
| 24 | K |
| 25 | Li |
| 26 | NH4 |
| 27 | NH(Et)3 |

-continued

[Structure: pyrazole-azo-thiadiazole-S(CH2)2CH2, R substituent, Ar on pyrazole N]

| Pigment | R | Ar |
|---|---|---|
| 28 | OEt | 3,5-bis(COONa)-phenyl (methyl substituted) |
| 29 | Ph | 3,5-bis(COONa)-phenyl (methyl substituted) |
| 30 | t-C4H9 | C3H6SO3Na |

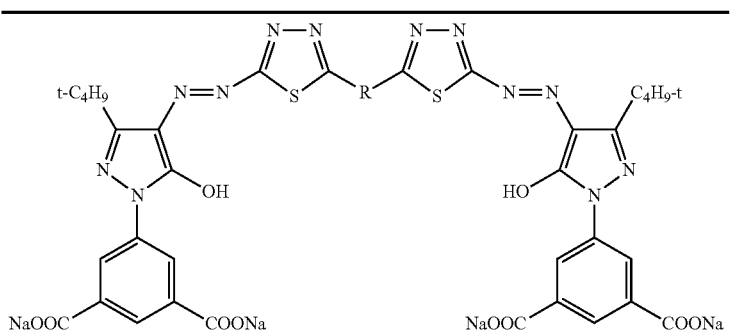

| Pigment | R |
|---|---|
| 31 | —SCH$_2$CH$_2$S— |
| 32 | —SCH$_2$CH$_2$CH$_2$S— |
| 33 | —SCH$_2$CH$_2$CH$_2$CH$_2$CH$_2$S— |
| 34 | 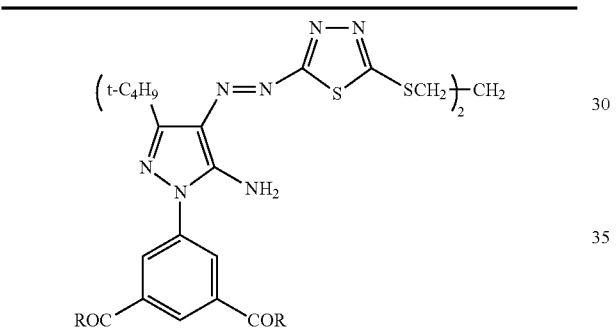 |

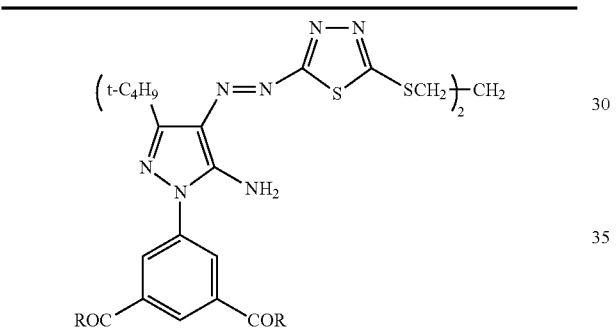

| Pigment | R |
|---|---|
| 35 | 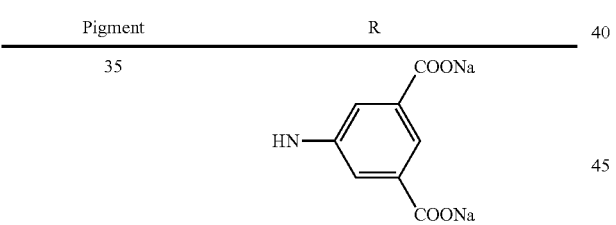 |
| 36 | NHC$_2$H$_4$COONa |
| 37 | 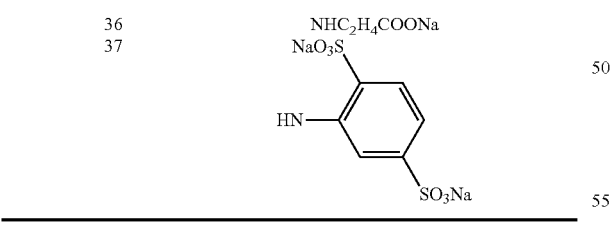 |

The compound represented by formula (Y-1) can be synthesized with an ordinary synthesis method, and it is possible to perform synthesis by modifying and variously combining the diazo component and coupling component disclosed in JP-A-2004-083903.

The content of the dye (Y-1) represented by the formula (Y-1) is preferably 0.010 to 1.0 mass % to the total content of black ink, more preferably 0.050 to 0.75 mass %, and still more preferably 0.10 to 0.50 mass %. By the content of the dye (Y-1) represented by formula (Y-1) being within the above range, the image obtained tends to have superior coloring power, light resistance and hue.

Dye (Y-2) Represented by Formula (Y-2)

Below, the dye (Y-2) represented by formula (Y-2) will be described.

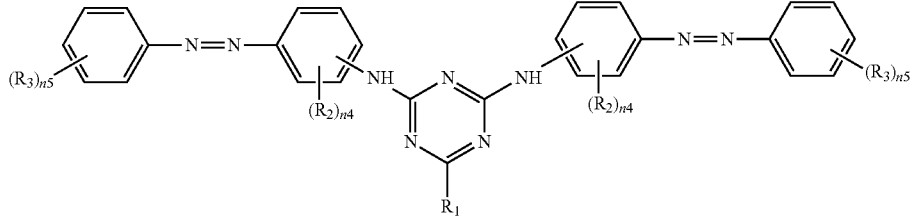

(Y-2)

(in formula (Y-2), $R_1$ represents a hydrogen atom or a substituent, $R_2$ represents a substituent, $R_3$ represents an alkyl group which may form an ionic hydrophilic group or a ring, n4 is 0 to 4, and n5 is 2 to 5.)

In formula (Y-2), examples of the substituent represented by formula $R_1$ and $R_2$ each independently include an alkyl that may have a substituent, an alkoxy that may have a substituent, an aryl that may have a substituent, a heterocyclic group that may have a substituent, —$NR^8R^9$, —NHCOR$^8$, —NHCONR$^8R^9$, —C(O)R$^8$, —C(O)OR$^8$, —C(O)NR$^8R^9$, —PO$_3$H$_2$, —SR$^8$, —SO$_2$Re, —SO$_2$NR$^8R^9$, —SOR$^6$, —SO$_3$H, —CF$_3$, —CN, —NO$_2$, hydroxy and halogen. Here, it is possible for $R^8$ and $R^9$ to independently be H, a (C1-C8) alkyl group that may have a substituent, an aryl group (for example, a phenyl group) that may have a substituent, and a heterocyclic group that may have a substituent, or $R^8$ and $R^9$ may form a 5- or 6-member ring (for example, piperidine, pyrrolidone, pyridine, piperizine or morpholine) that may be substituted together with a nitrogen atom to which $R^8$ and $R^9$ are bonded.

In formula (Y-2), it is preferable that the ionic hydrophilic group represented by $R_3$ is —SO$_3$M or —CO$_2$M, and —SO$_3$M is more preferable. M each independently represents a hydrogen atom or a monovalent counter cation, and examples of the monovalent counter cation include ammonium ions, alkali metal ions (for example, lithium ions, sodium ions, and potassium ions), and organic cations (for example, tetramethylammonium ions, and tetramethylguanidine ions), and a lithium salt, a sodium salt, a potassium salt, and an ammonium salt are preferable. It is preferable that the ionic hydrophilic group represented by $R_3$ is a sulfo group, and a potassium salt of a sulfo group is more preferable.

In formula (Y-2), the alkyl group represented by $R_3$ may include a substituent, an alkyl group with 1 to 4 carbon is preferable, and examples thereof include methyl, ethyl, propyl, isopropyl, butyl, and sec-butyl that may have a substituent with hydroxy, halogen, carboxy, sulfo group or the like. Although examples are not limited, examples thereof include trifluoromethyl, hydroxyethel, sulfopropyl, and carboxyethyl.

In formula (Y-2), examples of the ring in a case of forming a ring with the alkyl groups represented by $R_3$ bonded to one another include an aryl group that may have a substituent or a hetero ring that may have a substituent, examples of the aryl group and the hetero ring include the aryl group and the heterocyclic group in the above-described substituent group A, examples of the rings formed bonded to one another include a benzene ring and a naphthalene ring, and a benzene ring is preferable. It is preferable that the ring formed with the alkyl groups represented by $R_3$ bonded to one another is a substituted with a sulfone group.

In formula (Y-2), in a case where $R_1$ and $R_2$ is an alkoxy that may have a substituent, $R_1$ and $R_2$ are preferably a (C1-C8) alkoxy that may have a substituent, and more preferably a (C1-C4) alkoxy, for example, methoxy, ethoxy, propoxy, isopropoxy, and butoxy that may have a substituent with a hydroxy, a halogen or a carboxy group. Examples include, but are not limited to, a carboxypropyloxy, carboxyethoxy, hydroxyethoxy or chloroethoxy.

In formula (Y-2), in a case where $R_1$ and $R_2$ are aryl groups that may have a substituent, it is preferable that $R_1$ and $R_2$ are a phenyl that may have a substituent. Examples of the optional substituents on the aryl ring include, a (C1-C8) alkyl, a (C1-C8) alkoxy, —$NR^8R^9$, —NHCOR$^8$, —NHCONR$^8R^9$, —C(O)R$^8$, —C(O)OR$^8$, —C(O)NR$^8R^9$, —PO$_3$H$_2$, —SR$^8$, —SO$_2$R$^8$, —SO$_2$NR$^8R^9$, —SOR$^8$, —SO$_3$H, —CF$_3$, —CN, —NO$_2$, hydroxy or halogen, and herein, $R^8$ and $R^9$ are as previously disclosed. Although not limited, examples include carboxyphenyl, sulfophenyl, nitrophenyl, and chlorophenyl.

In formula (Y-2), in a case where $R_1$ and $R_2$ are a heterocyclic group that may have a substituent, $R_1$ and $R_2$ are preferably either of an aliphatic heterocyclic group that may have a substituent or an aromatic heterocyclic group that may have a substituent, for example, a thiophene, pyrazole, triazole, thiadiazole, thiazole, imidazole, pyridine, pyrrolidone, piperizine, morpholine, or pyrimidine that may have a substituent. Examples of the optional substituents on the heterocyclic group ring include a (C1-C8) alkyl, —$NR^8R^9$, —NHCOR$^8$, —NHCONR$^8R^9$, —C(O)OR$^8$, —C(O)NR$^8R^9$, —SR$^8$, —SO$_2$R$^8$, —SO$_2$NR$^8R^9$, —SOR$^8$, —SO$_3$H—, —CF$_3$, —CN, —NO$_2$, hydroxy or halogen, and here, Re and $R^9$ are as previously disclosed. Although the examples are not limited, examples include carboxytriazole, chloropyridyl, and cyanothiophene.

In formula (Y-2), $R_1$ and $R_2$ are each independently a hydrogen atom, hydroxyl group, a (C1-C4) alkyl group that may have a substituent (preferably a methyl group or an ethyl group), a (C1-C4) alkoxy group that may have a substituent (preferably a methoxy group or an ethoxy group), —$NR^8R^9$—SO$_2$NR$^8R^9$, or —NHCONR$^8R^9$, and herein, although $R^8$ and $R^9$ are as described above, it is preferable that $R^8$ is H, $R^9$ is H, a (C1-C4) alkyl group that may have a substituent (preferably a methyl group or an ethyl group) or an aryl group (preferably a phenyl group).

In formula (Y-2), it is preferable that $R_1$ and $R_2$ are each independently a hydrogen atom, a hydroxyl group, a (C1-C4) alkyl group, a (C1-C4) alkoxy group, a carboxylic acid group, —$NR^8R^9$ or NHCONH$_2$.

In formula (Y-2), $R_1$ is preferably hydroxyl group or —$NR^8R^9$. It is preferable that $R^8$ is H, and $R^9$ is a (C1-C4) alkyl group that may have a substituent (preferably a methyl group or an ethyl group), and it is more preferable that $R^3$ is H and $R^9$ is a (C1-C4) alkyl group substituted with a hydroxyl group (preferably a methyl group or an ethyl group).

In formula (Y-2), $R_2$ is more preferably a hydrogen atom, a (C1-C4) alkyl or carboxylic acid, and is still more preferably a carboxylic acid in light of having particularly favorable solubility, light fastness and ozone fastness.

In formula (Y-2), n4 is 0 to 4, 1 to 4 is preferable, and 1 to 2 is more preferable.

In the formula (Y-2), n5 is 2 to 5, 2 to 4 is preferable, and 2 to 3 is more preferable. This is because the solubility of the compound in the formula (Y-2) in the aqueous liquid medium is improved.

Although not particularly limited, it is preferable that the dye (Y-2) represented by formula (Y-2) is a compound represented by the following formula (Y-2-1) or a compound represented by the following formula (Y-2-2).

(in formula (Y-2-2), $R_1$ represents a hydrogen atom or a substituent, $R_2$ represents a substituent, $A_3$ represents an ionic hydrophilic group, n4 is 0 to 4, and n3 is 2 to 4.)

In formula (Y-2-2), it is preferable that the ionic hydrophilic group represented by $A_3$ is —$SO_3M$ or —$CO_2M$, and —$SO_3M$ is more preferable. M each independently represents a hydrogen atom or a monovalent counter cation, and examples of the monovalent counter cation include ammonium ions, alkali metal ions (for example, lithium ions, sodium ions, and potassium ions), and organic cations (for example, tetramethylammonium ions, and tetramethyl-

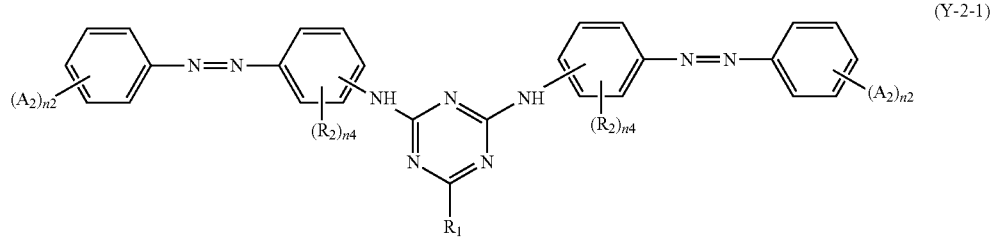

(Y-2-1)

(in formula (Y-2-1), R represents a hydrogen atom or a substituent, $R_2$ represents a substituent, $A_2$ represents an ionic hydrophilic group, n4 is 0 to 4, and n2 is 2 to 4.)

In formula (Y-2-1), it is preferable that the ionic hydrophilic group represented by $A_2$ is —$SO_3M$ or —$CO_2M$, —$SO_3M$ is more preferable. M each independently represents a hydrogen atom or a monovalent counter cation, and examples of the monovalent counter cation include ammonium ions, alkali metal ions (for example, lithium ions, sodium ions, and potassium ions), and organic cations (for example, tetramethylammonium ions, and tetramethylguanidine ions), and a lithium salt, a sodium salt, a potassium salt, and an ammonium salt are preferable. The ionic hydrophilic group represented by A; is preferably a sulfo group, and a potassium salt of a sulfo group is more preferable.

In formula (Y-2-1), $R_1$ and $R_2$ are the same as the preferred groups and have the same meaning as $R_1$ and $R_2$ in formula (Y-2).

In the formula (Y-2-1), n4 is 0 to 4, 1 to 4 is preferable, and 1 to 2 is more preferable. n2 is preferably 2 to 4, and more preferably 2 to 3. This is because the solubility of the compound in the formula (Y-2-1) in the aqueous liquid medium is improved.

guanidine ions), and a lithium salt, a sodium salt, a potassium salt, and an ammonium salt are preferable. The ionic hydrophilic group represented by $A_3$ is preferably a sulfo group, and a potassium salt of a sulfo group is more preferable.

In formula (Y-2-2), $R_1$ and $R_2$ are the same as the preferred groups and have the same meaning as $R_1$ and $R_2$ in formula (Y-2).

In the formula (Y-2-2), n4 is 0 to 4, 1 to 4 is preferable, and 1 to 2 is more preferable.

In the formula (Y-2-2), n3 is preferably 2 to 4, and 2 to 3 is preferable. This is because the solubility of the compound in the formula (Y-2-2) in the aqueous liquid medium is improved.

It is more preferable that the compound represented by formula (Y-2-2) is a compound represented by the following formula (Y-2-3).

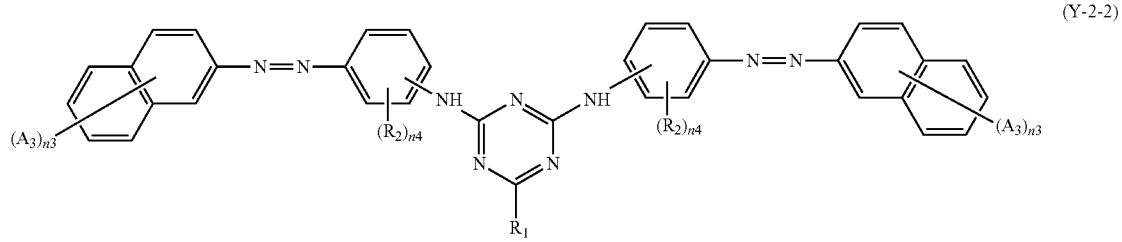

(Y-2-2)

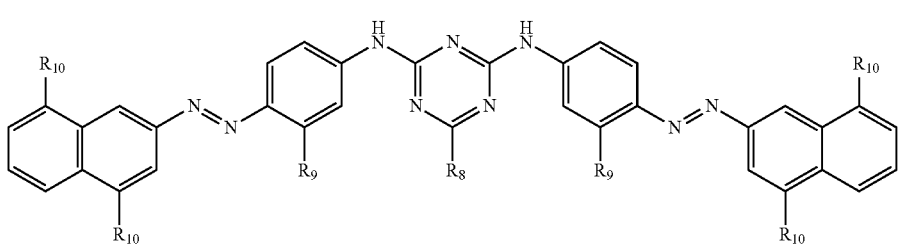

(Y-2-3)

(In formula (Y-2-3), Re represents a hydroxyl group or —NR$^8$R$^9$, R$_9$ each independently represents a hydrogen atom, a hydroxyl group, a (C1-C4) alkyl group, a (C1-C4) alkoxy group, a carboxylic acid group, —NR$^9$R$^9$ or NHCONH2, R$^8$ and R$^9$ are each independently H, a (C1-C8) alkyl group that may have a substituent, an aryl group (for example, a phenyl group) that may have a substituent, and a heterocyclic group that may have a substituent, or Re and R$^9$ can form a 5- or 6-membered ring that may have a substituent together with a nitrogen atom to which Re and R$^9$ are bonded, and R$_{10}$ each independently represents a carboxyl group or a sulfo group.)

In formula (Y-2-3), examples of the 5- or 6-membered ring formed by R$^8$ and R$^9$ include a piperidine, pyrrolidone, pyridine, piperizine or a morpholine. These may be substituted, and examples of the substituent include the above-described group A. The amino group represented by R$_6$, the alkyl group, alkoxy group, sulfo group and aminocarbonylamino group represented by R$_9$, and the sulfo group represented by R$_{10}$ are the same as the preferred groups, and have the same meaning as the amino group, alkyl group, alkoxy group, sulfo group and aminocarbonylamino group in the above-described group A.

In formula (Y-2-3), R$^{10}$ is preferably a sulfo group, and a potassium salt of a sulfo group is more preferable.

The compound represented by formulae (Y-2) to (Y-2-3) may be symmetrical or asymmetrical. Next, specific examples of the dye (Y-2) represented by formula (Y-2) in the embodiment are shown below.

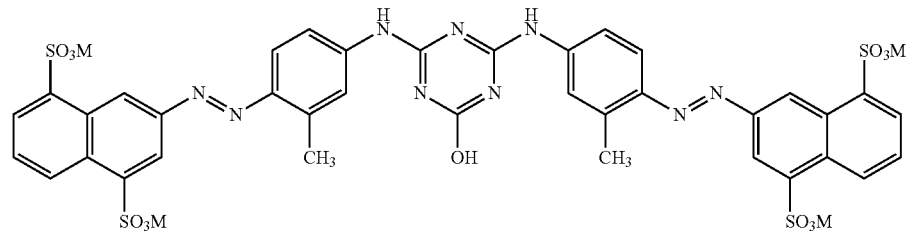

M:Li/Na = 4/1

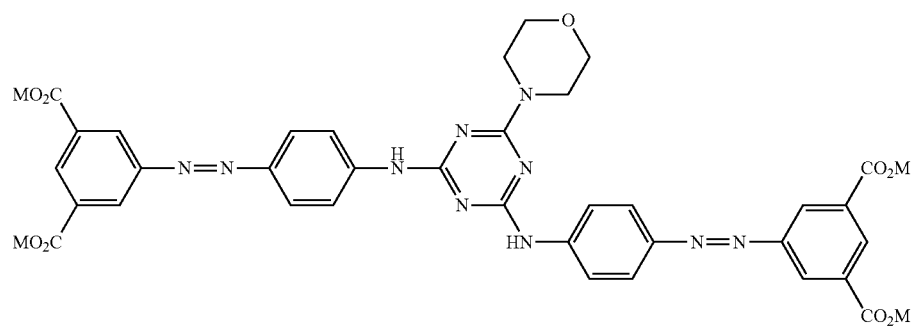

M:Na/NH$_4$ = 3/2

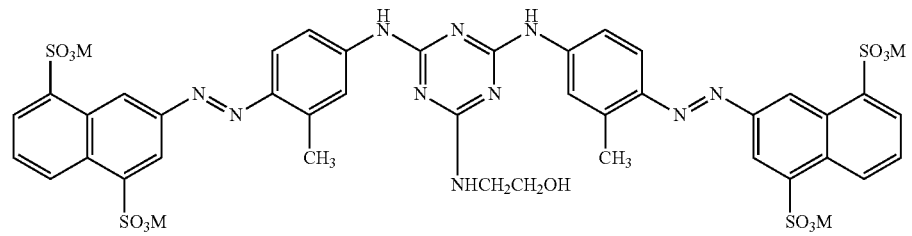

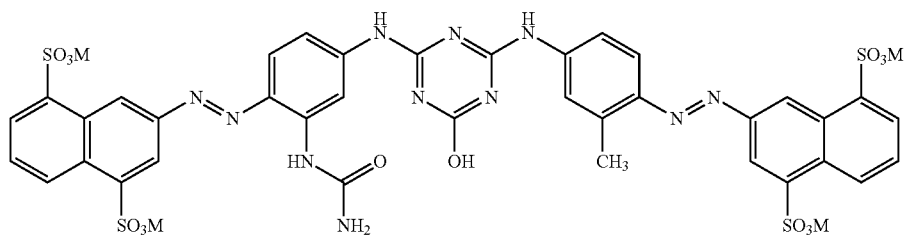
M:Li/Na = 4/1
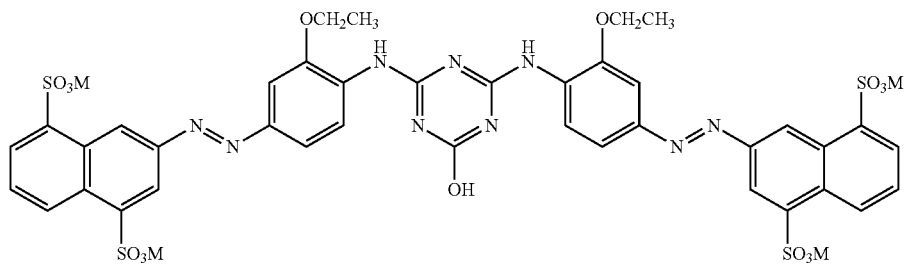
M:Li/Na = 4/1
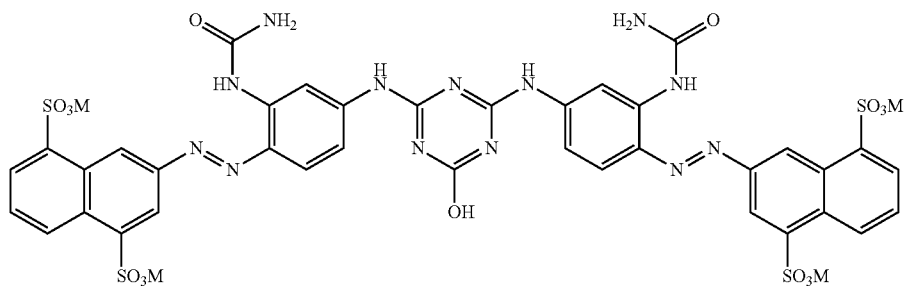
M:Li/Na = 4/1
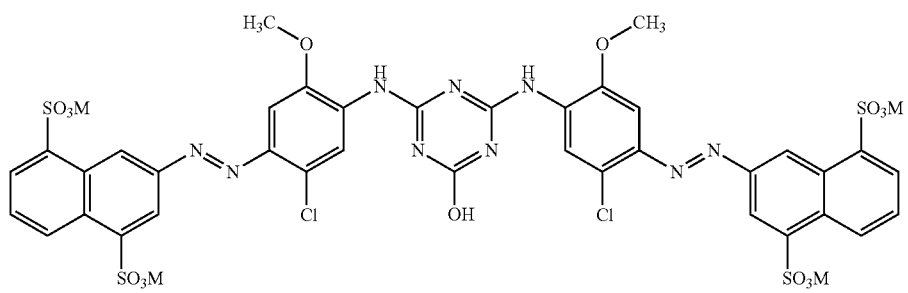
M:Li/Na = 4/1
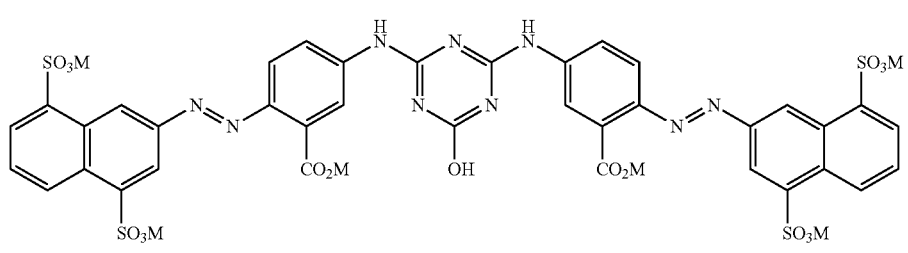
M:Li/Na = 4/1

-continued
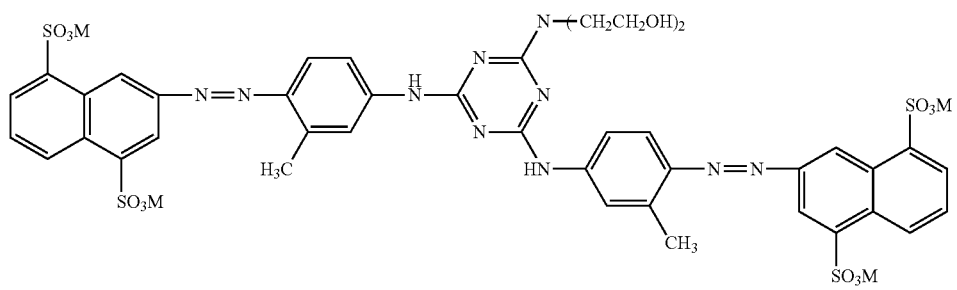
M:Na
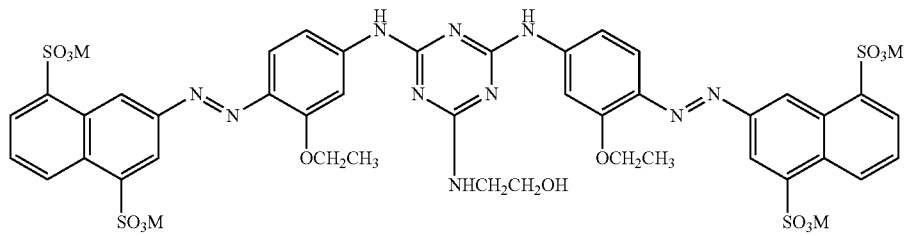
M:Na
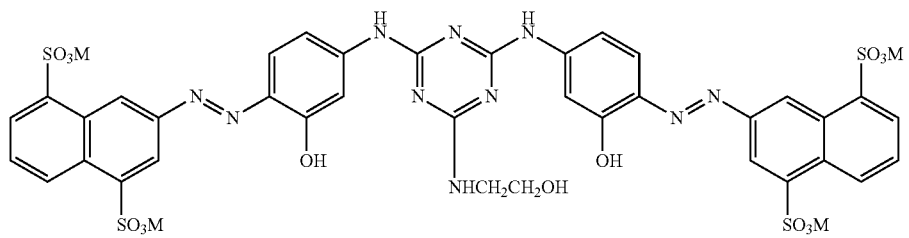
M:Na
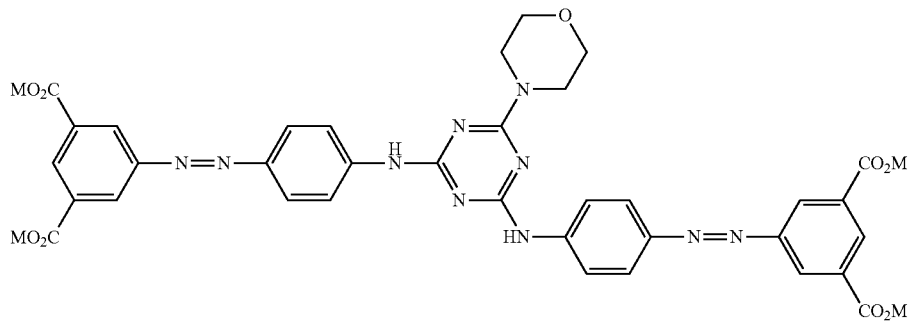
M:Na/NH$_4$ = 4/1
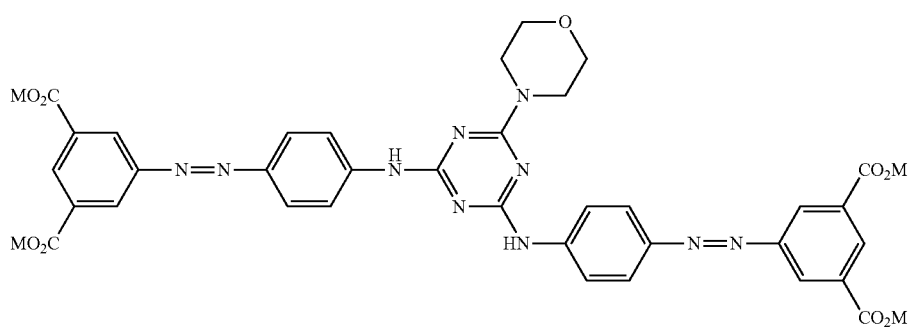
M:Na/NH$_4$ = 1/4

-continued
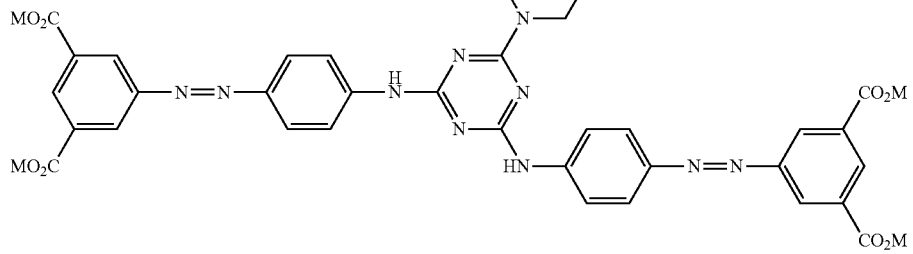
M:NH4
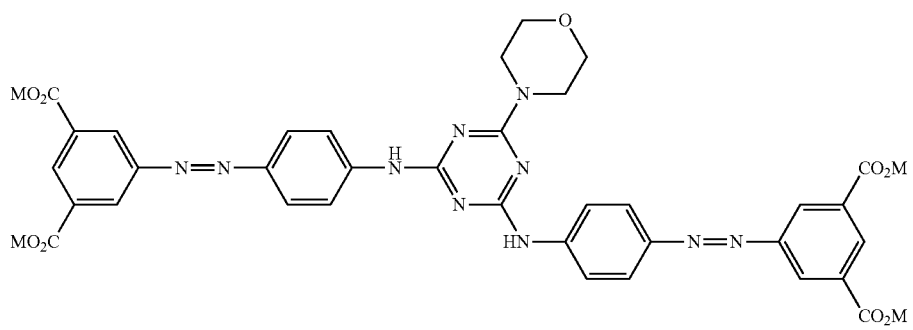
M:Na
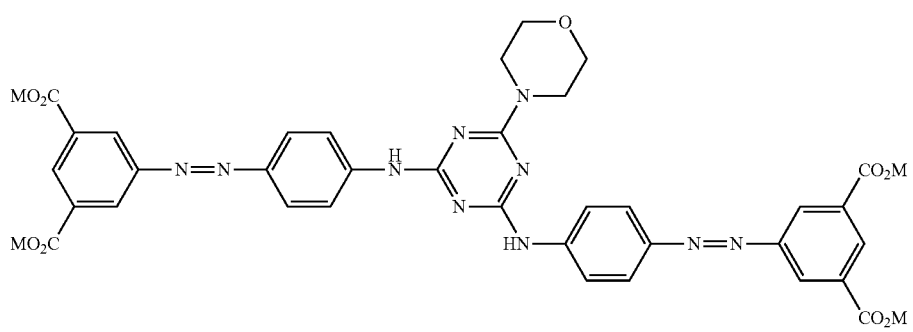
M:Na/NH4 = 2/3
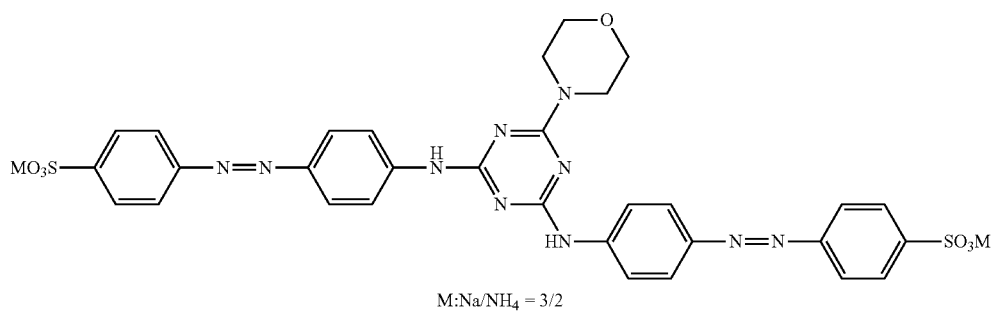
M:Na/NH4 = 3/2

-continued
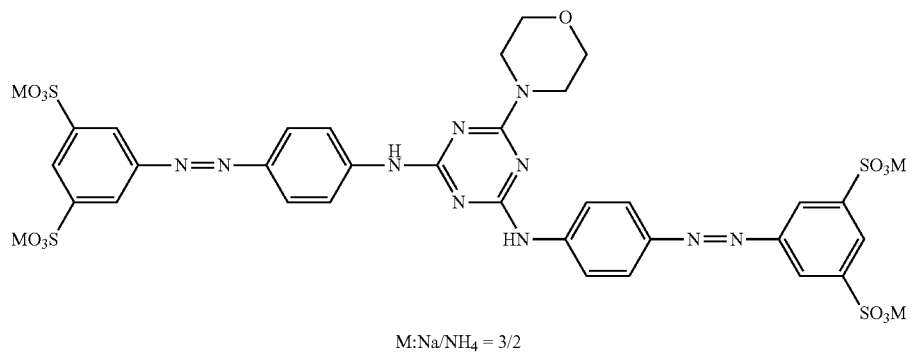
M:Na/NH₄ = 3/2
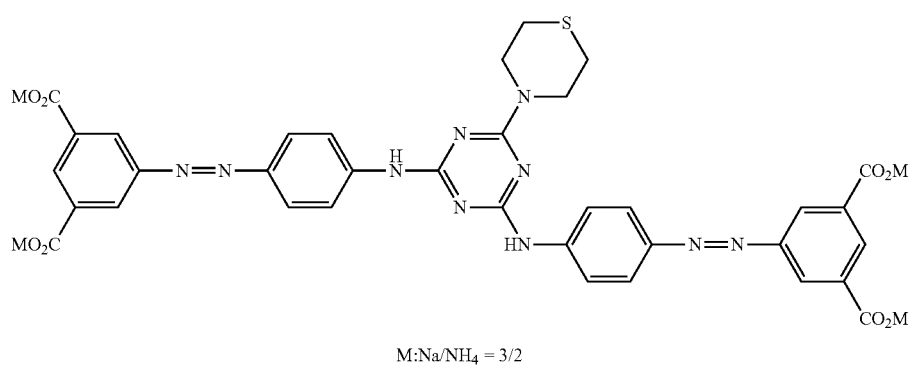
M:Na/NH₄ = 3/2
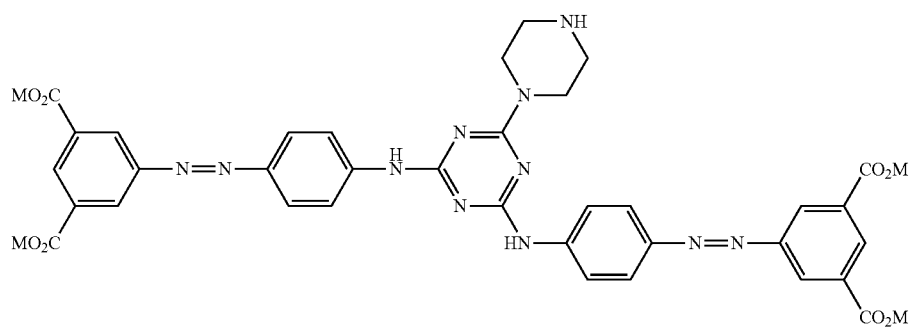
M:Na/NH₄ = 3/2
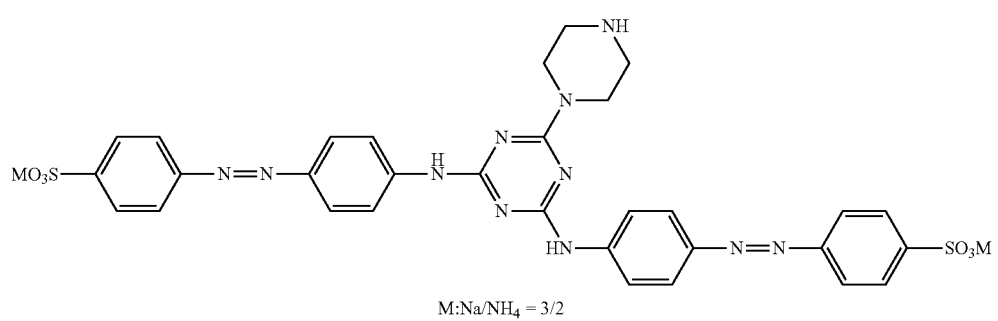
M:Na/NH₄ = 3/2

-continued
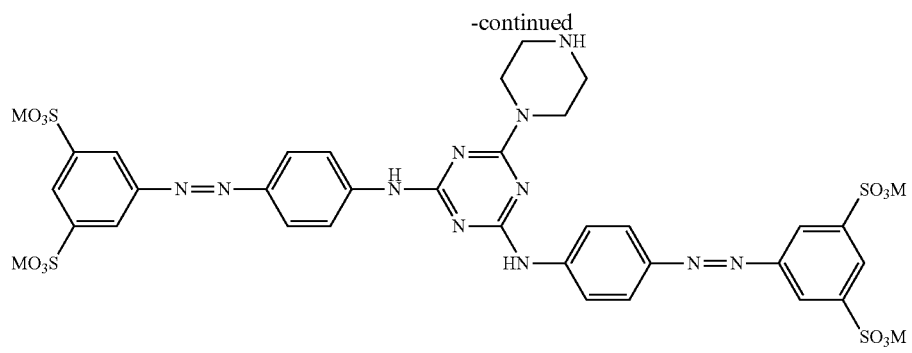
M:Na/NH$_4$ = 3/2
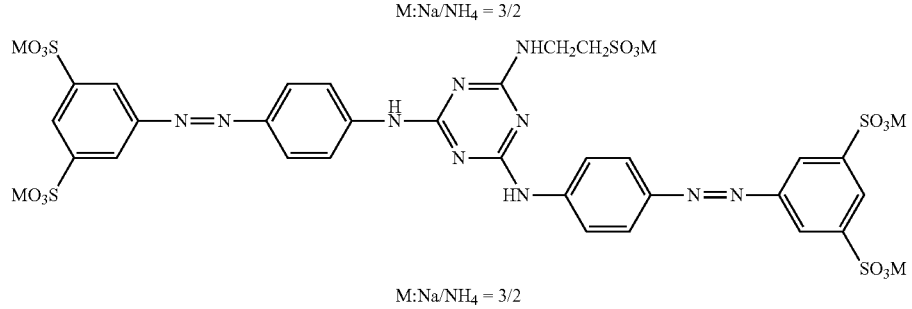
M:Na/NH$_4$ = 3/2
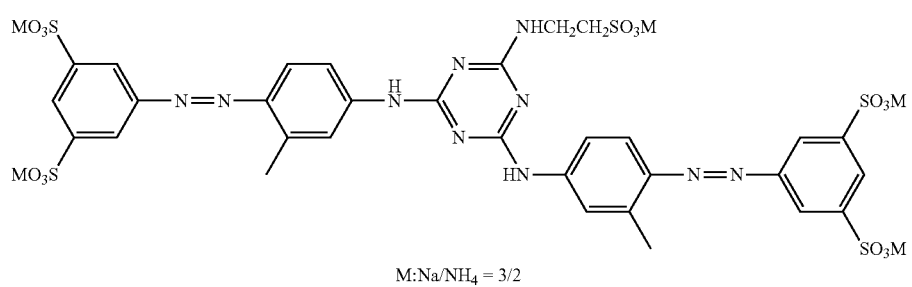
M:Na/NH$_4$ = 3/2
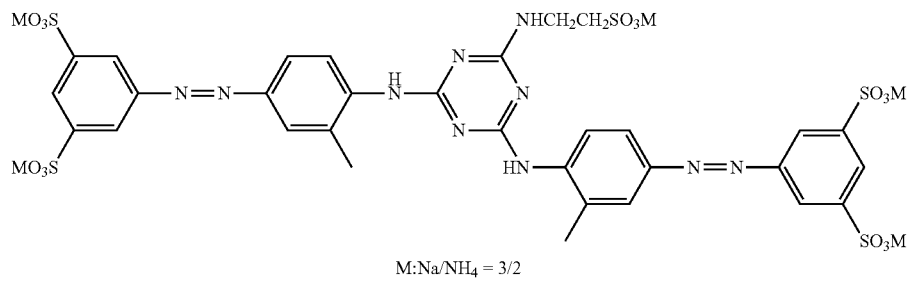
M:Na/NH$_4$ = 3/2
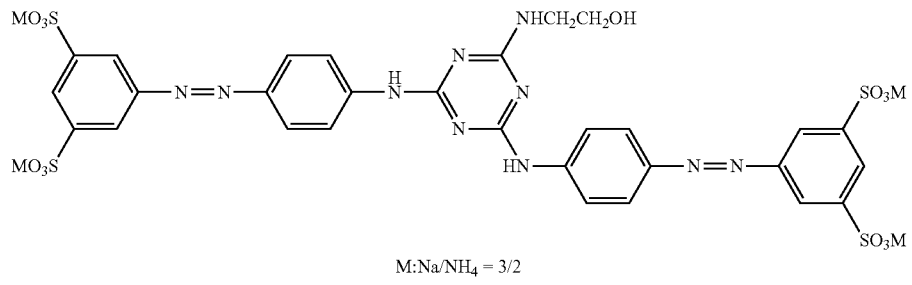
M:Na/NH$_4$ = 3/2

-continued
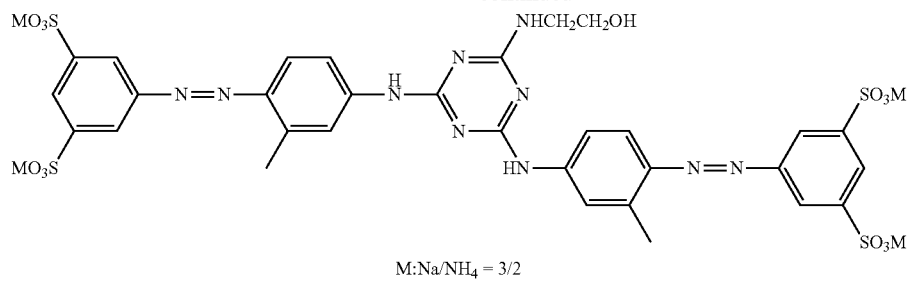
M:Na/NH₄ = 3/2
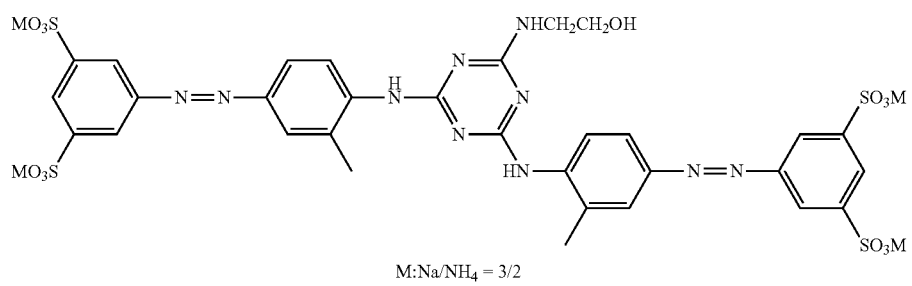
M:Na/NH₄ = 3/2
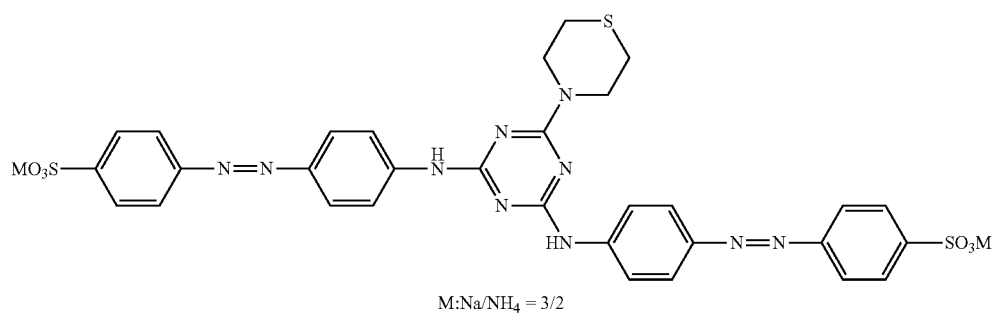
M:Na/NH₄ = 3/2
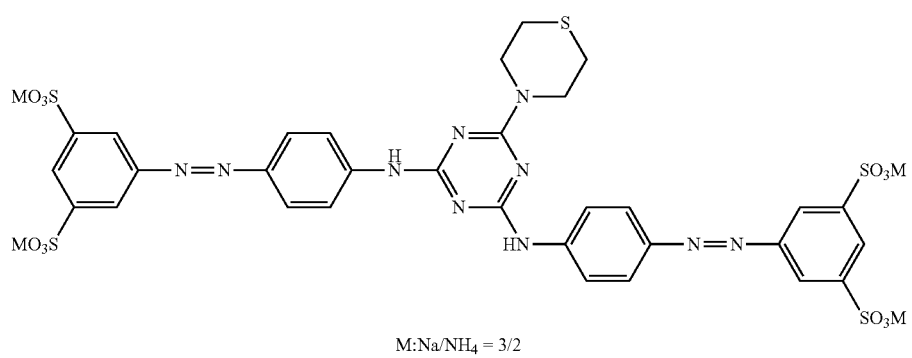
M:Na/NH₄ = 3/2
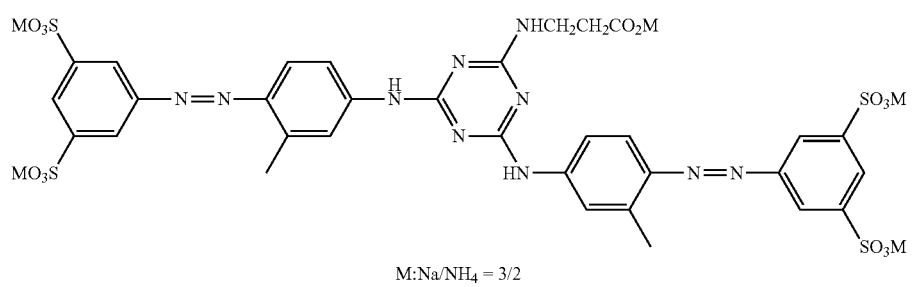
M:Na/NH₄ = 3/2

-continued
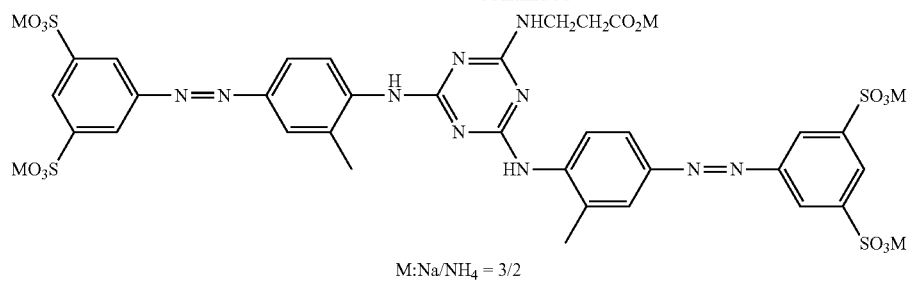
M:Na/NH₄ = 3/2
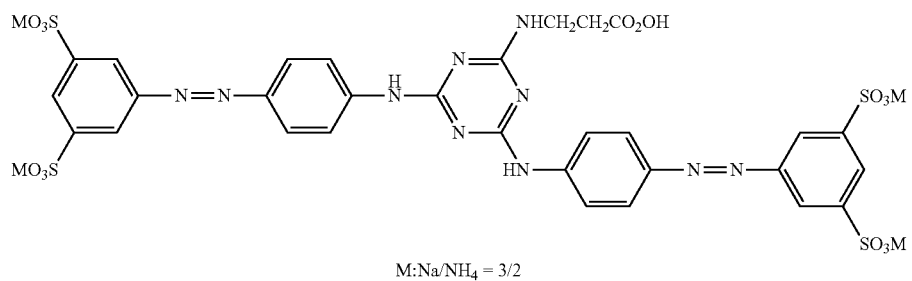
M:Na/NH₄ = 3/2
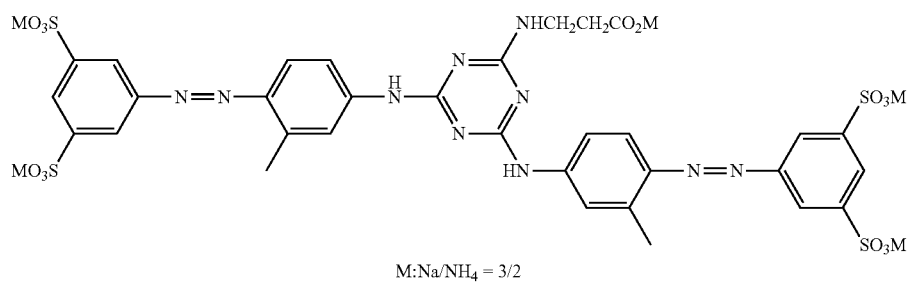
M:Na/NH₄ = 3/2
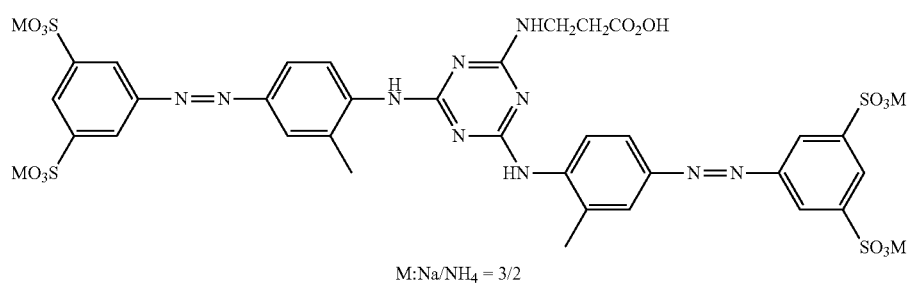
M:Na/NH₄ = 3/2
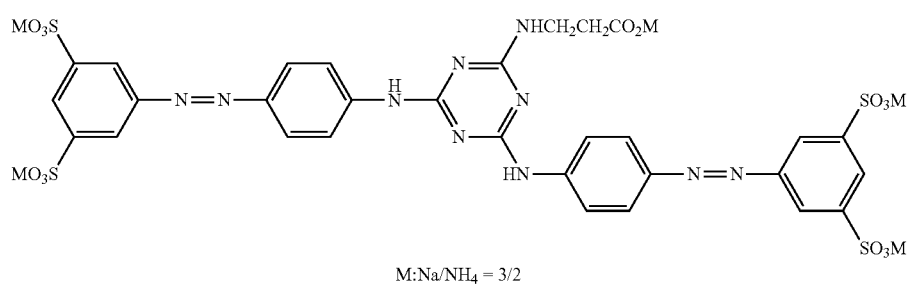
M:Na/NH₄ = 3/2
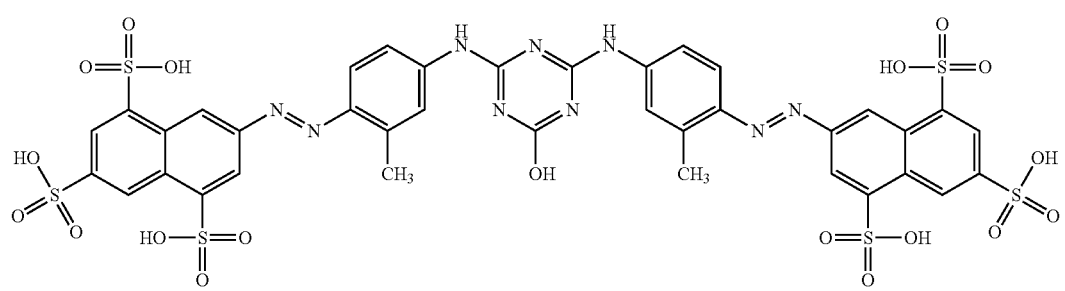

-continued
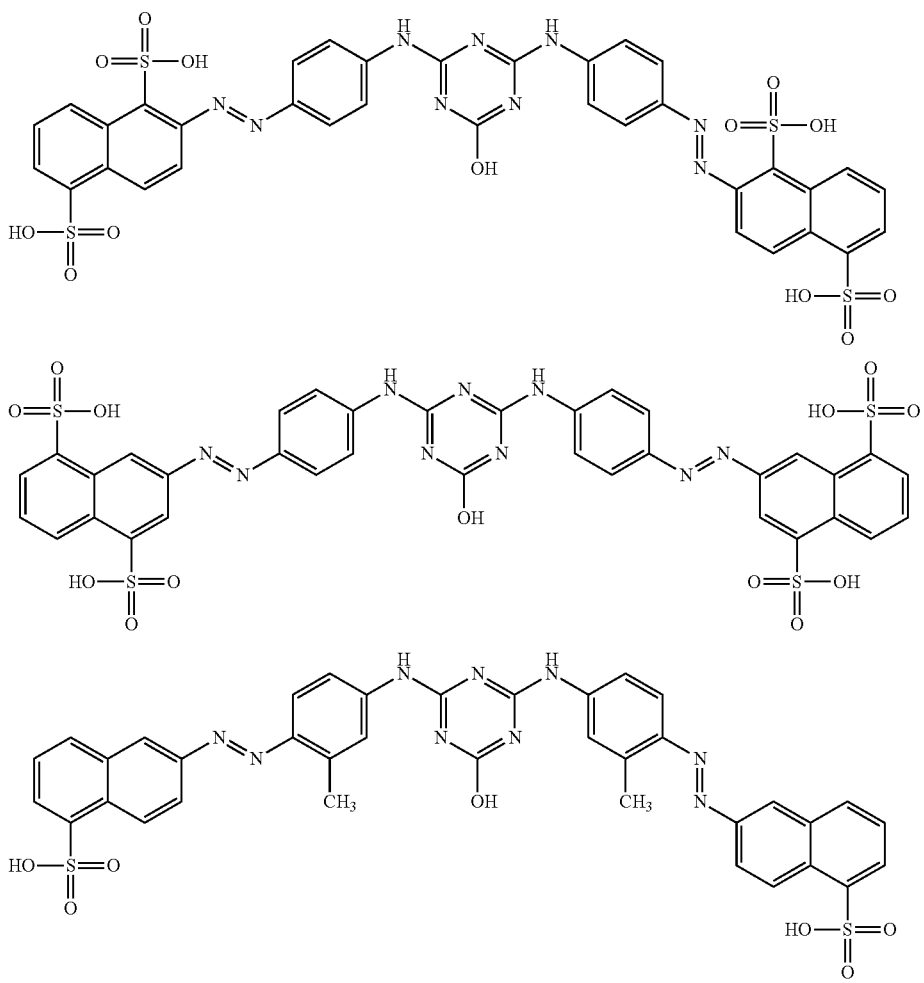
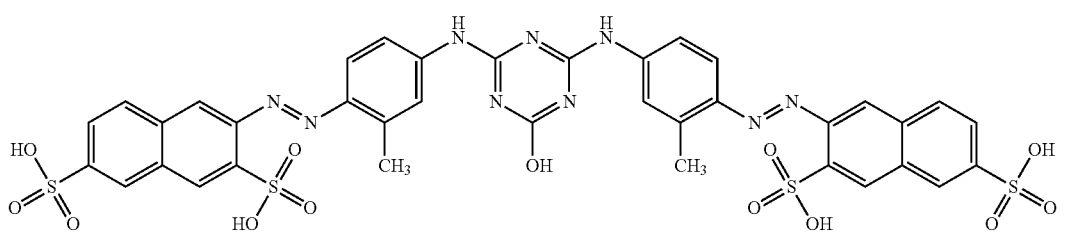
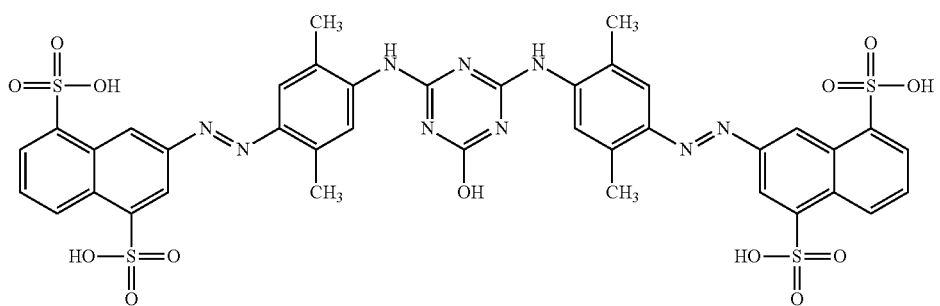

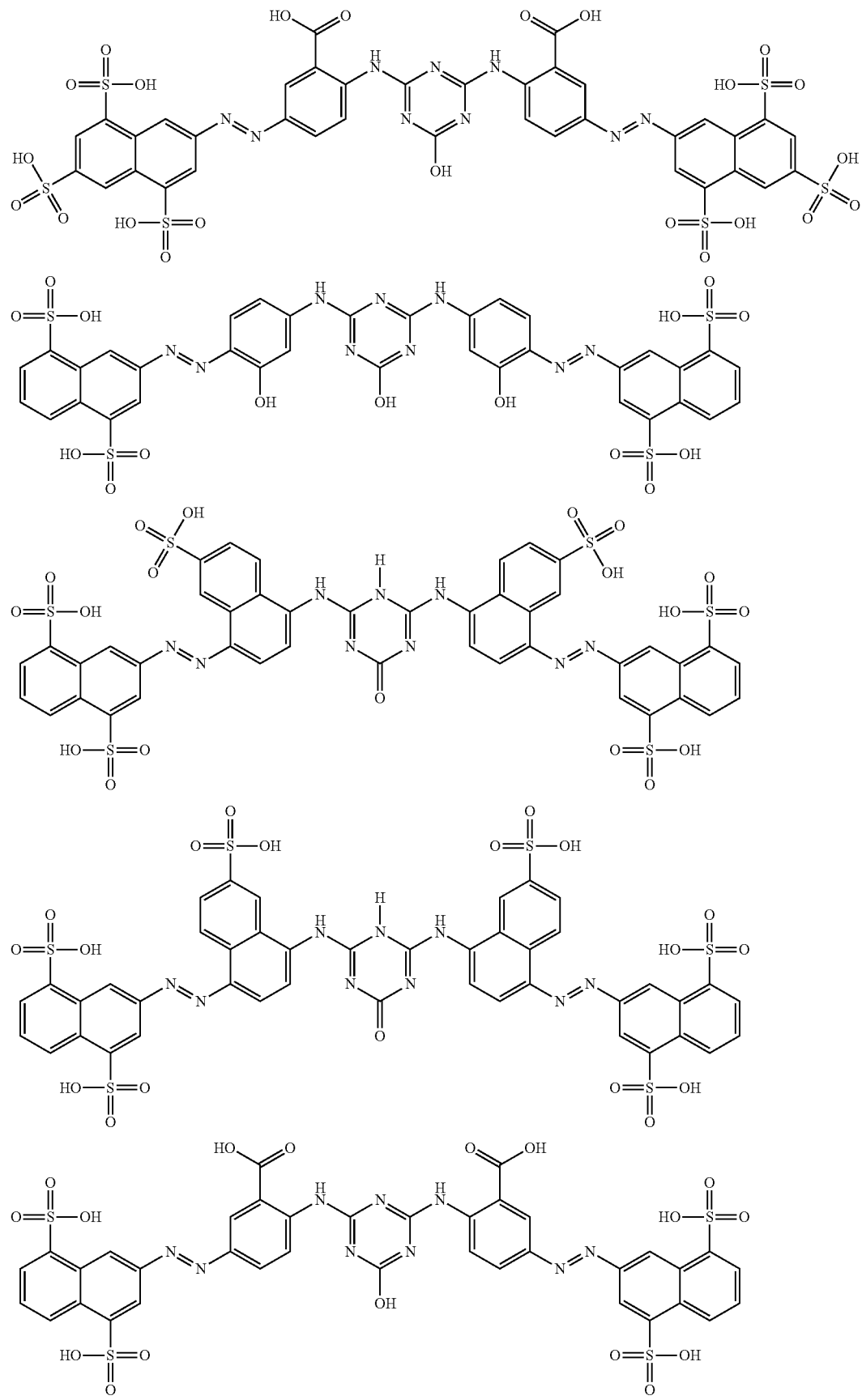

-continued

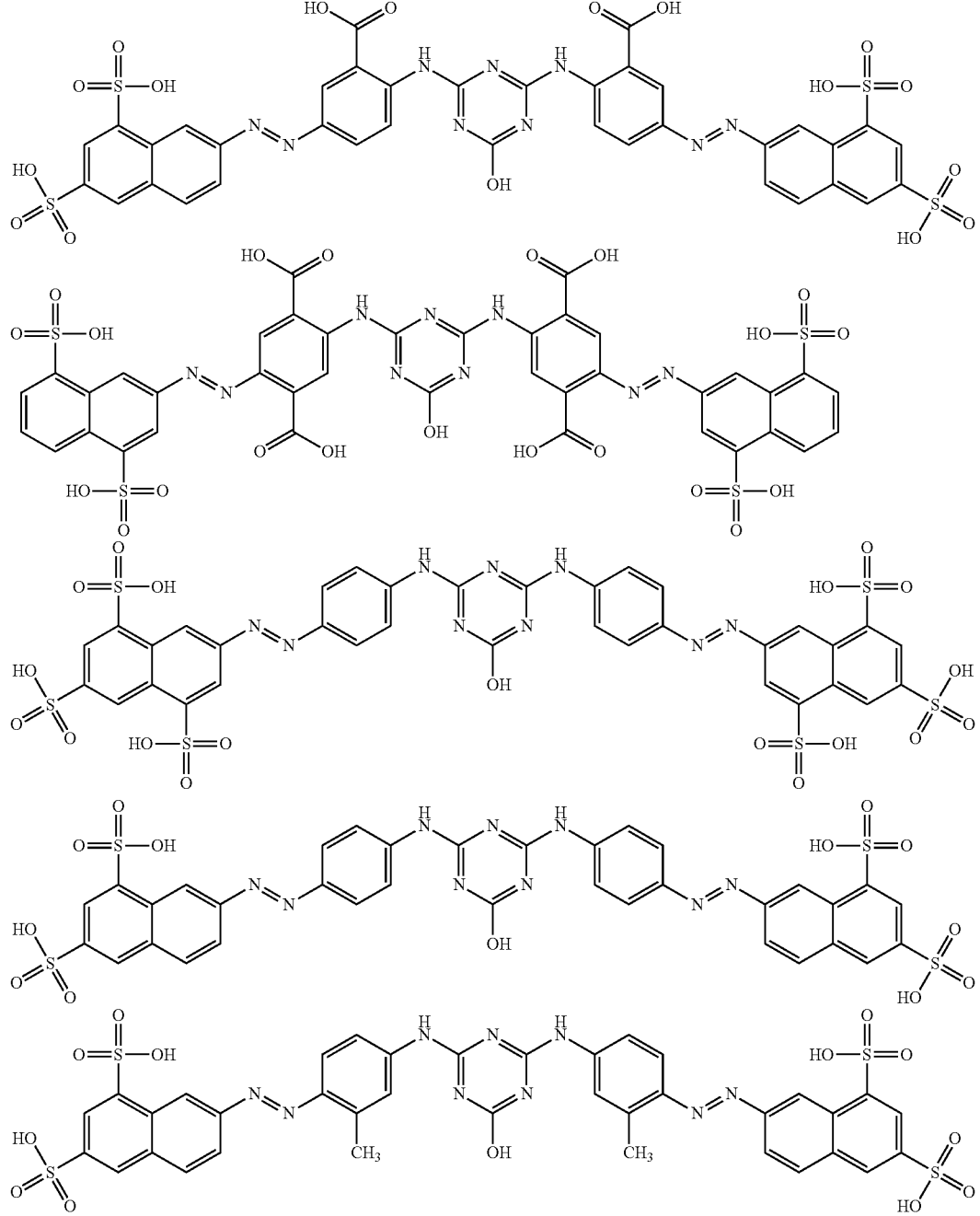

The dye (Y-2) represented by formula (Y-2) can be synthesized with an ordinary synthesis method, and it is possible to perform synthesis by modifying and variously combining the diazo component and coupling component disclosed in JP-T-2008-537756.

The content of the dye (Y-2) represented by the formula (Y-2) is preferably 0.010 to 1.0 mass % to the total content of the black ink, more preferably 0.050 to 0.75 mass %, and still more preferably 0.10 to 0.50 mass %. By the content of the dye (Y-2) represented by formula (Y-2) being within the above range, the image obtained tends to have superior coloring power, light resistance and hue.

As one form of the embodiment, the total content of the dye is more than 3.5 mass % with respect to the total amount of the ink composition, preferably 4.0 to 7.5 mass %, more preferably 4.7 to 6.5 mass %, and still more preferably 4.7 to 6.0 mass %. By the content of the dye being within the above range, the image obtained tends to have superior coloring power, light resistance and hue.

As another form of the embodiment, the total content of the dye is more than 0.50 to 1.5 mass % with respect to the total amount of the ink composition, preferably 0.60 to 1.4 mass %, and more preferably 0.70 to 1.3 mass %. By the content of the dye being within the above range, the image obtained tends to have superior coloring power, light resistance, and hue.

Components Other than Coloring Material

Components other than the coloring material able to be included in the ink will be described.

Alkylene Oxide Adducts of (C12) or Higher Acetylene Glycol on Main Chain

The ink composition of the embodiment preferably includes an alkylene oxide adduct of a (C12) or higher acetylene glycol on the main chain. By including an alkylene oxide adduct of acetylene glycol, the image quality in which color reproducibility and bleeding are suppressed tends to further improve.

The alkylene oxide adduct of a (C12) or higher acetylene glycol on the main chain (below, referred to as "acetylene glycol A") is included in an acetylene glycol-based surfactant (nonionic surfactant). The nonionic surfactant has an action of evenly spreading the ink on the recording medium. Therefore, when ink jet recording is performed using an ink containing the nonionic surfactant, a high definition image with little bleeding may be obtained. The wording "main chain" in the specification signifies a main can based on IUPAC nomenclature.

In particular, by the acetylene glycol A including 12 or more carbon atoms on the main chain, wettability to a polymer member such as a rubber or plastic that configures the ink flow path and foreign materials that can contribute to the generation of air bubbles in the ink is superior. Therefore, by using the acetylene glycol A, it is possible to prevent the generated air bubbles from remaining on flow path surface of the polymer member from the ink tank to the head. In so doing, in light of the initial filling ability being superior, and it being possible to prevent both the growth of remaining air bubbles and dot omissions caused by the separation of air bubbles attached to the surface of the flow path, the stability of continuous printing becomes favorable. The acetylene glycol A has superior solubility in the ink due to being an alkylene oxide adducts.

The Hydrophile-Lipophile Balance value (HLB) value of the acetylene glycol A is preferably 4 to 15 in order for the wettability to become much superior. Here, the HLB value is the HLB value defined by the Griffin method.

Examples of the acetylene glycol A, although not limited to the following, include compounds represented by the following formula (1).

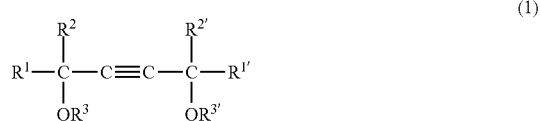

(1)

(In the above formula (1) $R^1$, $R^{1'}$, $R^2$, and $R^{2'}$ each independently represent a (C1-C5) alkyl group, the number of carbon atoms on the main chain is 12 or more, $-OR^3$ represents $-OH$ or $-O(C_2H_4O)$ mH, and $-OR_{3'}$ represents $-OH$ or $-O(C_2H_4O)$ nH. In this case, m and m each independently are values that include the decimal values 0.5 to 25, and m+n is a value that includes the decimal value of 1 to 40 (here, a case where $-OR^3$ and $-OR^{3'}$ are both $-OH$ is excluded).

Specific examples of the acetylene glycol A include, but are not particularly limited to, ethylates of 2,5,8,11-tetramethyl-6-dodecene-5,8-diol and ethoxylates of 5,8-dimethyl-6-dodecene-5,8-diol. Among the alkylene oxide adducts of acetylene glycol, ethylene oxide adducts of acetylene glycol and propylene oxide adducts of acetylene glycol are preferable, ethylene oxide adducts of acetylene glycol are more preferable.

The number of mols added to the alkyleneoxide unit in the acetylene glycol is preferably 1 to 20 mols in each of $R^3$ and $R^{3'}$. The total number of additional mols (total of $R^3$ and $R^{3'}$) is preferably 2 to 40 mols. When the total number of additional moles of alkylene oxide is 40 mols or less, it is possible for the static and dynamic surface tension to be reduced, and the ink absorption capacity becomes favorable.

Although commercially available acetylene glycols A are not limited to the following, examples thereof include Olfine EXP 4300 (manufactured by Nissin Chemical Industry Co., Ltd., brand name, (C12) ethyleneoxide adduct).

The acetylene glycol A may be used singly, or two or more types may be used in combination.

The content of the acetylene glycol A included in the ink is preferably 0.050 to 2.5 mass % with respect to the total amount of ink, 0.10 to 2.0 mass % is more preferable, and 0.50 to 1.5 mass % is still more preferable. By the content of the acetylene glycol A being 0.050 mass % or more, the wettability to a hydrophobic surface tends to improve and the filling ability tends to improve. By the content of the acetylene glycol A being 2.5 mass % or less, the dissolution stability tends to improve.

Polyoxyalkylene Alkyl Ether

The ink may include a polyoxyalkylene alkyl ether. By including the polyoxyalkylene alkyl ether, the solubility and dispersibility of the acetylene glycol A tends to improve. The polyoxyalkylene alkyl ether does not easily exert an influence on the low dynamic surface tension of the acetylene glycol A.

Incidentally, continuous ink supply systems (CISS) frequently use an ink flow path formed from a hydrophobic material and an ink tank, each ink using a comparatively hydrophobic surfactant in the ink set used in the continuous ink supply system is effective. From this viewpoint, although using the acetylene glycol A is valid, from the viewpoint of further improving the dissolution stability, the initial filling ability, and the continuous printing stability while obtaining the effect of the acetylene glycol A, it is particularly preferable that the ink includes polyoxyalkylene alkyl ether in a case of using the ink set of the embodiment with a recording apparatus provided with a continuous ink supply system (CISS).

Here, the wording "ink supply system" refers to a system provided with an ink accommodation container (ink tank) having an air introduction port, a print head having nozzles that discharge the liquid in the ink accommodation container, and an ink supply path that connects the ink accommodation container and the print head, and supplies the liquid from the ink supply container to the print head.

The wording "ink flow path" refers to a flow path for causing ink to flow in the ink jet recording apparatus. Example of the ink flow path include an ink supply path for supplying ink from the ink accommodation container that stores the ink to the ink jet recording head, and a flow path in the ink jet recording head for causing ink to flow to the nozzle openings.

The HLB value of the polyoxyalkylene alkyl ether is preferably 11 to 16, and 12 to 15 is more preferable. By the HLB value of the polyoxyalkylene alkyl ether being within the above range, the initial filling ability and the continuous printing stability tends to further improve.

Although the polyoxyalkylene alkyl ether is not limited to the following, examples thereof include compounds represented by the following formula (2). By using such a polyoxyalkylene alkyl ether, the storage stability and continuous printing stability tend to further improve.

$$R^6O(C_2H_4O)_w(C_3H_6O)_x(C_2H_4O)_y(C_3H_6O)_zH \quad (2)$$

(in the above formula (2), $R^6$ represents a (C1-C20) alkyl group, preferably represents a (C5-C15) alkyl group, and more preferably represents a (C10-C15) alkyl group. w is a value of 1 to 20, x, y, and z are each independently values of 0 or 1 to 20. w, x, y, and z satisfy $5 \leq w+x+y+z \leq 30$, and preferably satisfies $5 \leq w+x+y+z \leq 25$.)

Although the polyoxyalkylene alkyl ether is not particularly limited, specific examples thereof include $C_{12}H_{25}O(C_2H_4O)_6(C_3H_6O)_2(C_2H_4O)_6(C_3H_6O)_8H$
$C_{13}H_{21}O(C_2H_4O)_6(CH_6O)_2(C_2H_4O)_6(C_3H_6O)_8H$
$C_{12}H_{27}O(C_2H_4O)_6(C_3H_6O)_x(C2H_4O)_y(C_3H_6O)_zH$
(here, w+y=15, x+z=4)
$C_{13}H_{27}O(CH_4O)_w(C_3H_6O)_x(C_2H_4O)_y(C_3H_6O)_zH$
(here, w+y=15, x+z=4)
$C_{12}H_{25}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{12}H_{25}O(C_2H_4O)_{12}(C_3H_6O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_6O)_{4.5}H$,
$CH_3(CH_2)_9(CH_3)CHO(C_2H_4O)_5(C_3H_4O)_{3.5}H$,
$CH_3(CH_2)_{11}(CH_3)CHO(C_2H_4O)_5(C_3H_6O)_{3.5}H$,
$C_{14}H_{29}O(C_2H_4O)_{14}(C_3H_6O)_2H$,
$C_{11}H_{23}O(C_2H_4O)_8H$
$C_{10}H_{21}O(C_2H_4O)_{11}H$, and
$C_{12}H_{25}O(C_2H_4O)_{15}H$.

Although commercially available polyoxyalkylene alkyl ethers are not particularly limited, specific examples thereof include Noigen DL-0415 ($R^6O(C_2H_4O)_w(C_3H_6O)_x(C_2H_4O)_y(C_3H_6O)_zH$, "$R^6$": (C12, C13) alkyl, w+y=15, x+z=4, HLB value 15.0)

Noigen ET-116B ($R^6O(C_2H_4O)_3(C_3H_6O)_{4.5}H$, "$R^6$": (C12, C14) alkyl, HLB value 12.0), Noigen ET-106A ($R^6O(C_2H_4O)_5(C_3H_6O)_{3.5}H$, "$R^6$": (C12, C14) alkyl, HLB value 10.9), Noigen DH-0300 ($R^6O(C_2H_4O)_2H$, "$R^6$": (C14) alkyl, HLB value 4.0), Noigen YX-400 ($R^6O(C_2H_4O)_{40}H$, "$R^6$": (C12) alkyl, HLB value 18.1), Noigen EA-160 ($C_9H_{19}C_6H_4O(C_2H_4O)_{16.3}H$, HLB value 15.4) (all of the above are manufactured by DKS Co. Ltd.) and Emulgen 1108 (manufactured by Kao Corporation, brand name, $R^6O(CH_4O)_8H$, "$R^6$": (C11) alkyl, HLB value 13.4).

These polyoxyalkylene alkyl ethers may be used singly or two or more types may be used in combination.

The content of the polyoxyalkylene alkyl ether included in the ink is preferably 0.10 to 10 mass % with respect to the total amount of ink, 0.50 to 7.5 mass % is more preferable, and 1.0 to 5.0 mass % is still more preferable. By the content of the polyoxyalkylene alkyl ether being within the above range, the storage stability and continuous printing stability tend to further improve.

The content of the polyoxyalkylene alkyl ether is preferably 1.0 to 5.0 with respect to 1 part by mass of the content of the acetylene glycol A, and 1.5 to 3.0 is more preferable. By the content of the polyoxyalkylene alkyl ether being within the above range, the acetylene glycol A tends to sufficiently solubilize, and the water solubility tends to become favorable. Therefore, it tends to be possible to suppress the generation of aggregations, and the occurrence of variations in the ink absorbency.

Surfactants Other than Above

The ink composition used in the embodiment may include a surfactant other than the above. Although the surfactant is not particularly limited, at least one of fluorine-based surfactant and a silicone-based surfactant is preferable.

Although not particularly limited, examples of the fluorine-based surfactant include perfluoroalkylsulfonates, perfluoroalkylcarboxylates, perfluoroalkylphosphoric acid esters, perfluoroalkylethylene oxide adducts, perfluoroalkylbetaines, and perfluoroalkylamine oxide compounds. Although not particularly limited, examples of commercially available fluorine-based surfactants include S-144 and S-145 (manufactured by Asahi Glass), FC-170C, FC-430, and Fluorad FC4430 (manufactured by Sumitomo 3M Limited), FSO, FSO-100, FSN, FSN-100, and FS-300 (manufactured by Dupont), and FT-250 and 251 (manufactured by Neos Company Limited). These fluorine-based surfactants may be used independently or two or more types may be used in combination.

Examples of the silicone-based surfactant include polysiloxane-based compounds and polyether-modified organosiloxanes. Although not particularly limited, examples of commercially available silicone-based surfactants include BYK-306, BYK-307, BYK-333, BYK-341, BYK-345, BYK-346, BYK-347, BYK-348 and BYK-349 (all brand names, manufactured by BYK-Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all brand names, manufactured by Shin-Etsu Chemical Co., Ltd.).

Solvent

The ink may further include a solvent. Although the solvent is not particularly limited, it is possible to use an organic solvent or water.

Examples of the water include, pure waters such as ion-exchange water, ultrafiltered water, reverse osmosis water, and distilled water, and waters from which as many impurities are removed as possible, such as ultrapure water. When water sterilized by ultraviolet irradiation or the addition of hydrogen peroxide and the like is used, it is possible to prevent the occurrence of mold and bacteria in the case of long-term storage of the ink. In so doing, the storage stability tends to further improve.

Among the organic solvents, a volatile water-soluble organic solvent is more preferable. Although not particularly limited, examples of the organic solvents include, specifically, alcohols or glycols such as glycerin, trimethyl glycerin, ethylene glycol, diethylene glycol, triethylene glycol, propylene glycol, dipropylene glycol, 1,3-propanediol, 1,2-butanediol, 1,2-pentanediol, 1,2-hexane diol, 1,4-butanediol, 1,5-pentane diol, 1,6-hexane diol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol mono ethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol mono dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N, N-dimethylformamide, N, N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetra-methyl urea.

These solvents may be used singly or two or more types may be used in combination. The content of the organic solvent is not particularly limited, and can be determined, as appropriate, according to necessity. For example, in a case where the permeability and moisture retaining properties of the ink to the recording medium are superior, it is preferable that at least one type selected from a group consisting of glycerin, trimethyl glycerin, triethylene glycol monobutyl ether, and 2-pyrrolidone is used.

It is preferable that the content of the organic solvent is 5 to 25 mass % to the total amount of the ink, and 7.5 to 20 mass % is more preferable, and 10 to 15 mass % is still more preferable.

Among these, it is preferable to include triethylene glycol monobutyl ether as the solvent. The content of the triethylene glycol monobutyl ether is preferably 2.0 to 15 mass %, 2.5 to 12.5 mass % is more preferable, and 3.0 to 10 mass % is still more preferable. By the content of the triethylene glycol monobutyl ether being within the above range, the permeability to the medium, and the dissolution stability tend to further improve.

pH Adjuster

The ink used in the embodiment may include a pH adjuster. It is possible for the pH adjuster to easily adjust the pH value of the ink. Although not particularly limited, examples of the pH adjuster include inorganic acids (for example, sulphuric acid, hydrochloric acid, nitric acid, or the like), inorganic bases (for example, lithium hydroxide, sodium hydroxide, potassium hydroxide, ammonia, and the like), organic bases (triethanolamine, diethanolamine, monoethanolamine, tripropanol amine), organic acids (for example, adipic acid, citric acid, succinic acid, or the like). The pH adjusters may be used individually or a mixture of two or more may be used.

Other Components

In order to favorably maintain the storage stability of the ink composition and the discharge stability from the head, in order to improve clogging, or in order to prevent deterioration of the ink used in the embodiment, it is possible to add, as appropriate, various additives such as dissolution aids, viscosity adjusters, pH adjusters, antioxidants, antifungal agents, preservatives, anti-corrosive agents and chelating agents for trapping metal ions that influence the dispersion.

Ink Set

The ink set of the embodiment is provided with the above-described ink composition. More specifically, it is preferable for a black ink composition and a light black ink composition to be provided, and it is preferable for an ink composition with a total dye content of more than 3.5 mass % and an ink composition with a total dye content of 3.5 mass % or less to be provided in the ink composition.

Light Black Ink

The light black in includes at least one type selected from a group consisting of the dye (Bk-1), dye (Bw-1), dye (Y-1), and dye (Y-2) as the dye, and may include, as necessary, a solvent, a surfactant, and a pH adjuster. For each component that can be included in the light black ink, it is possible for the same components as above to be used.

The total content of the dye in the light black ink is preferably 0.10 to 3.5 mass %, 0.25 to 3.0 mass % is more preferable, and 0.50 to 1.5 mass % is still more preferable. By the total content of the dye in the light black ink being within the above range, the image quality of the obtained neutral color recording material tends to further improve.

In the light black ink, the content ratio A (dye (Bk-1):dye (Bw-1)) of the dye (Bk-1) and the dye (Bw-1) is 100:18 to 100:40, preferably 100:18 to 100:37.5, and more preferably 100:18 to 100:35. By the content ratio A being within the above range, the hue is further improved.

It is preferable that the content ratio B (dye (Bk-1):dye (Bw-1):dye (Y-1):dye (Y-2)) of the dye (Bk-1), the dye (Bw-1), the dye (Y-1), and the dye (Y-2) is 100:20:5:5 to 100:40:12:12, more preferably 100:20:5:5 to 100:37.5:12:12, and still more preferably 100:20:5:5 to 100:35:7:7. By the content ratio B being within the above range, the hue tends to be further improved.

It is preferable for the light black ink to include triethylene glycol monobutyl ether. In the light black ink, the content of the triethylene glycol monobutyl ether is preferably 2.0 to 15 mass %, 2.5 to 12.5 mass % is more preferable, and 3.0 to 10 mass % is still more preferable. By the content of the triethylene glycol monobutyl ether being within the above range, the permeability to the medium, and the dissolution stability tend to further improve.

EXAMPLES

Below, examples and comparative examples of the invention will be more specifically described. The invention is not limited by any of the following examples.

Material for Ink Composition

The main materials for the ink composition used in the examples and the comparative examples are as follows.

Coloring Material
Y-1: refer to the following
Y-2: refer to the following
Y-3: refer to the following
Bk-1: refer to the following
Bk-2: refer to the following
Bk-3: refer to the following
Bw-1: refer to the following

| Coloring Material | Structural Formula |
|---|---|
| Y-1 | 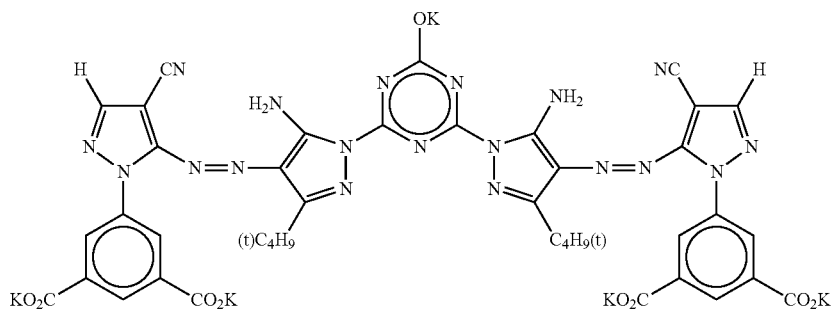 |

-continued
| Coloring Material | Structural Formula |
|---|---|
| Y-2 | 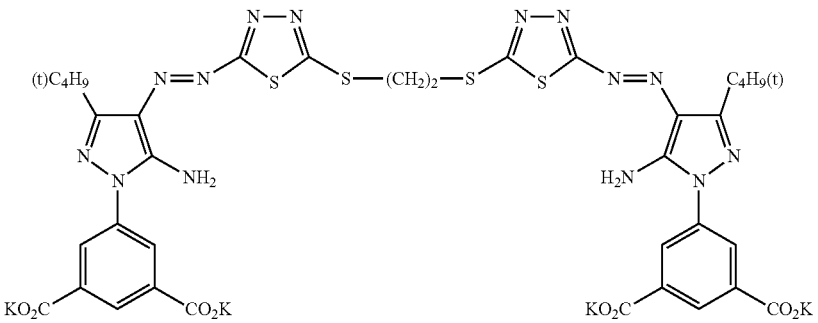 |
| Y-3 | 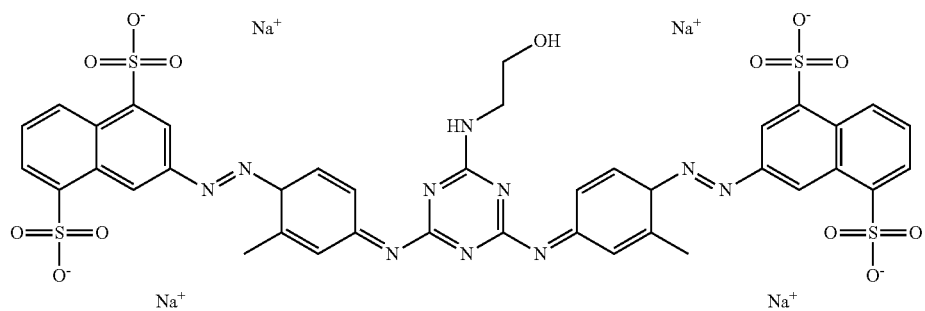 [SMILES: CC1=C/C(=N/c2nc(/N=C3\C=CC(/N=N/c4cc(S(=O)(=O)[O-])c5cccc(S(=O)(=O)[O-])c5c4)C(C)=C3)nc(NCCO)n2)C=CC1/N=N/c1cc(S(=O)(=O)[O-])c2cccc(S(=O)(=O)[O-])c2c1 ; [Na+] ; [Na+] ; [Na+] ; [Na+]] |
| Bk-1 | 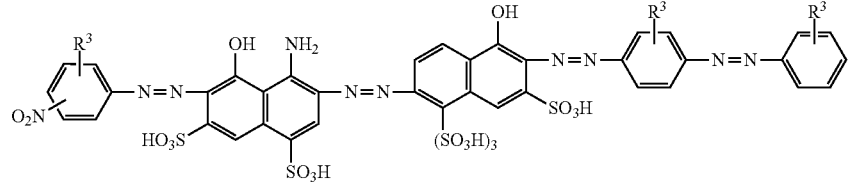 |
| Bk-2 | 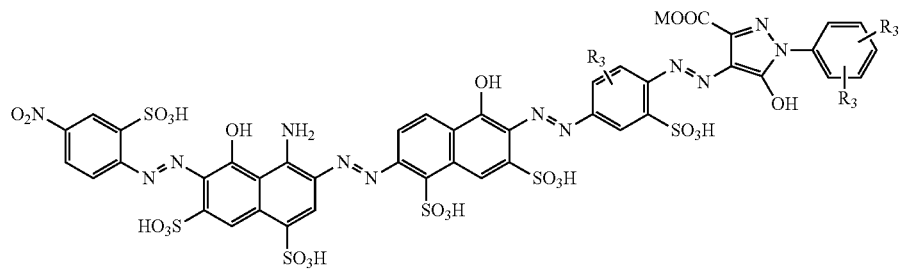 |
| Bk-3 | 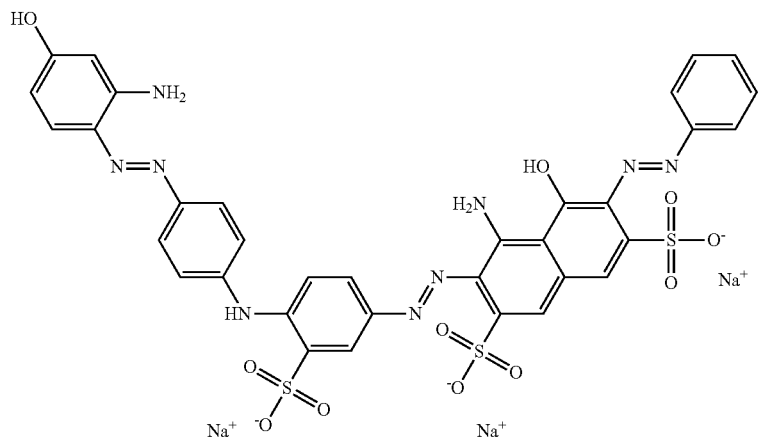 |

-continued

| Coloring Material | Structural Formula |
|---|---|
| Bw-1 | (structure shown: a bis-triazine azo dye with substituents $R^{21}$, $R^{22}$, $R^{25}$, $R^{26}$, $R^{27}$, $R^{28}$, $R^{23}$, $R^{24}$, linker X, and multiple $SO_3H$/$HO_3S$ groups on phenyl-azo-phenyl-azo-phenyl arms) |

Surfactant

Manufactured by Nissin Chemical Industry Co., Ltd., product name Olfine E1010 (alkylene oxide adduct of (C12) or higher acetylene glycol on the main chain)

Polyoxyalkylene Alkyl Ether

Manufactured by Nippon Nyukazai Co., Ltd., product name Newcol 1006

Solvent

Glycerin 2-pyrrolidone trimethyl glycerin triethylene glycol monobutyl ether pH Adjuster triethanol amine Preparation of Ink Composition Each material was mixed with the constitutions shown in the following Tables 1 and 2, sufficiently stirred, thereby obtaining each ink composition. In the following Tables 1 and 2, the unit of the numerical values is mass %, and the total is 100.0 mass %.

TABLE 1

| Black Ink | | Examples | | | | | | Comparative Examples | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Dye (coloring material) | Bk-1 | 3.6 | 3.6 | 4 | 3.6 | 3.6 | 3.6 | 3.6 | 3.6 | 3.6 | 3.6 | 3.6 | 3.6 | | |
| | Bk-2 | | | | | | | | | | | | | 3.5 | |
| | Bk-3 | | | | | | | | | | | | | | 6 |
| | Bw-1 | 1.2 | 0.75 | 0.75 | 1.2 | 1.2 | 1.2 | | | 0.6 | 0.6 | 1.5 | 1.8 | 1 | |
| | Y-1 | | 0.4 | 0.4 | 0.2 | 0.2 | 0.2 | | 0.2 | 0.6 | 0.05 | 0.05 | 0.15 | | |
| | Y-2 | | 0.4 | 0.4 | 0.2 | 0.2 | 0.2 | | 0.2 | 0.6 | 0.05 | 0.05 | 0.15 | | |
| | Y-3 | | | | | | | | | | | | | | 0.4 |
| | Content Ratio A (Bk-1:Bw-1) | 100:33 | 100:21 | 100:19 | 100:33 | 100:33 | 100:33 | 100:0 | 100:0 | 100:17 | 100:17 | 100:42 | 100:50 | — | — |
| | Content Ratio B (Bk-1:Bw-1:Y-1:Y-2) | 100:33:0:0 | 100:21:11:11 | 100:19:10:10 | 100:33:5.6:5.6 | 100:33:5.6:5.6 | 100:33:5.6:5.6 | 100:0:0:0 | 100:0:6:6 | 100:17:17:17 | 100:17:1.4:1.4 | 100:42:1.4:1.4 | 100:50:4:4 | — | — |
| Solvent | Glycerin | 6 | 6 | 6 | 6 | 6 | 6 | 6 | 6 | 6 | 6 | 6 | 6 | 6 | 6 |
| | 2-pyrrolidine | 2.5 | 2.5 | 2.5 | 2.5 | 2.5 | 2.5 | 2.5 | 2.5 | 2.5 | 2.5 | 2.5 | 2.5 | 2.5 | 2.5 |
| | trimethylglycerin | 6 | 6 | 6 | 6 | 6 | 6 | 6 | 6 | 6 | 6 | 6 | 6 | 6 | 6 |
| | triethyleneglycol monobutylether | 7 | 7 | 7 | 7 | 7 | 7 | 7 | 7 | 7 | 7 | 7 | 7 | 7 | 7 |
| Surfactant | acetylene glycol | 1 | 1 | 1 | 1 | 1 | 1 | 1 | 1 | 1 | 1 | 1 | 1 | 1 | 1 |
| | polyoxyalkylene-alkylether | 3 | 3 | 3 | 3 | 3 | 3 | 3 | 3 | 3 | 3 | 3 | 3 | 3 | 3 |

TABLE 1-continued

|  |  | Examples | | | | | | Comparative Examples | | | | | | | |
|---|---|---|---|---|---|---|---|---|---|---|---|---|---|---|---|
| Black Ink | | 1 | 2 | 3 | 4 | 5 | 6 | 1 | 2 | 3 | 4 | 5 | 6 | 7 | 8 |
| pH adjuster | triethanolamine | 0.3 | 0.3 | 0.3 | 0.3 | 0.3 | 0.3 | 0.3 | 0.3 | 0.3 | 0.3 | 0.3 | 0.3 | 0.3 | 0.3 |
| Water | | Remainder | Remainder | Remainder | Remainder | Remainder | Remainder | Remainder | Remainder | Remainder | Remainder | Remainder | Remainder | Remainder | Remainder |
| Evaluation Results | Hue | B | B | B | A | A | A | C | C | B | C | C | C | B | C |
| | Color Density | A | B | A | A | A | A | B | B | C | B | A | A | C | B |
| | Ozone Resistance | A | A | A | A | A | A | A | A | A | A | A | A | A | C |
| | Light Resistance | A | A | A | A | A | A | A | A | A | A | A | A | A | C |
| | Storage Stability | A | A | A | A | A | A | A | A | A | A | A | A | C | A |
| | Initial Filling Ability | A | A | A | A | B | B | A | A | A | A | A | A | A | A |
| | Dynamic contact angle after (100 ms) | 25° | 25° | 25° | 25° | 30° | 30° | 25° | 25° | 25° | 25° | 25° | 25° | 25° | 25° |
| | Dynamic contact angle (after 10000 ms) | 5° | 5° | 5° | 5° | 10° | 10° | 5° | 5° | 5° | 5° | 5° | 5° | 5° | 5° |

TABLE 2

|  |  | Examples | | | | | | Comparative Examples | |
|---|---|---|---|---|---|---|---|---|---|
| Light Black Ink | | 7 | 8 | 9 | 10 | 11 | 12 | 9 | 10 |
| Dye (coloring material) | Bk-1 | 0.554 | 0.415 | 0.900 | 0.554 | 0.554 | 0.554 | 0.277 | 1.385 |
| | Bw-1 | 0.185 | 0.138 | 0.300 | 0.185 | 0.185 | 0.185 | 0.092 | 0.462 |
| | Y-1 | 0.031 | 0.023 | 0.050 | 0.031 | | | 0.015 | 0.077 |
| | Y-2 | 0.031 | 0.023 | 0.050 | 0.031 | | | 0.015 | 0.077 |
| | Content Ratio A (Bk-1:Bw-1) | 100:33 | 100:33 | 100:33 | 100:33 | 100:33 | 100:33 | 100:33 | 100:33 |
| Solvent | glycerin | 10.000 | 10.000 | 10.000 | 10.000 | 10.000 | 10.000 | 10.000 | 10.000 |
| | triethyleneglycol monobutylether | 6.000 | 7.000 | 7.000 | 6.000 | 6.000 | 6.000 | 6.000 | 6.000 |
| Surfactant | acetelyne glycol | 1.000 | 1.000 | 1.000 | 0.700 | 1.000 | | 1.000 | 1.000 |
| | plyoxyalkylenealkylether | 3.000 | 3.000 | 3.000 | 3.500 | | 3.000 | 3.000 | 3.000 |
| pH adjuster | triethanolamine | 0.500 | 0.500 | 0.500 | 0.500 | 0.500 | 0.500 | 0.500 | 0.500 |
| Water | | Remainder | Remainder | Remainder | Remainder | Remainder | Remainder | Remainder | Remainder |
| Evaluation Results | Color Density | 0.5 | 0.35 | 0.6 | 0.5 | 0.5 | 0.5 | 0.2 | 0.7 |
| | graininess of monochrome printing | A | A | B | A | A | A | A | C |
| | Impact limit amount of light black ink | A | B | A | A | A | A | C | A |
| | initial filling ability | A | A | A | A | B | B | A | A |
| | dynamic contact angle (after 100 ms) | 25° | 25° | 25° | 25° | 30° | 30° | 25° | 25° |
| | dynamic contact angle (after 10000 ms) | 5° | 5° | 5° | 5° | 10° | 10° | 5° | 5° |

Creation Conditions of Evaluation Sample

A recording material was created by using an ink jet printer (brand name "EP-801A", manufactured by Seiko-Epson Corp.), and further printing a solid image on a glossy photographic paper (brand name, model number "KA4100 PSKR", manufactured by Seiko-Epson Corp.) using the above-described ink.

Hue

A recording material of a solid pattern image with a resolution of 720×720 and a Duty of 25% is obtained using only the black ink composition, according to the above creation conditions. The a* and b* (L*a*b* color system stipulated by the International Commission on Illumination (CIE)) of the image of the obtained recording material are measured using a spectrophotometer i1 (brand name, manufactured by X-rite, Incorporated). The hue is evaluated according to the following evaluation criteria based on the obtained a* value and the b* value.

Evaluation Criteria

A: The a* value is in the range from −2 to 2 and the b* value is in the range from −2 to 2.
B: a* value and b* value are within a range other than A, C.
C: At least one of the a* value and the b* value is outside the range of −5 to 5.

The wording "duty" is a value obtained with the following formula, and can be rephrased as print duty or coverage rate.

duty (%)=number of actually printed dots/(vertical resolution)×(horizontal resolution)×100

(in the formula, the "actual printed dots" is the actual number of dots printed per unit area, and the "vertical resolution" and the "horizontal resolution" are each a resolution per unit area. The wording "duty 100%" signifies the maximum in weight of a unit color per unit area.)

Color Density

A recording material with a solid pattern image with a resolution of 720×720 and a Duty of 100% is obtained using only the black ink composition, according to the above creation conditions. Recording materials of a solid pattern image with a resolution of 720×720, and a 100% Duty with respect to the black ink composition of Example 4, according to the above creation conditions. The OD value (optical density) of the obtained recording material was measured using a spectrophotometer it (brand name, manufactured by X-rite, Incorporated). The color density was measured according to the evaluation criteria based on the obtained OD value.

Evaluation Criteria

A: OD value is 2.4 or more.
B: OD value is 2.35 or more and less than 2.4.
C: OD value is less than 2.35.

Ozone Resistance

A recording material of a solid pattern image with a resolution of 1440×1440 and a Duty of 100% is obtained using only the black ink composition, according to the above creation conditions. The obtained recording material was left to stand for one day in a dark location at room temperature. Thereafter, the evaluation sample was installed in an Ozone Weatherometer OMS-L Type (brand name, manufactured by Suga Test Instruments Co., Ltd.), and an exposure test using ozone was carried out for 40 hours under conditions of a temperature of 23° C., a humidity of 50% RH, and an ozone concentration of 5 ppm. The pre-exposure OD value (D0) and the post-exposure OD value (D) of the obtained recording material were measured using a spectrophotometer i1 (brand name, manufactured by X-rite, Incorporated), the optical density residual rate (ROD) is obtained according to the following formula, and the light resistance was evaluated according to the following determination criteria.

ROD (%)=(D/D0)×100

Evaluation Criteria

A: ROD is 10% or higher
C: ROD is less than 70%

Light Resistance

A recording material of a solid pattern image with a resolution of 1440×1440 and a Duty of 100% is obtained using only the black ink composition, according to the above creation conditions. The obtained recording material was left to stand for one day in a dark location at room temperature. Thereafter, the recording material was installed in a Xenon Light Resistance Tester XL-75s (brand name: manufactured by Suga Test Instruments Co., Ltd.), and an exposure test was carried out for 30 days under the conditions of a relative humidity at 23° C. of 50% RH and an illuminance of 75000 lux. The pre-exposure OD value (D0) and the post-exposure OD value (D) of the obtained recording material were measured using a spectrophotometer i1 (brand name, manufactured by X-rite, Incorporated), the optical density residual rate (ROD) is obtained according to the following formula, and the light resistance was evaluated according to the following determination criteria.

ROD (%)=(D/D0)×100

Evaluation Criteria

A: ROD is 70% or higher
C: ROD is less than 70%

Storage Stability

The black ink composition was introduced to a sample bottle and completely sealed. When the sample bottle was stored at 70° C. for 6 days, and then returned to 20° C., the absorption spectrum was measured. The storage stability was evaluated by determining the ratio (residual rate=λb/λa) of the maximum absorption wavelength (λa) at 20° C. before storage and a maximum absorption wavelength (λb) at 20° C. after storage. Measurement of the absorption spectrum was performed in accordance with JIS K0115. Specifically, the ink composition was diluted 1,000 times with ion-exchanged water, and the absorption spectrum was measured using a quartz cell (optical path length 10 mm) as a measurement cell, and a spectrophotometer (product name "U-3000", manufactured by Hitachi, Ltd.) as a measurement apparatus.

The evaluation criteria for storage stability are as follows. A higher residual rate indicates superior storage stability, and in the evaluation criteria, "A" and "B" indicate a criteria by which practical use is acceptable. The evaluation results are also shown in Table 1.

A: Residual rate is 95% or more.
B: Residual rate is 90% or more and less than 95%.
C: Residual rate being less than 90%.

Dynamic Contact Angle 0.5 µL of the black ink composition was added dropwise on a silicon wafer, and the contact angle of the ink composition was measured 100 ms and 10000 ms after the point in time at which the ink composition was attached to the silicon wafer. The dynamic contact angle was measured similarly for the light black in composition. After the ion exchange water was measured under the same dynamic surface tension measurement conditions as the ink measurement, the value of the silicon wafer was 77° at 100 ms and 75° at 5100 ms. A small dynamic contact angle indicates that the wettability to the attachment target is high. Accordingly, since the ink is filled without air bubbles remaining in the internal flow path of the had configured from silicon during ink filling, the discharge stability of the ink is improved.

Graininess of Monochrome Printing

Printing was performed using the black ink composition and the light black composition (constitution in Example 4) as the ink set at 10%, 20%, 30%, 40%, 50%, 60%, 70%, 80%, 90%, and 100% Duty according to the creation conditions. Color measurement of the OD value and visual observation were performed for the obtained printed matters were, and the graininess was measured under the following criteria.

Determination Criteria

A: no rough surface on image even at Duty 50%
B: rough surface on image recognized when Duty 50%; however, no rough surface on image even at Duty 25%
C: rough surface on image recognized even at Duty 25%

(Impact Limit Amount)

Printing was performed using the black ink composition and the light black ink composition, at a Duty where the OD value of the printed matter in the vicinity of 2, according to the above creation conditions. The obtained printed matters were visually observed and the impact limit amount of the light black ink composition was evaluated with the following criteria. The black ink composition in Example 4 was used.

Determination Criteria

A: The printed matter has no bleeding and ink does not overflow from the medium.

B: Although it is possible to verify bleeding on the printed matter, ink does not overflow from the medium.

C: It is possible to verify bleeding on the printed matter, ink overflows from the medium.

Initial Filling Ability

An ink tank of the above ink jet printer was filled with the black ink composition and the light black ink composition. An initial filling operation was performed on the head according to an initial filling sequence. Thereafter, a nozzle check was executed in order to verify whether or not ink was able to be discharged from all nozzles in the head. In a case where a nozzle that is unable to discharge ink is present, head cleaning (suction of ink into the nozzle) is performed, and thereafter, the nozzle check is executed again. The initial filling ability was evaluated according to the following evaluation criteria based on the number of cleanings necessary until it is possible for ink to be discharged from all nozzles.

Evaluation Criteria

A: Discharge is performed from all nozzles with only the initial filling sequence.

B: One cleaning is necessary until it is possible for ink to be discharged from all nozzles.

C: Two or more cleanings are necessary until it is possible for ink to be discharged from all nozzles.

The entire disclosure of Japanese Patent Application No. 2014-233940, filed Nov. 18, 2014 is expressly incorporated by reference herein.

What is claimed is:

1. An ink composition, comprising:
as dyes,
a dye (Bk-1) represented by the following formula (Bk-1);
a dye (Bw-1) represented by the following formula (Bw-1);
a dye (Y-1) represented by the following formula (Y-1); and
a dye (Y-2) represented by the following formula (Y-2):

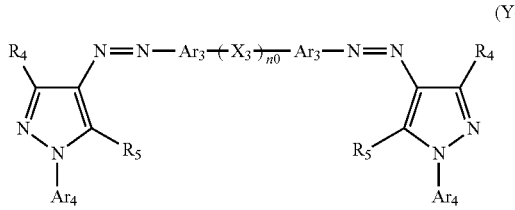

wherein, $R_4$ represents a substituent, $R_5$ represents —$OR_6$ or —$NHR_7$, $R_6$ and $R_7$ represents a hydrogen atom or a substituent, $X_3$ represents a bivalent linking group, n0 is 0 or 1, $Ar_3$ represents a bivalent hetero ring group, and $Ar_4$ represents an alkyl group, an aryl group or a triazine group:

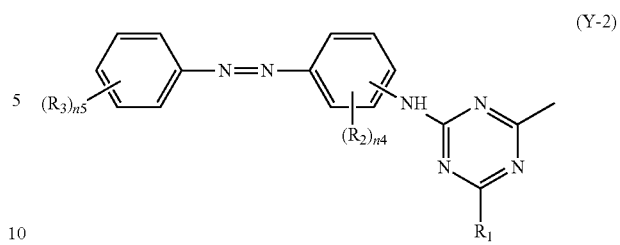

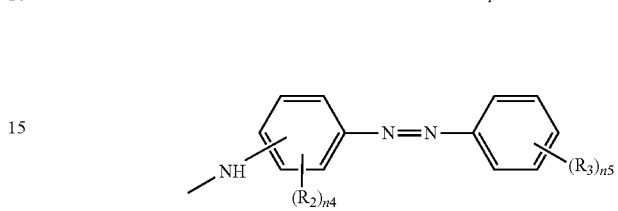

wherein, $R_1$ represents a hydrogen atom or a substituent, $R_2$ represents a substituent, $R_3$ represents an alkyl group which may form an ionic hydrophilic group or a ring, n4 is 0 to 4, and n5 is 2 to 5, wherein a content ratio A (dye (Bk-1):dye (Bw-1)) of the dye (Bk-1) and the dye (Bw-1) is 100:18 to 100:40; and wherein the content ratio B (dye (Bk-1):dye (Bw-1):dye (Y-1):dye (Y-2)) of the dye (Bk-1), the dye (Bw-1), the dye (Y-1), and the dye (Y-2) is 100:20:5:5 to 100:40:12:12, and a total content of the dyes is more than 3.5 mass %;

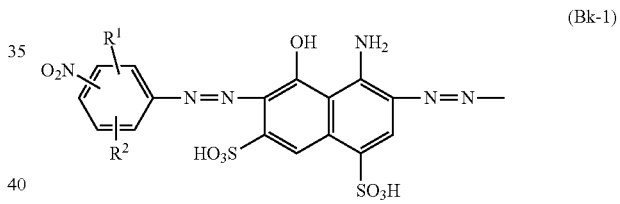

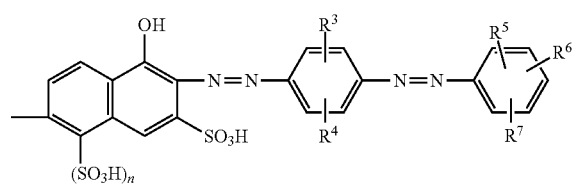

wherein, $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group which may be substituted with a hydroxyl group or a (C1-C4) alkoxy group, a (C1-C4) alkoxy group in which the alkyl group may be substituted with a hydroxyl group, a (C1-C4) alkoxy group, a sulfo group or a carboxyl group, an acylamino group, an alkylsulfonylamino group or a phenylsulfonylamino group in which the phenyl group may be substituted with a halogen atom, an alkyl group or a nitro group, $R^3$ and $R^4$ each independently represent a hydrogen atom, a halogen atom, a cyano group, a carboxyl group, a sulfo group, a nitro group, a (C1-C4) alkyl group which may be substituted with a hydroxyl group or a (C1-C4) alkoxy group, a (C1-C4) alkoxy group in which the alkyl group may be substituted with a hydroxyl group, a (C1-C4) alkoxy group, a sulfo group or a carboxyl group, an acylamino group, an alkylsulfonylamino group or a phenylsulfonylamino group in which the phenyl group may be substituted with a halogen atom, an alkyl group or a nitro group, and n represents 0 or 1:

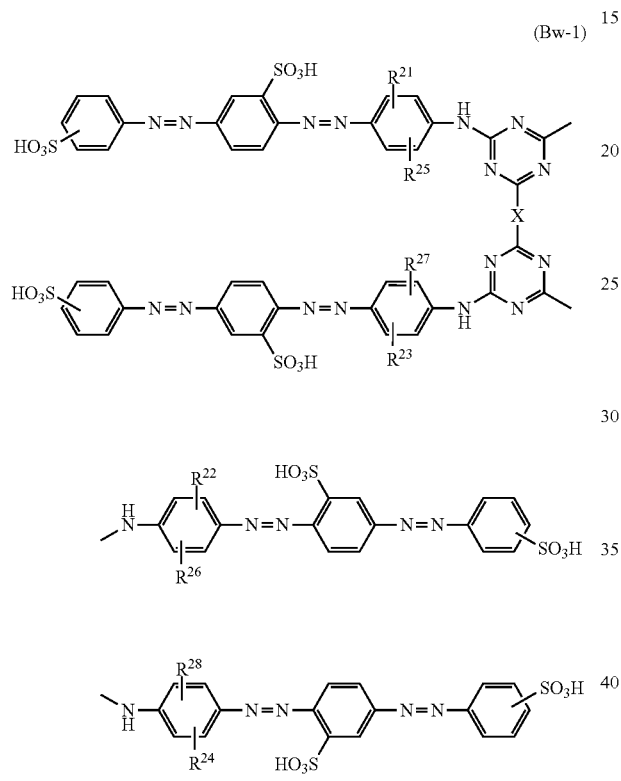

wherein, $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4) alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group as a substituent; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4)alkyl group, a nitro group, a sulfo group, and a carboxy group; a benzenesulfonylamino group; or a phenylsulfonylamino group in which a benzene ring is substituted with at least one group selected from a halogen atom, a (C1-C4)alkyl group, a nitro group, a sulfo group, and a carboxy group; and X represents a bivalent crosslinking group.

2. An ink composition, comprising:
as dyes,
a dye (Bk-1) represented by the following formula (Bk-1);
a dye (Bw-1) represented by the following formula (Bw-1);
a dye (Y-1) represented by the following formula (Y-1); and
a dye (Y-2) represented by the following formula (Y-2):

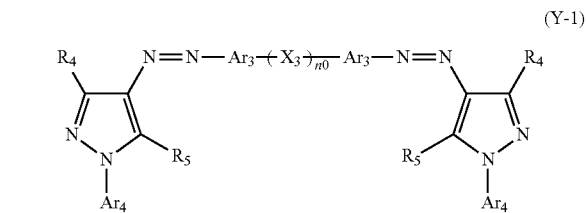

wherein, $R_4$ represents a substituent, $R_5$ represents $—OR_6$ or $—NHR_7$, $R_6$ and $R_7$ represents a hydrogen atom or a substituent, $X_1$ represents a bivalent linking group, n0 is 0 or 1, $Ar_3$ represents a bivalent hetero ring group, and $Ar_4$ represents an alkyl group, an aryl group or a triazine group:

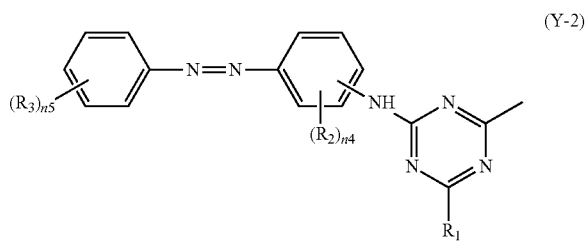

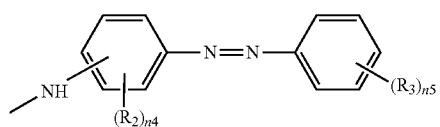

wherein, $R_1$ represents a hydrogen atom or a substituent, $R_2$ represents a substituent, $R_3$ represents an alkyl group which may form an ionic hydrophilic group or a ring, n4 is 0 to 4, and n5 is 2 to 5, wherein the content ratio A (dye (Bk-1):dye (Bw-1)) of the dye (Bk-1) and the dye (Bw-1) is 100:18 to 100:40;

wherein the content ratio B (dye (Bk-1):dye (Bw-1):dye (Y-1):dye (Y-2)) of the dye (Bk-1), the dye (Bw-1), the dye (Y-1), and the dye (Y-2) is 100:20:5:5 to 100:40:12:12, and a total content of the dyes is more than 0.50 to 1.5 mass %:

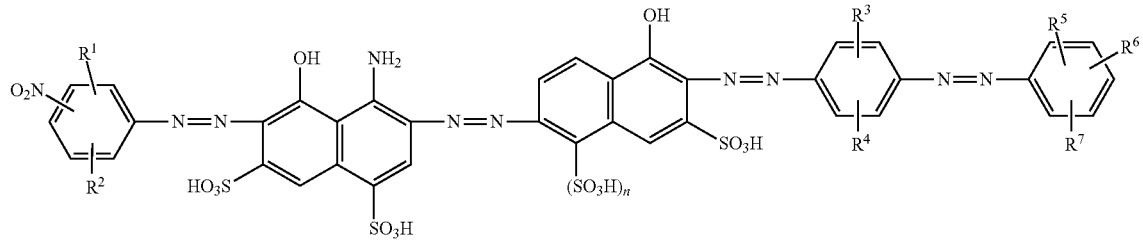
(Bk-1)

wherein, $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, an N-alkyl aminosulfonyl group, N-phenyl-aminosulfonyl group, a (C1-C4) alkylsulfonyl group which may be substituted with a hydroxyl group, a phospho group, a nitro group, an acyl group, a ureido group, a (C1-C4) alkyl group which may be substituted with a hydroxyl group or a (C1-C4) alkoxy group, a (C1-C4) alkoxy group in which the alkyl group may be substituted with a hydroxyl group, a (C1-C4) alkoxy group, a sulfo group or a carboxyl group, an acylamino group, an alkylsulfonylamino group or a phenylsulfonylamino group in which the phenyl group may be substituted with a halogen atom, an alkyl group or a nitro group, $R^3$ and $R^4$ each independently represent a hydrogen atom, a halogen atom, a cyano group, a carboxyl group, a sulfo group, a nitro group, a (C1-C4) alkyl group which may be substituted with a hydroxyl group or a (C1-C4) alkoxy group, a (C1-C4) alkoxy group in which the alkyl group may be substituted with a hydroxyl group, a (C1-C4) alkoxy group, a sulfo group or a carboxyl group, an acylamino group, an alkylsulfonylamino group or a phenylsulfonylamino group in which the phenyl group may be substituted with a halogen atom, an alkyl group or a nitro group, and n represents 0 or 1:

alkylcarbonylamino group substituted with a carboxy group; a ureido group; a mono(C1-C4) alkylureido group; a di(C1-C4) alkylureido group; a mono(C1-C4) alkylureido group substituted with at least one group selected from the group consisting of a hydroxy group, a sulfo group, and a carboxy group as a substituent; a di(C1-C4) alkylureido group substituted with at least one group selected from the group consisting of a hydroxy group, a sulfo group, and a carboxy group as a substituent; a benzolamino group; a benzolamino group in which a benzene ring is substituted with at least one group selected from the group consisting of a halogen atom, a (C1-C4)alkyl group, a nitro group, a sulfo group, and a carboxy group; a benzenesulfonylamino group; or a phenylsulfonylamino group in which a benzene ring is substituted with at least one group selected from a halogen atom, a (C1-C4)alkyl group, a nitro group, a sulfo group, and a carboxy group; and X represents a bivalent crosslinking group.

3. The ink composition according to claim 1, wherein the total content of the dyes is 4.7 to 6.5 mass %.

4. The ink composition according to claim 2, wherein the total content of the dyes is 0.60 to 1.4 mass %.

5. The ink composition according to claim 1, further comprising:

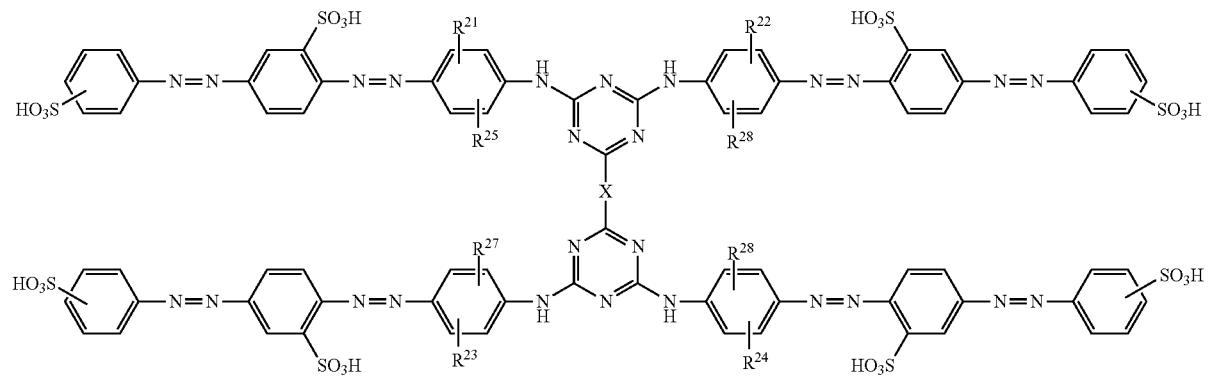
(Bw-1)

wherein, $R^{21}$, $R^{22}$, $R^{23}$, $R^{24}$, $R^{25}$, $R^{26}$, $R^{27}$, and $R^{28}$ each independently represent a hydrogen atom; a halogen atom; a sulfo group; a carboxy group; a sulfamoyl group; a carbamoyl group; a (C1-C4) alkyl group; a (C1-C4) alkoxy group with; a (C1-C4) alkoxy group which is substituted with at least one group selected from a group consisting of a hydroxy group, a (C1-C4) alkoxy group, a hydroxy(C1-C4) alkoxy group, a sulfo group, and a carboxy group as a substituent; a (C1-C4) alkylcarbonylamino group; a (C1-C4)

an alkylene oxide adduct of (C12) or higher acetylene glycol in the main chain, and polyoxyalkylene alkyl ether.

6. The ink composition according to claim 1, further comprising:
triethylene glycol monobutyl ether,
wherein a content of the triethylene glycol monobutyl ether is 3.0 to 10 mass %.

7. An ink set, comprising:
the ink composition according to claim 1.
8. An ink set, comprising:
the ink composition according to claim 2.
9. An ink set, comprising:
the ink composition according to claim 3.
10. An ink set, comprising:
the ink composition according to claim 4.
11. An ink set, comprising:
the ink composition according to claim 5.
12. An ink set, comprising:
the ink composition according to claim 6.

* * * * *